(12) United States Patent
Qian et al.

(10) Patent No.: US 12,432,409 B2
(45) Date of Patent: Sep. 30, 2025

(54) FIRST ELECTRONIC DEVICE AND METHOD FOR DISPLAYING CONTROL WINDOW OF SECOND ELECTRONIC DEVICE

(71) Applicant: Huawei Technologies Co., Ltd., Shenzhen (CN)

(72) Inventors: Kai Qian, Shenzhen (CN); Wei Dong, Xi'an (CN); Haowei Xu, Xi'an (CN); Qingfeng Xue, Xi'an (CN); Erli Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 18/552,833

(22) PCT Filed: Mar. 29, 2022

(86) PCT No.: PCT/CN2022/083828
§ 371 (c)(1),
(2) Date: Sep. 27, 2023

(87) PCT Pub. No.: WO2022/206786
PCT Pub. Date: Oct. 6, 2022

(65) Prior Publication Data
US 2024/0171802 A1    May 23, 2024

(30) Foreign Application Priority Data

Mar. 31, 2021 (CN) .......................... 202110351270.7
Jul. 30, 2021 (CN) .......................... 202110872916.6

(51) Int. Cl.
*H04N 21/41* (2011.01)
*G06F 3/0484* (2022.01)
(Continued)

(52) U.S. Cl.
CPC ..... *H04N 21/41265* (2020.08); *G06F 3/0484* (2013.01); *H04N 21/42222* (2013.01); *H04N 21/4312* (2013.01)

(58) Field of Classification Search
CPC ....... H04N 21/41265; H04N 21/42222; H04N 21/4312; G06F 3/0484
See application file for complete search history.

(56) References Cited

U.S. PATENT DOCUMENTS

2018/0322774 A1    11/2018  Wang et al.
2020/0041603 A1*   2/2020   Stephens .................. G01S 5/12
(Continued)

FOREIGN PATENT DOCUMENTS

CN    111007455 A    4/2020
CN    112327653 A    2/2021

*Primary Examiner* — Kyu Chae
(74) *Attorney, Agent, or Firm* — Slater Matsil, LLP

(57) ABSTRACT

In accordance with an embodiment, a first electronic device is configured to communicate with a first ultra-wideband base station via ultra-wideband wireless communication and receive coordinates of the first electronic device that are based on a relative location between the first electronic device and the first ultra-wideband base station. The first electronic device is further configured to display a control window of a second electronic device in response to detecting that the first electronic device is located in a front area of the second electronic device and points to the second electronic device.

20 Claims, 32 Drawing Sheets

(51) Int. Cl.
*H04N 21/422* (2011.01)
*H04N 21/431* (2011.01)

(56) References Cited

U.S. PATENT DOCUMENTS

2021/0169049 A1* 6/2021 Xiao .................... G05D 1/0217
2021/0333889 A1* 10/2021 Wang .................... G06F 1/1694
2024/0300555 A1* 9/2024 Chen ....................... E21F 17/18

* cited by examiner

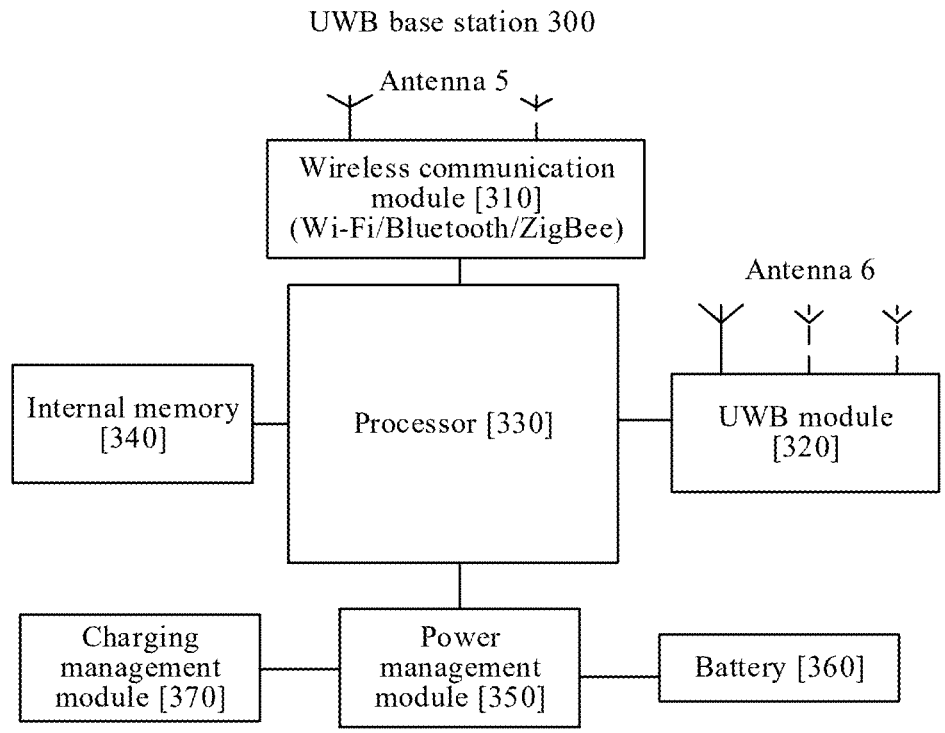

FIG. 4

S510. A UWB base station, a first electronic device, and a second electronic device establish a first coordinate system, a second coordinate system, and a third coordinate system respectively S520. Move the first electronic device to at least three positions in a display area of the second electronic device and one position in a front of the second electronic device, and mark coordinates of the at least three positions in the display area of the second electronic device and coordinates of the position in the front of the second electronic device in the first coordinate system by using coordinates of the first electronic device in the first coordinate system S530. The first electronic device displays a control window of the second electronic device when the first electronic device is located in the front of the second electronic device and points to the second electronic device

FIG. 5

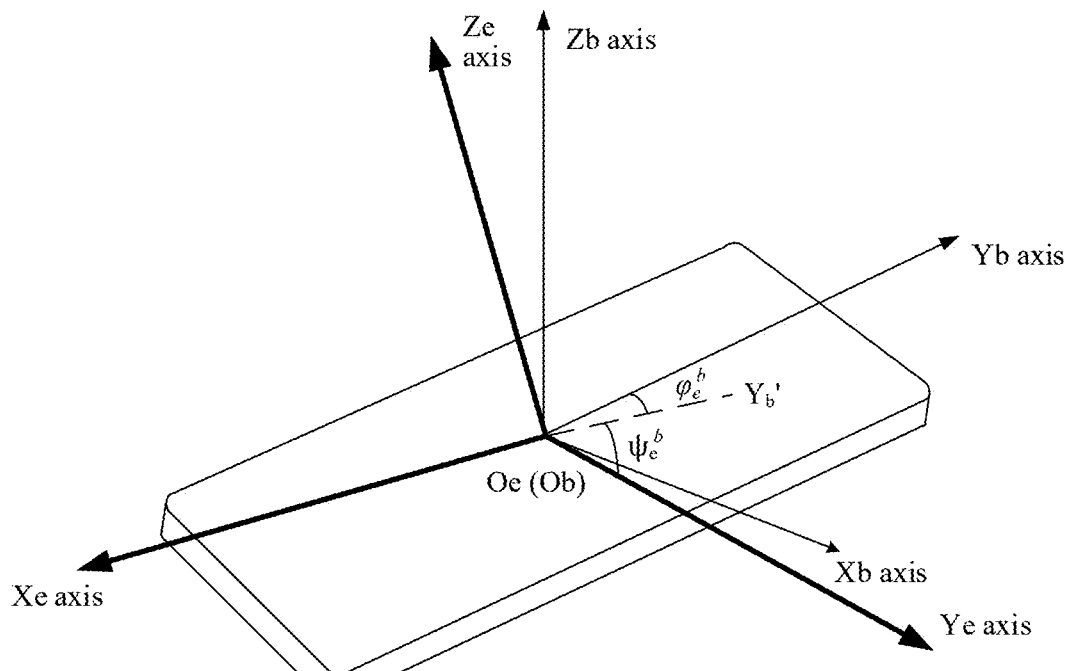
(a)
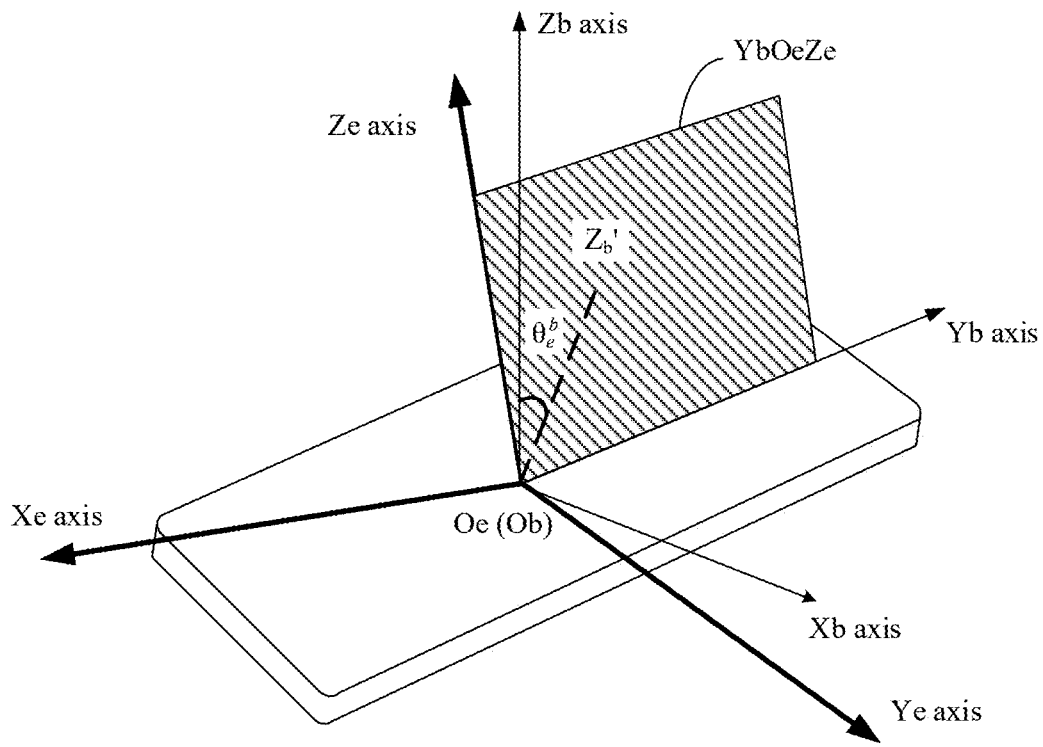
(b)
FIG. 13

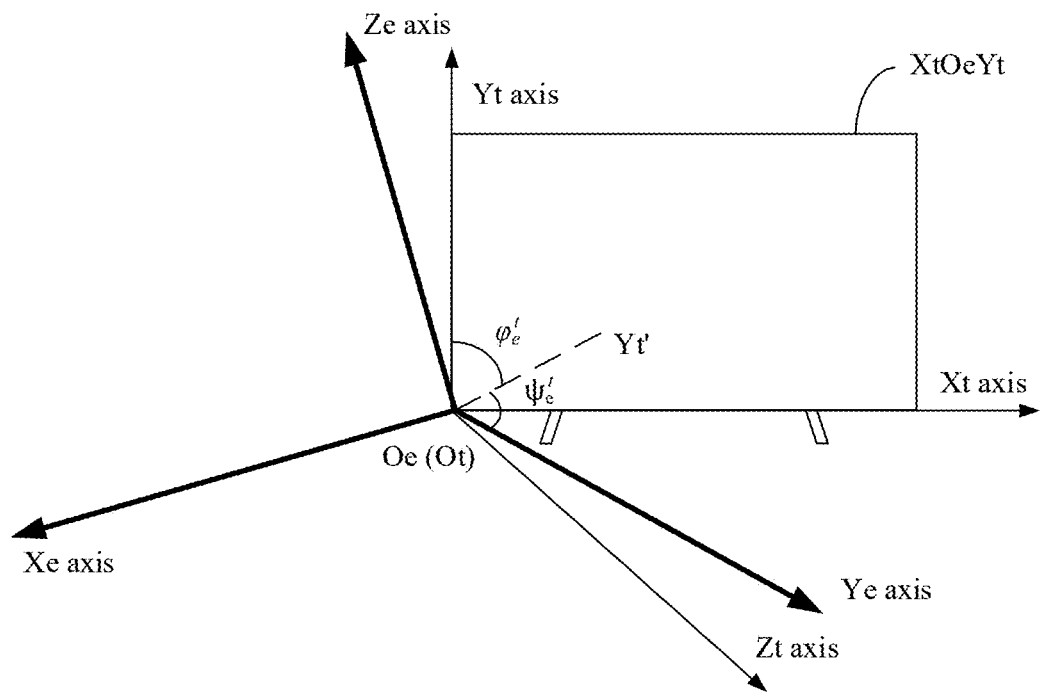
(a)
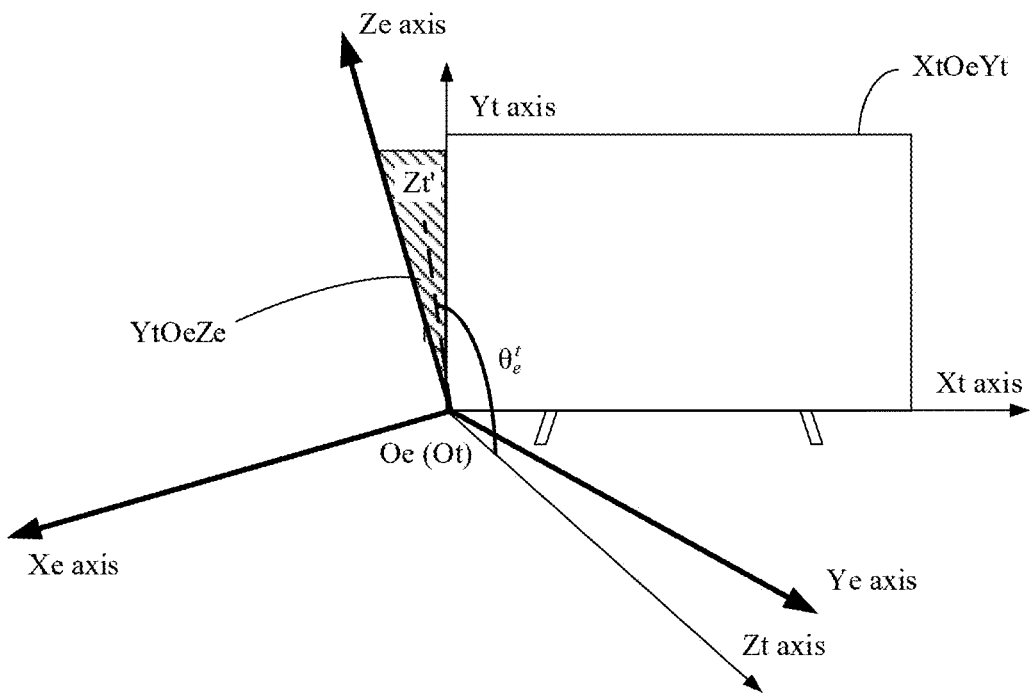
(b)
FIG. 14

S2210. A UWB base station, a first electronic device, and a second electronic device establish a first coordinate system, a second coordinate system, and a third coordinate system respectively

S2220. Move the first electronic device to one position or two positions in a display area of the second electronic device, and mark coordinates of the one position or the two positions in the display area of the second electronic device in the first coordinate system by using coordinates of the first electronic device in the first coordinate system

S2230. The first electronic device pops up a control window of the second electronic device when the first electronic device is located in a front of the second electronic device and points to the second electronic device

FIG. 22

S2301. A first electronic device receives a user input, and outputs first prompt information, where the first prompt information is for prompting the first electronic device to mark a first position on a second electronic device

S2302. After the first electronic device moves to the first position, where an orientation and a pointing direction of the first electronic device maintain correspondences with an orientation and a pointing direction of the second electronic device, the first electronic device receives a first input, records coordinates of the first electronic device coordinates of the first position, and records, through conversion based on the correspondences, the orientation and the pointing direction of the first electronic device as the orientation and the pointing direction of the second electronic device

FIG. 23

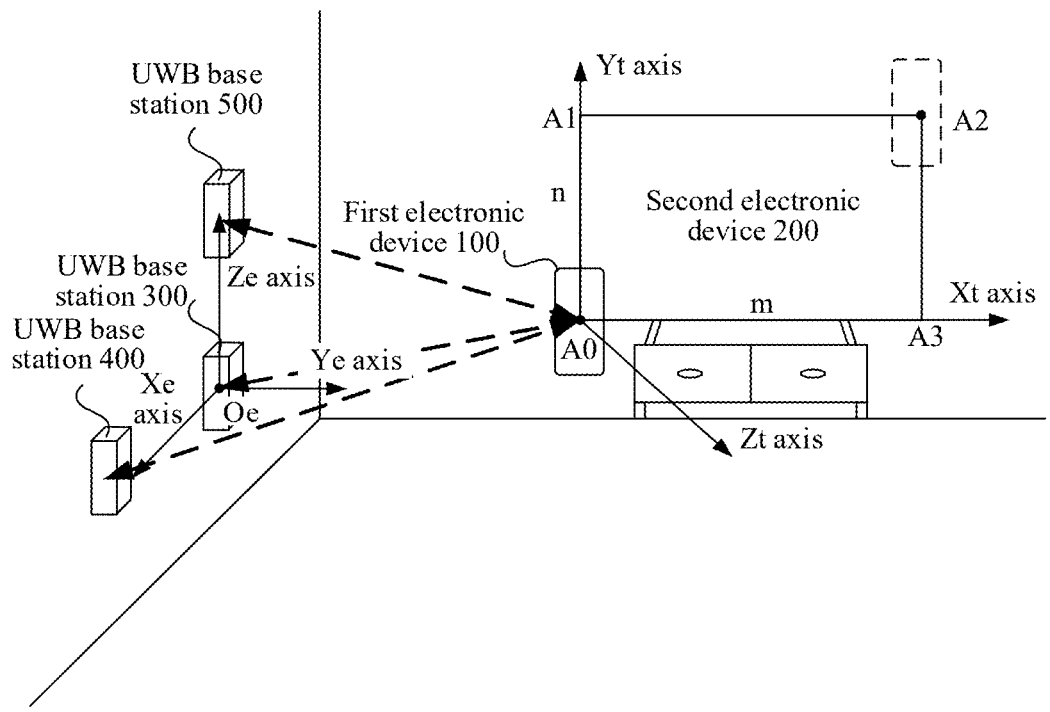
(a)
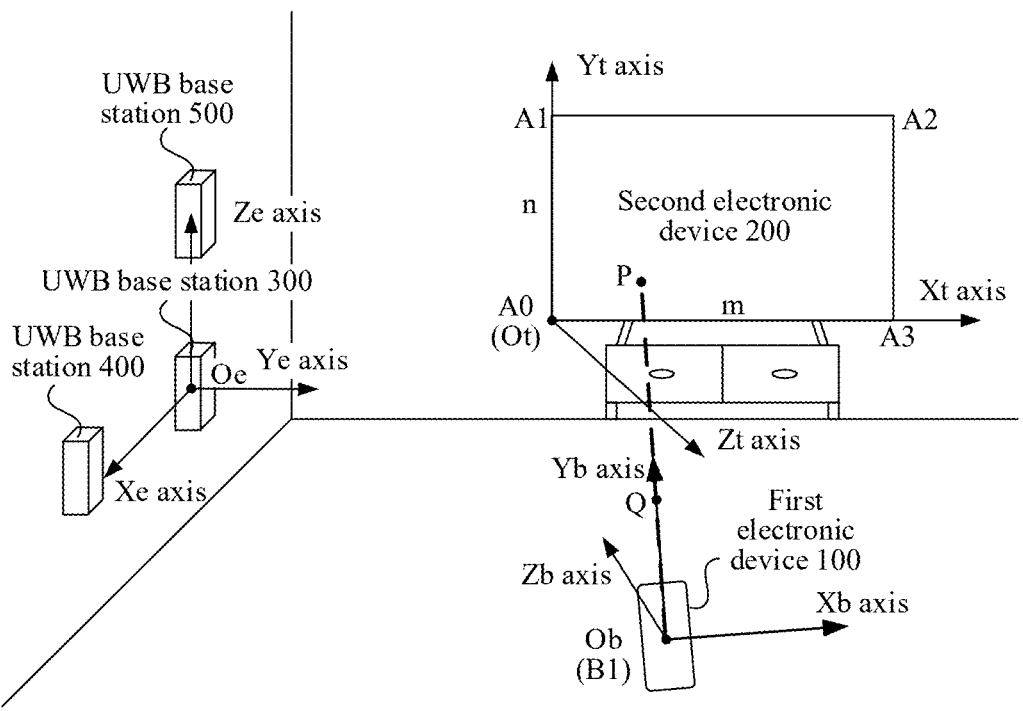
(b)
FIG. 24

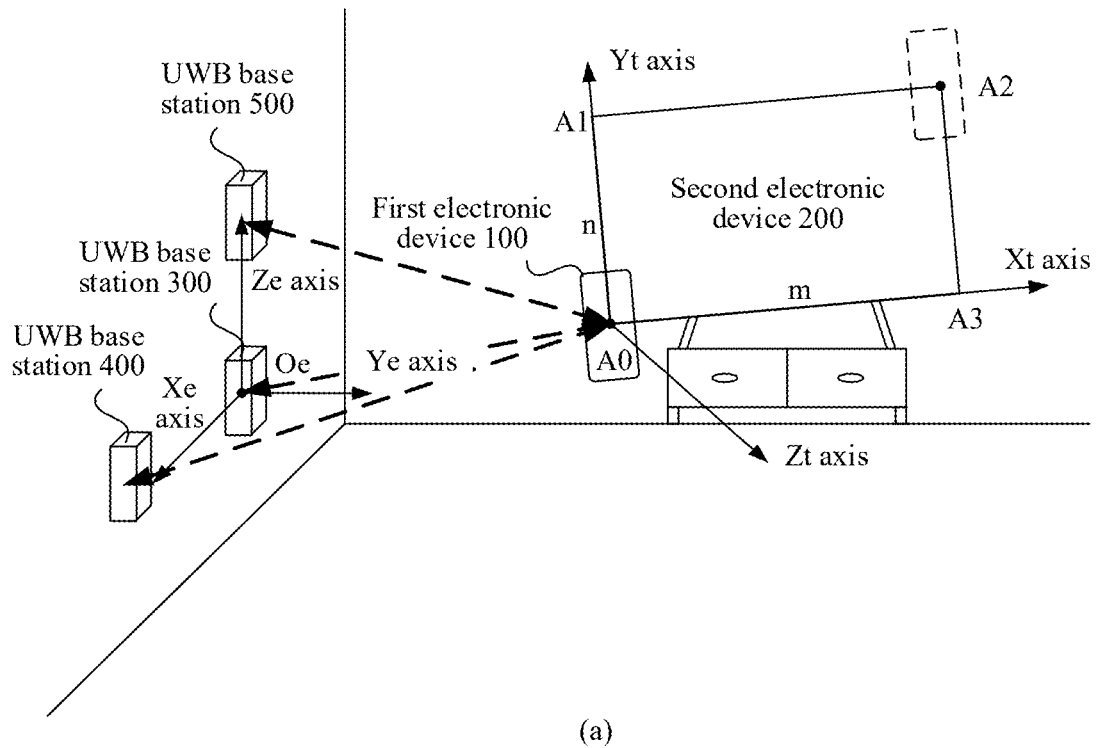
(a)
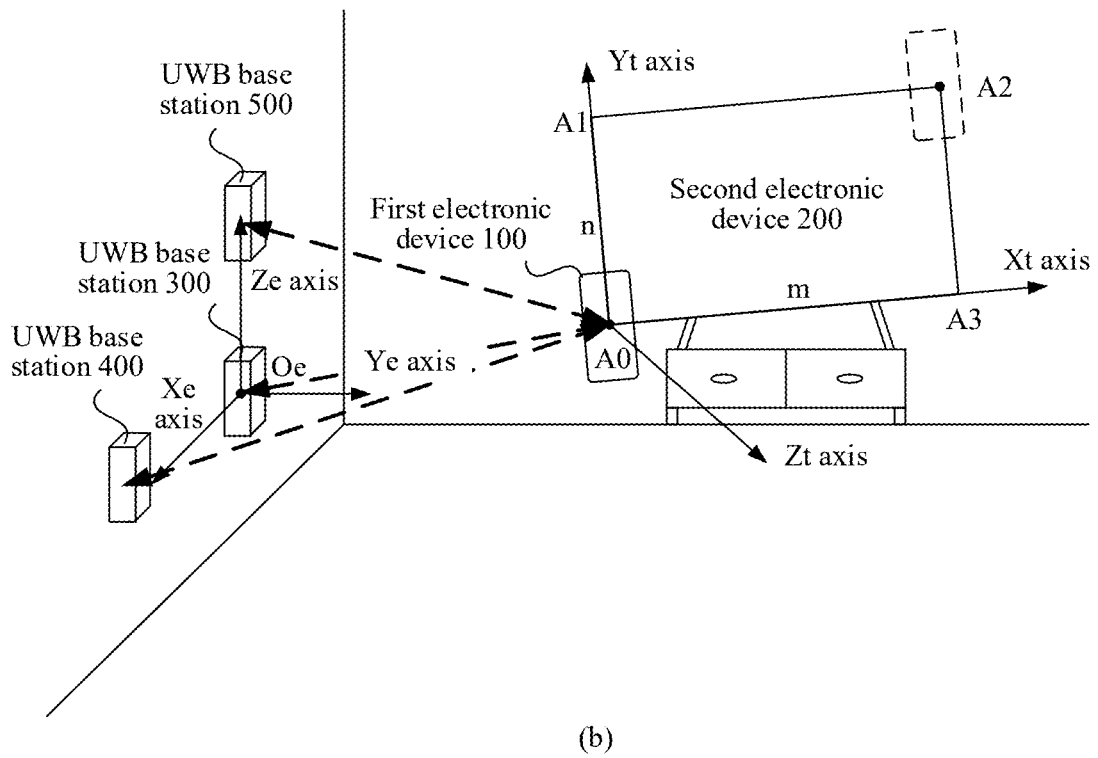
(b)
FIG. 25

FIRST ELECTRONIC DEVICE AND METHOD FOR DISPLAYING CONTROL WINDOW OF SECOND ELECTRONIC DEVICE

CROSS-REFERENCE TO RELATED APPLICATIONS

This application is a National Stage of International Application No. PCT/CN2022/083828, filed on Mar. 29, 2022, which claims priority to Chinese Patent Application No. 202110351270.7, filed on Mar. 31, 2021 and Chinese Patent Application No. 202110872916.6, filed on Jul. 30, 2021. All of the aforementioned applications are hereby incorporated by reference in their entireties.

TECHNICAL FIELD

This application relates to the terminal field, and in particular, to a first electronic device and a method for displaying a control window of a second electronic device.

BACKGROUND

A second electronic device is controlled by using an application (application, APP) installed on a first electronic device, so that control functions of different second electronic devices (for example, a remote control function of a smart television in a living room, a remote control function of a smart television in a bedroom, and a remote control function of a cabinet-type smart air conditioner in a living room) may be integrated into one first electronic device. This is widely applied. For example, the first electronic device has a remote control function of the second electronic device, and may remotely control the second electronic device. In this way, after a first electronic device of a user points to a second electronic device, a control window of the second electronic device may be displayed. This facilitates a user operation and reduces time consumption. However, a circuit or a module for implementing precise positioning needs to be configured for the second electronic device, causing excessively high costs of the second electronic device. In particular, the foregoing circuit or module is configured for all second electronic devices, for example, at home or in an office, causing a significant increase in costs. A common family or a common company may be unwilling to upgrade all second electronic devices or perform replacement in all second electronic devices due to cost considerations. In addition, sometimes due to reasons such as carelessness of a user, a first electronic device may point to a second electronic device from the back of the second electronic device. In this case, a control window of the second electronic device is also displayed, but the user originally does not want to control the second electronic device. As a result, inconvenience is brought to the user.

SUMMARY

Based on the foregoing background, how to enable a first electronic device to accurately display a control window of a second electronic device in a low-cost manner, to reduce or even avoid mis-display of the control window and facilitate user control is a technical problem to be resolved.

To resolve the foregoing technical problem, this application provides a first electronic device and a method for displaying a control window of a second electronic device. Even if none of second electronic devices is upgraded or replaced, the technical solutions provided in this application can enable a first electronic device of a user to point to a second electronic device that is not configured with the foregoing circuit or module. Moreover, a second electronic device can be located after the first electronic device is located in a front area of the second electronic device and points to the second electronic device, to quickly display a control window of the second electronic device. This facilitates user control, saves time, and improves user experience. In addition, for a second electronic device having a display screen, in the technical solutions provided in this application, a cursor corresponding to the first electronic device can be further displayed on the display screen of the second electronic device, so that a user can control the second electronic device by using the first electronic device more conveniently, and user experience is better.

In other words, in the technical solutions provided in this application, after pointing to a second electronic device that is not upgraded, a first electronic device of a user can locate the second electronic device in a low-cost manner, to quickly display (for example, pop up and display) a control window of the second electronic device. After the first electronic device displays the control window of the second electronic device, the user can control the second electronic device based on the control window. In addition, for a second electronic device having a display screen, a cursor corresponding to the first electronic device can be further displayed on the display screen of the second electronic device, so that the user can control the second electronic device by using the first electronic device more conveniently, and user experience is better.

According to a first aspect, a first electronic device is provided. The first electronic device includes an ultra-wideband module and an inertia measurement unit module. The first electronic device communicates with a first ultra-wideband base station (a UWB base station) through ultra-wideband wireless communication. The first electronic device obtains, through the ultra-wideband wireless communication, coordinates of the first electronic device that are based on the first ultra-wideband base station. The first electronic device further includes a processor, a memory, and a computer program. The computer program is stored in the memory; and when the computer program is executed by the processor, the first electronic device is enabled to perform the following operations: recording, in response to a first input received when the first electronic device is located at a first vertex angle position of a second electronic device, first coordinates of the first electronic device that are based on the first ultra-wideband base station as coordinates of the first vertex angle position; recording, in response to a second input received when the first electronic device is located at a second vertex angle position of the second electronic device, second coordinates of the first electronic device that are based on the first ultra-wideband base station as coordinates of the second vertex angle position; recording, in response to a third input received when the first electronic device is located at a third vertex angle position of the second electronic device, third coordinates of the first electronic device that are based on the first ultra-wideband base station as coordinates of the third vertex angle position; recording, in response to a fourth input received when the first electronic device is located at a fourth position that is in a front area and that is outside the second electronic device, fourth coordinates of the first electronic device that are based on the first ultra-wideband base station as coordinates of the fourth position; and displaying, by the first electronic device, a control window of the second electronic device in response to detecting that the first electronic device is located in the front area of the second electronic device and points to the second electronic device, where any two of the first vertex angle position, the second vertex angle position, and the third vertex angle position are different; and a detection result that the first electronic device is located in the front area of the second electronic device and points to the second electronic device is associated with the first vertex angle position, the second vertex angle position, the third vertex angle position, and the fourth position.

In this way, a position and an orientation of the second electronic device in space may be determined based on location marking performed by the first electronic device on the second electronic device four times, to determine whether the first electronic device is located in the front area of the second electronic device and points to the second electronic device. Even if a circuit or module for implementing precise positioning is upgraded or replaced for none of second electronic devices, the technical solutions provided in this application can enable a first electronic device of a user to point to a second electronic device that is not configured with the foregoing circuit or module. Moreover, a second electronic device can be located after the first electronic device is located in a front area of the second electronic device and points to the second electronic device, to quickly display a control window of the second electronic device. This facilitates user control, saves time, and improves user experience. In addition, for a second electronic device having a display screen, in the technical solutions provided in this application, a cursor corresponding to the first electronic device can be further displayed on the display screen of the second electronic device, so that a user can control the second electronic device by using the first electronic device more conveniently, and user experience is better.

According to the first aspect, before the first electronic device performs the foregoing operations, the first electronic device cannot obtain position information of the second electronic device.

According to either the first aspect or the foregoing implementation of the first aspect, before the first electronic device performs the foregoing operations, the first electronic device cannot obtain orientation information of the second electronic device.

According to any one of the first aspect or the foregoing implementations of the first aspect, when the first electronic device is not located in the front area of the second electronic device, the first electronic device does not display the control window of the second electronic device. In this way, mis-display of the control window can be reduced or even avoided, thereby improving user experience.

According to any one of the first aspect or the foregoing implementations of the first aspect, when the first electronic device does not point to the second electronic device, the first electronic device does not display the control window of the second electronic device. In this way, mis-display of the control window can be reduced or even avoided, thereby improving user experience.

According to any one of the first aspect or the foregoing implementations of the first aspect, the first vertex angle position, the second vertex angle position, and the third vertex angle position are three different vertex angle positions on an edge contour of the second electronic device; or the first vertex angle position, the second vertex angle position, and the third vertex angle position are three different vertex angle positions of an edge contour of a display area of the second electronic device.

In this way, an edge contour of a housing of the second electronic device or the edge contour of the display area of the second electronic device can be determined based on the first vertex angle position, the second vertex angle position, and the third vertex angle position. Therefore, when a circuit or module for implementing precise positioning is upgraded or replaced for none of second electronic devices, a first electronic device of a user is enabled to point to a second electronic device that is not configured with the foregoing circuit or module. Moreover, a second electronic device can be located after the first electronic device is located in a front area of the second electronic device and points to the second electronic device, to quickly display a control window of the second electronic device. This facilitates user control, saves time, and improves user experience.

According to any one of the first aspect or the foregoing implementations of the first aspect, the first ultra-wideband base station includes three antennas, and communicates with the first electronic device by using the three antennas through the ultra-wideband wireless communication. In this way, the foregoing technical effect can be achieved by using only one UWB base station.

According to any one of the first aspect or the foregoing implementations of the first aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system. In this way, the first coordinate system is calibrated first, so that subsequent marking of coordinates in the first coordinate system is more accurate.

According to any one of the first aspect or the foregoing implementations of the first aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system. In this way, another form of UWB base station is provided, and the foregoing technical effect can be achieved through cooperation of at least three UWB base stations. Similarly, the first coordinate system is calibrated first, so that subsequent marking of coordinates in the first coordinate system is more accurate.

According to any one of the first aspect or the foregoing implementations of the first aspect, the second ultra-wideband base station and the third ultra-wideband base station are installed on a same plane as the first ultra-wideband base station. In this way, in a case of at least three UWB base stations, a preferred installation manner of three or more UWB base stations is provided.

According to any one of the first aspect or the foregoing implementations of the first aspect, the second ultra-wideband base station needs to be installed in a first direction of the first ultra-wideband base station, and/or the third ultra-wideband base station needs to be installed in a second direction of the first ultra-wideband base station. In a case of at least three UWB base stations, an installation requirement is provided. In this way, during use, a consumer may perform installation based on the requirement, thereby facilitating use of a desired first coordinate system in a subsequent step. For example, a red identifier is on the back of the first ultra-wideband base station, a blue identifier is on the back of the second ultra-wideband base station, and a yellow identifier is on the back of the third ultra-wideband base station. As specified in an installation specification, the ultra-wideband base station with the blue identifier is installed in a first direction of the ultra-wideband base station with the red identifier; and/or the ultra-wideband base station with the red identifier is installed in a second direction of the ultra-wideband base station with the red identifier.

According to any one of the first aspect or the foregoing implementations of the first aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the first aspect or the foregoing implementations of the first aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the first aspect or the foregoing implementations of the first aspect, the displaying, by the first electronic device, a control window of the second electronic device in response to detecting that the first electronic device is located in the front area of the second electronic device and points to the second electronic device includes: in response to detecting that the first electronic device is located at a fifth position outside the second electronic device, obtaining, by the first electronic device, fifth coordinates of the first electronic device that are based on the first ultra-wideband base station, and determining, by the first electronic device based on the first coordinates, the second coordinates, the third coordinates, the fourth coordinates, the fifth coordinates, and a pointing direction of the first electronic device, whether the first electronic device is located in the front area of the second electronic device and whether the first electronic device points to the second electronic device.

According to any one of the first aspect or the foregoing implementations of the first aspect, the first electronic device obtains, based on the fifth coordinates, coordinate values of the fifth position in a third coordinate system, and determines, based on the coordinate values of the fifth position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the first aspect or the foregoing implementations of the first aspect, the first electronic device obtains, based on the fifth coordinates, a component of coordinate values of the fifth position in a third coordinate system on a coordinate axis of the third coordinate system, and determines, based on the coordinate values of the fifth position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the first aspect or the foregoing implementations of the first aspect, the straight line on which the pointing direction of the first electronic device is located is obtained based on the inertia measurement unit module.

According to a second aspect, a first electronic device is provided. The first electronic device includes an ultra-wideband module and an inertia measurement unit module. The first electronic device communicates with a first ultra-wideband base station through ultra-wideband wireless communication. The first electronic device communicates with a second electronic device through another wireless communication, where the another wireless communication is different from the ultra-wideband wireless communication. The first electronic device obtains, through the ultra-wideband wireless communication, coordinates of the first electronic device that are based on the first ultra-wideband base station. The first electronic device obtains a length and a width of an edge contour of the second electronic device or a length and a width of an edge contour of a display area of the second electronic device through the another wireless communication. The first electronic device further includes a processor, a memory, and a computer program. The computer program is stored in the memory; and when the computer program is executed by the processor, the first electronic device is enabled to perform the following operations: in response to a first input received when the first electronic device moves to a vertex angle position of the second electronic device and an orientation of the first electronic device is the same as an orientation of the second electronic device, recording first coordinates of the first electronic device that are based on the first ultra-wideband base station as coordinates of the vertex angle position, and recording the orientation of the first electronic device as the orientation of the second electronic device; and displaying, by the first electronic device, a control window of the second electronic device in response to detecting that the first electronic device is located in the front area of the second electronic device and points to the second electronic device, where a detection result that the first electronic device is located in the front area of the second electronic device and points to the second electronic device is associated with the vertex angle position and the orientation of the second electronic device.

In this way, a position and an orientation of the second electronic device in space may be determined based on location marking performed by the first electronic device on the second electronic device once, to determine whether the first electronic device is located in the front area of the second electronic device and points to the second electronic device. Even if a circuit or module for implementing precise positioning is upgraded or replaced for none of second electronic devices, the technical solutions provided in this application can enable a first electronic device of a user to point to a second electronic device that is not configured with the foregoing circuit or module. Moreover, the second electronic device can be located after the first electronic device is located in a front area of the second electronic device and points to the second electronic device, to display a control window of the second electronic device. This facilitates user control, saves time, and improves user experience. In addition, for a second electronic device having a display screen, in the technical solutions provided in this application, a cursor corresponding to the first electronic device can be further displayed on the display screen of the second electronic device, so that a user can control the second electronic device by using the first electronic device more conveniently, and user experience is better.

According to the second aspect or any one of the foregoing implementations of the first aspect, the vertex angle position is a vertex angle position on the edge contour of the second electronic device; or the vertex angle position is a vertex angle position on the edge contour of the display area of the second electronic device.

According to either the second aspect or the foregoing implementation of the second aspect, the displaying, by the first electronic device, a control window of the second electronic device in response to detecting that the first electronic device is located in the front area of the second electronic device and points to the second electronic device includes: in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the second electronic device, the width of the edge contour of the second electronic device, the second coordinates, the orientation of the second electronic device, and a pointing direction of the first electronic device, whether the first electronic device is located in the front area of the second electronic device and whether the first electronic device points to the second electronic device; or in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the display area of the second electronic device, the width of the edge contour of the display area of the second electronic device, the second coordinates, the orientation of the second electronic device, and a pointing direction of the first electronic device, whether the first electronic device is located in the front area of the second electronic device and whether the first electronic device points to the second electronic device.

According to any one of the second aspect or the foregoing implementations of the second aspect, the first electronic device obtains, based on the second coordinates, coordinate values of the second position in a third coordinate system, and determines, based on the coordinate values of the second position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the second aspect or the foregoing implementations of the second aspect, before the first electronic device performs the foregoing operations, the first electronic device cannot obtain position information of the second electronic device.

According to any one of the second aspect or the foregoing implementations of the second aspect, before the first electronic device performs the foregoing operations, the first electronic device cannot obtain orientation information of the second electronic device.

According to any one of the second aspect or the foregoing implementations of the second aspect, when the first electronic device is not located in the front area of the second electronic device, the first electronic device does not display the control window of the second electronic device.

According to any one of the second aspect or the foregoing implementations of the second aspect, when the first electronic device does not point to the second electronic device, the first electronic device does not display the control window of the second electronic device.

According to any one of the second aspect or the foregoing implementations of the second aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the second aspect or the foregoing implementations of the second aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the second aspect or the foregoing implementations of the second aspect, the second ultra-wideband base station and the third ultra-wideband base station are installed on a same plane as the first ultra-wideband base station.

According to any one of the second aspect or the foregoing implementations of the second aspect, the second ultra-wideband base station needs to be installed in a first direction of the first ultra-wideband base station, and/or the third ultra-wideband base station needs to be installed in a second direction of the first ultra-wideband base station.

According to any one of the second aspect or the foregoing implementations of the second aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the second aspect or the foregoing implementations of the second aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the second aspect or the foregoing implementations of the second aspect, the straight line on which the pointing direction of the first electronic device is located is obtained based on the inertia measurement unit module.

For technical effects corresponding to any one of the second aspect or the implementations of the second aspect, refer to the technical effects corresponding to any one of the first aspect or the implementations of the first aspect. Details are not described herein again.

According to a third aspect, a first electronic device is provided. The first electronic device includes an ultra-wideband module and an inertia measurement unit module. The first electronic device communicates with a first ultra-wideband base station through ultra-wideband wireless communication. The first electronic device obtains, through the ultra-wideband wireless communication, coordinates of the first electronic device that are based on the first ultra-wideband base station. The first electronic device further includes a processor, a memory, and a computer program. The computer program is stored in the memory; and when the computer program is executed by the processor, the first electronic device is enabled to perform the following operations: in response to a first input received when the first electronic device moves to a first vertex angle position of a second electronic device and an orientation of the first electronic device is the same as an orientation of the second electronic device, recording first coordinates of the first electronic device that are based on the first ultra-wideband base station as coordinates of the first vertex angle position, and recording the orientation of the first electronic device as the orientation of the second electronic device; and recording, in response to a second input received when the first electronic device moves to a second vertex angle position of the second electronic device, second coordinates of the first electronic device that are based on the first ultra-wideband base station as coordinates of the second vertex angle position; and displaying, by the first electronic device, a control window of the second electronic device in response to detecting that the first electronic device is located in the front area of the second electronic device and points to the second electronic device, where the first vertex angle position and the second vertex angle position are different from each other; and a detection result that the first electronic device is located in the front area of the second electronic device and points to the second electronic device is associated with the first vertex angle position, the second vertex angle position, and the orientation of the second electronic device.

In this way, a position and an orientation of the second electronic device in space may be determined based on location marking performed by the first electronic device on the second electronic device twice, to determine whether the first electronic device is located in the front area of the second electronic device and points to the second electronic device. Even if a circuit or module for implementing precise positioning is upgraded or replaced for none of second electronic devices, the technical solutions provided in this application can enable a first electronic device of a user to point to a second electronic device that is not configured with the foregoing circuit or module. Moreover, the second electronic device can be located after the first electronic device is located in a front area of the second electronic device and points to the second electronic device, to quickly display a control window of the second electronic device. This facilitates user control, saves time, and improves user experience. In addition, for a second electronic device having a display screen, in the technical solutions provided in this application, a cursor corresponding to the first electronic device can be further displayed on the display screen of the second electronic device, so that a user can control the second electronic device by using the first electronic device more conveniently, and user experience is better.

According to the third aspect, the first vertex angle position and the second vertex angle position are two different vertex angle positions on a same diagonal of an edge contour of the second electronic device; or the first vertex angle position and the second vertex angle position are two different vertex angle positions on a same diagonal of an edge contour of a display area of the second electronic device.

According to either the third aspect or the foregoing implementation of the third aspect, the displaying, by the first electronic device, a control window of the second electronic device in response to detecting that the first electronic device is located in the front area of the second electronic device and points to the second electronic device includes: in response to detecting that the first electronic device is located at a third position outside the second electronic device, obtaining, by the first electronic device, third coordinates of the first electronic device that are based on the first ultra-wideband base station, and determining, by the first electronic device based on the first coordinates, the second coordinates, the third coordinates, the orientation of the second electronic device, and a pointing direction of the first electronic device, whether the first electronic device is located in the front area of the second electronic device and whether the first electronic device points to the second electronic device.

According to any one of the third aspect or the foregoing implementations of the third aspect, the first electronic device obtains, based on the third coordinates, coordinate values of the third position in a third coordinate system, and determines, based on the coordinate values of the third position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the third aspect or the foregoing implementations of the third aspect, before the first electronic device performs the foregoing operations, the first electronic device cannot obtain position information of the second electronic device.

According to any one of the third aspect or the foregoing implementations of the third aspect, before the first electronic device performs the foregoing operations, the first electronic device cannot obtain orientation information of the second electronic device.

According to any one of the third aspect or the foregoing implementations of the third aspect, when the first electronic device is not located in the front area of the second electronic device, the first electronic device does not display the control window of the second electronic device.

According to any one of the third aspect or the foregoing implementations of the third aspect, when the first electronic device does not point to the second electronic device, the first electronic device does not display the control window of the second electronic device.

According to any one of the third aspect or the foregoing implementations of the third aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the third aspect or the foregoing implementations of the third aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the third aspect or the foregoing implementations of the third aspect, the second ultra-wideband base station and the third ultra-wideband base station are installed on a same plane as the first ultra-wideband base station.

According to any one of the third aspect or the foregoing implementations of the third aspect, the second ultra-wideband base station needs to be installed in a first direction of the first ultra-wideband base station, and/or the third ultra-wideband base station needs to be installed in a second direction of the first ultra-wideband base station.

According to any one of the third aspect or the foregoing implementations of the third aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the third aspect or the foregoing implementations of the third aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the third aspect or the foregoing implementations of the third aspect, the straight line on which the pointing direction of the first electronic device is located is obtained based on the inertia measurement unit module.

For technical effects corresponding to any one of the third aspect or the implementations of the third aspect, refer to the technical effects corresponding to any one of the first aspect or the implementations of the first aspect. Details are not described herein again.

According to a fourth aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication. The first electronic device obtains, through the ultra-wideband wireless communication, coordinates of the first electronic device that are based on the first ultra-wideband base station. The method further includes: recording, in response to a first input received when the first electronic device is located at a first vertex angle position of the second electronic device, first coordinates of the first electronic device that are based on the first ultra-wideband base station as coordinates of the first vertex angle position; recording, in response to a second input received when the first electronic device is located at a second vertex angle position of the second electronic device, second coordinates of the first electronic device that are based on the first ultra-wideband base station as coordinates of the second vertex angle position; recording, in response to a third input received when the first electronic device is located at a third vertex angle position of the second electronic device, third coordinates of the first electronic device that are based on the first ultra-wideband base station as coordinates of the third vertex angle position; recording, in response to a fourth input received when the first electronic device is located at a fourth position that is in a front area of the second electronic device and that is outside the second electronic device, fourth coordinates of the first electronic device that are based on the first ultra-wideband base station as coordinates of the fourth position; and displaying, by the first electronic device, the control window of the second electronic device in response to detecting that the first electronic device is located in the front area of the second electronic device and points to the second electronic device, where the control window is for receiving a control command for the second electronic device, where any two of the first vertex angle position, the second vertex angle position, and the third vertex angle position are different; and a detection result that the first electronic device is located in the front area of the second electronic device and points to the second electronic device is associated with the first vertex angle position, the second vertex angle position, the third vertex angle position, and the fourth position.

According to the fourth aspect, before the method is performed, the first electronic device cannot obtain position information of the second electronic device.

According to either the fourth aspect or the foregoing implementation of the fourth aspect, before the method is performed, the first electronic device cannot obtain orientation information of the second electronic device.

According to any one of the fourth aspect or the foregoing implementations of the fourth aspect, when the first electronic device is not located in the front area of the second electronic device, the first electronic device does not display the control window of the second electronic device.

According to any one of the fourth aspect or the foregoing implementations of the fourth aspect, when the first electronic device does not point to the second electronic device, the first electronic device does not display the control window of the second electronic device.

According to any one of the fourth aspect or the foregoing implementations of the fourth aspect, the first vertex angle position, the second vertex angle position, and the third vertex angle position are three different vertex angle positions on an edge contour of the second electronic device; or the first vertex angle position, the second vertex angle position, and the third vertex angle position are three different vertex angle positions of an edge contour of a display area of the second electronic device.

According to any one of the fourth aspect or the foregoing implementations of the fourth aspect, the first ultra-wideband base station includes three antennas, and communicates with the first electronic device by using the three antennas through the ultra-wideband wireless communication.

According to any one of the fourth aspect or the foregoing implementations of the fourth aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the fourth aspect or the foregoing implementations of the fourth aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the fourth aspect or the foregoing implementations of the fourth aspect, the second ultra-wideband base station and the third ultra-wideband base station are installed on a same plane as the first ultra-wideband base station.

According to any one of the fourth aspect or the foregoing implementations of the fourth aspect, the second ultra-wideband base station needs to be installed in a first direction of the first ultra-wideband base station, and/or the third ultra-wideband base station needs to be installed in a second direction of the first ultra-wideband base station.

According to any one of the fourth aspect or the foregoing implementations of the fourth aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the fourth aspect or the foregoing implementations of the fourth aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to either the fourth aspect or the foregoing implementation of the fourth aspect, the displaying, by the first electronic device, the control window of the second electronic device in response to detecting that the first electronic device is located in the front area of the second electronic device and points to the second electronic device includes: in response to detecting that the first electronic device is located at a fifth position outside the second electronic device, obtaining, by the first electronic device, fifth coordinates of the first electronic device that are based on the first ultra-wideband base station, and determining, by the first electronic device based on the first coordinates, the second coordinates, the third coordinates, the fourth coordinates, the fifth coordinates, and a pointing direction of the first electronic device, whether the first electronic device is located in the front area of the second electronic device and whether the first electronic device points to the second electronic device.

According to any one of the fourth aspect or the foregoing implementations of the fourth aspect, the first electronic device obtains, based on the fifth coordinates, coordinate values of the fifth position in a third coordinate system, and determines, based on the coordinate values of the fifth position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the fourth aspect or the foregoing implementations of the fourth aspect, the straight line on which the pointing direction of the first electronic device is located is obtained based on the inertia measurement unit module.

Any one of the fourth aspect and the implementations of the fourth aspect is a method technical solution corresponding to a product technical solution of any one of the first aspect and the implementations of the first aspect. For technical effects corresponding to any one of the fourth aspect or the implementations of the fourth aspect, refer to the technical effects corresponding to any one of the first aspect or the implementations of the first aspect. Details are not described herein again.

According to a fifth aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication. The first electronic device communicates with the second electronic device through another wireless communication, where the another wireless communication is different from the ultra-wideband wireless communication. The first electronic device obtains, through the ultra-wideband wireless communication, coordinates of the first electronic device that are based on the first ultra-wideband base station. The first electronic device obtains a length and a length of an edge contour of the second electronic device or a length and a width of an edge contour of a display area of the second electronic device through the another wireless communication. The method includes: in response to a first input received when the first electronic device moves to a vertex angle position of the second electronic device and an orientation of the first electronic device is the same as an orientation of the second electronic device, recording first coordinates of the first electronic device that are based on the first ultra-wideband base station as coordinates of the vertex angle position, and recording the orientation of the first electronic device as the orientation of the second electronic device; and displaying, by the first electronic device, the control window of the second electronic device in response to detecting that the first electronic device is located in a front area of the second electronic device and points to the second electronic device, where a detection result that the first electronic device is located in the front area of the second electronic device and points to the second electronic device is associated with the vertex angle position and the orientation of the second electronic device.

According to the fifth aspect, the vertex angle position is three different vertex angle positions on the edge contour of the second electronic device; or the vertex angle position is three different vertex angle positions on the edge contour of the display area of the second electronic device.

According to either the fifth aspect or the foregoing implementation of the fifth aspect, the displaying, by the first electronic device, the control window of the second electronic device in response to detecting that the first electronic device is located in the front area of the second electronic device and points to the second electronic device includes: in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the second electronic device, the width of the edge contour of the second electronic device, the second coordinates, the orientation of the second electronic device, and a pointing direction of the first electronic device, whether the first electronic device is located in the front area of the second electronic device and whether the first electronic device points to the second electronic device; or in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the display area of the second electronic device, the width of the edge contour of the display area of the second electronic device, the second coordinates, the orientation of the second electronic device, and a pointing direction of the first electronic device, whether the first electronic device is located in the front area of the second electronic device and whether the first electronic device points to the second electronic device.

According to any one of the fifth aspect or the foregoing implementations of the fifth aspect, the first electronic device obtains, based on the second coordinates, coordinate values of the second position in a third coordinate system, and determines, based on the coordinate values of the second position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the fifth aspect or the foregoing implementations of the fifth aspect, before the method is performed, the first electronic device cannot obtain position information of the second electronic device.

According to any one of the fifth aspect or the foregoing implementations of the fifth aspect, before the method is performed, the first electronic device cannot obtain orientation information of the second electronic device.

According to any one of the fifth aspect or the foregoing implementations of the fifth aspect, when the first electronic device is not located in the front area of the second electronic device, the first electronic device does not display the control window of the second electronic device.

According to any one of the fifth aspect or the foregoing implementations of the fifth aspect, when the first electronic device does not point to the second electronic device, the first electronic device does not display the control window of the second electronic device.

According to any one of the fifth aspect or the foregoing implementations of the fifth aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the fifth aspect or the foregoing implementations of the fifth aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the fifth aspect or the foregoing implementations of the fifth aspect, the second ultra-wideband base station and the third ultra-wideband base station are installed on a same plane as the first ultra-wideband base station.

According to any one of the fifth aspect or the foregoing implementations of the fifth aspect, the second ultra-wideband base station needs to be installed in a first direction of the first ultra-wideband base station, and/or the third ultra-wideband base station needs to be installed in a second direction of the first ultra-wideband base station.

According to any one of the fifth aspect or the foregoing implementations of the fifth aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the fifth aspect or the foregoing implementations of the fifth aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the fifth aspect or the foregoing implementations of the fifth aspect, the straight line on which the pointing direction of the first electronic device is located is obtained based on the inertia measurement unit module.

Any one of the fifth aspect and the implementations of the fifth aspect is a method technical solution corresponding to a product technical solution of any one of the second aspect and the implementations of the second aspect. For technical effects corresponding to any one of the fifth aspect or the implementations of the fifth aspect, refer to the technical effects corresponding to any one of the second aspect or the implementations of the second aspect. Details are not described herein again.

According to a sixth aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication, coordinates of the first electronic device that are based on the first ultra-wideband base station. The method includes: in response to a first input received when the first electronic device moves to a first vertex angle position of the second electronic device and an orientation of the first electronic device is the same as an orientation of the second electronic device, recording first coordinates of the first electronic device that are based on the first ultra-wideband base station as coordinates of the first vertex angle position, and recording the orientation of the first electronic device as the orientation of the second electronic device; recording, in response to a second input received when the first electronic device moves to a second vertex angle position of the second electronic device, second coordinates of the first electronic device that are based on the first ultra-wideband base station as coordinates of the second vertex angle position; and displaying, by the first electronic device, the control window of the second electronic device in response to detecting that the first electronic device is located in a front area of the second electronic device and points to the second electronic device, where the first vertex angle position and the second vertex angle position are different from each other; and a detection result that the first electronic device is located in the front area of the second electronic device and points to the second electronic device is associated with the first vertex angle position, the second vertex angle position, and the orientation of the second electronic device.

According to the sixth aspect, the first vertex angle position and the second vertex angle position are two different vertex angle positions on a same diagonal of an edge contour of the second electronic device; or the first vertex angle position and the second vertex angle position are two different vertex angle positions on a same diagonal of an edge contour of a display area of the second electronic device.

According to either the sixth aspect or the foregoing implementation of the sixth aspect, the displaying, by the first electronic device, the control window of the second electronic device in response to detecting that the first electronic device is located in the front area of the second electronic device and points to the second electronic device includes: in response to detecting that the first electronic device is located at a third position outside the second electronic device, obtaining, by the first electronic device, third coordinates of the first electronic device that are based on the first ultra-wideband base station, and determining, by the first electronic device based on the first coordinates, the second coordinates, the third coordinates, the orientation of the second electronic device, and a pointing direction of the first electronic device, whether the first electronic device is located in the front area of the second electronic device and whether the first electronic device points to the second electronic device.

According to any one of the sixth aspect or the foregoing implementations of the sixth aspect, the first electronic device obtains, based on the third coordinates, coordinate values of the third position in a third coordinate system, and determines, based on the coordinate values of the third position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the sixth aspect or the foregoing implementations of the first aspect, before the method is performed, the first electronic device cannot obtain position information of the second electronic device.

According to any one of the sixth aspect or the foregoing implementations of the first aspect, before the method is performed, the first electronic device cannot obtain orientation information of the second electronic device.

According to any one of the sixth aspect or the foregoing implementations of the sixth aspect, when the first electronic device is not located in the front area of the second electronic device, the first electronic device does not display the control window of the second electronic device.

According to any one of the sixth aspect or the foregoing implementations of the sixth aspect, when the first electronic device does not point to the second electronic device, the first electronic device does not display the control window of the second electronic device.

According to any one of the sixth aspect or the foregoing implementations of the sixth aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the sixth aspect or the foregoing implementations of the sixth aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the sixth aspect or the foregoing implementations of the sixth aspect, the second ultra-wideband base station and the third ultra-wideband base station are installed on a same plane as the first ultra-wideband base station.

According to any one of the sixth aspect or the foregoing implementations of the sixth aspect, the second ultra-wideband base station needs to be installed in a first direction of the first ultra-wideband base station, and/or the third ultra-wideband base station needs to be installed in a second direction of the first ultra-wideband base station.

According to any one of the sixth aspect or the foregoing implementations of the sixth aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the sixth aspect or the foregoing implementations of the sixth aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the sixth aspect or the foregoing implementations of the sixth aspect, the straight line on which the pointing direction of the first electronic device is located is obtained based on the inertia measurement unit module.

Any one of the sixth aspect and the implementations of the sixth aspect is a method technical solution corresponding to a product technical solution of any one of the third aspect and the implementations of the third aspect. For technical effects corresponding to any one of the sixth aspect or the implementations of the sixth aspect, refer to the technical effects corresponding to any one of the third aspect or the implementations of the third aspect. Details are not described herein again.

According to a seventh aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication, coordinates of the first electronic device that are based on the first ultra-wideband base station. The method further includes: recording, in response to a first input received when the first electronic device is located at a first position of the second electronic device, first coordinates of the first electronic device that are based on the first ultra-wideband base station as coordinates of the first position; recording, in response to a second input received when the first electronic device is located at a second position of the second electronic device, second coordinates of the first electronic device that are based on the first ultra-wideband base station as coordinates of the second position; recording, in response to a third input received when the first electronic device is located at a third position of the second electronic device, third coordinates of the first electronic device that are based on the first ultra-wideband base station as coordinates of the third position; recording, in response to a fourth input received when the first electronic device is located at a fourth position that is in a front area and that is outside the second electronic device, fourth coordinates of the first electronic device that are based on the first ultra-wideband base station as coordinates of the fourth position; and displaying, by the first electronic device, the control window of the second electronic device in response to detecting that the first electronic device is located in the front area of the second electronic device and points to the second electronic device, where any two of the first position, the second position, and the third position are different. The first electronic device obtains a position of the second electronic device in space based on the first location, the second position, and the third location. The first electronic device obtains an orientation of the second electronic device in space based on the first position, the second position, the third position, and the fourth position.

In this way, a position and an orientation of the second electronic device in space may be determined based on location marking performed by the first electronic device on the second electronic device four times, to determine whether the first electronic device is located in the front area of the second electronic device and points to the second electronic device. Even if a circuit or module for implementing precise positioning is upgraded or replaced for none of second electronic devices, the technical solutions provided in this application can enable a first electronic device of a user to point to a second electronic device that is not configured with the foregoing circuit or module. Moreover, the second electronic device can be located after the first electronic device is located in a front area of the second electronic device and points to the second electronic device, to quickly display a control window of the second electronic device. This facilitates user control, saves time, and improves user experience. In addition, for a second electronic device having a display screen, in the technical solutions provided in this application, a cursor corresponding to the first electronic device can be further displayed on the display screen of the second electronic device, so that a user can control the second electronic device by using the first electronic device more conveniently, and user experience is better.

Optionally, the first position, the second position, and the third position may be schematically displayed in the display area of the second electronic device. Further, the fourth position may be further schematically displayed in the display area of the second electronic device. Optionally, the first position, the second position, and the third position may be schematically displayed on a display screen of the first electronic device. Further, the fourth position may be further schematically displayed on the display screen of the first electronic device. In this way, a user may be provided with schematic use, to facilitate use by the user.

According to the seventh aspect, before the method is performed, the first electronic device cannot obtain position information of the second electronic device.

According to any one of the seventh aspect or the foregoing implementations of the first aspect, before the method is performed, the first electronic device cannot obtain orientation information of the second electronic device.

According to the seventh aspect, when the first electronic device is not located in the front area of the second electronic device, the first electronic device does not display the control window of the second electronic device.

According to any one of the seventh aspect or the foregoing implementations of the first aspect, when the first electronic device does not point to the second electronic device, the first electronic device does not display the control window of the second electronic device.

According to any one of the seventh aspect or the foregoing implementations of the seventh aspect, the first position, the second position, and the third position are three different positions on the second electronic device; or the first position, the second position, and the third position are three different positions in the display area of the second electronic device. The first position, the second position, and the third position are not limited to vertex corner positions, and may be all or some of the positions may be non-vertex corner positions. The first electronic device can obtain a length and a width of an edge contour of the second electronic device through calculation based on the first position, the second position, and the third position. Alternatively, the first electronic device can obtain a length and a width of an edge contour of the display area of the second electronic device through calculation based on the first position, the second position, and the third position.

According to any one of the seventh aspect or the foregoing implementations of the seventh aspect, the first ultra-wideband base station includes three antennas, and communicates with the first electronic device by using the three antennas through the ultra-wideband wireless communication.

According to any one of the seventh aspect or the foregoing implementations of the seventh aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first vertex angle position of the second electronic device, the first electronic device further performs calibration relative to the first coordinate system.

According to any one of the seventh aspect or the foregoing implementations of the seventh aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first vertex angle position of the second electronic device, the first electronic device further performs calibration relative to the first coordinate system.

According to any one of the seventh aspect or the foregoing implementations of the seventh aspect, the second ultra-wideband base station and the third ultra-wideband base station are installed on a same plane as the first ultra-wideband base station.

According to any one of the seventh aspect or the foregoing implementations of the seventh aspect, the second ultra-wideband base station needs to be installed in a first direction of the first ultra-wideband base station, and/or the third ultra-wideband base station needs to be installed in a second direction of the first ultra-wideband base station.

According to any one of the seventh aspect or the foregoing implementations of the seventh aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the seventh aspect or the foregoing implementations of the seventh aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the seventh aspect or the foregoing implementations of the seventh aspect, the displaying, by the first electronic device, the control window of the second electronic device in response to detecting that the first electronic device is located in the front area of the second electronic device and points to the second electronic device includes: in response to detecting that the first electronic device is located at a fifth position outside the second electronic device, obtaining, by the first electronic device, fifth coordinates of the first electronic device that are based on the first ultra-wideband base station, and determining, by the first electronic device based on the first coordinates, the second coordinates, the third coordinates, the fourth coordinates, the fifth coordinates, and a pointing direction of the first electronic device, whether the first electronic device is located in the front area of the second electronic device and whether the first electronic device points to the second electronic device.

According to any one of the seventh aspect or the foregoing implementations of the seventh aspect, the first electronic device obtains, based on the fifth coordinates, coordinate values of the fifth position in a third coordinate system, and determines, based on the coordinate values of the fifth position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the seventh aspect or the foregoing implementations of the seventh aspect, the first electronic device obtains, based on the fifth coordinates, a component of coordinate values of the fifth position in a third coordinate system on a coordinate axis of the third coordinate system, and determines, based on the coordinate values of the fifth position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the seventh aspect or the foregoing implementations of the seventh aspect, the straight line on which the pointing direction of the first electronic device is located is obtained based on the inertia measurement unit module.

According to an eighth aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication. The first electronic device communicates with the second electronic device through another wireless communication, where the another wireless communication is different from the ultra-wideband wireless communication. The first electronic device obtains, through the ultra-wideband wireless communication, coordinates of the first electronic device that are based on the first ultra-wideband base station. The first electronic device obtains a length and a width of an edge contour of the second electronic device or a length and a width of an edge contour of a display area of the second electronic device through the another wireless communication. The method includes: in response to a first input received when the first electronic device moves to a first position of the second electronic device and an orientation of the first electronic device is the same as an orientation of the second electronic device, recording first coordinates of the first electronic device that are based on the first ultra-wideband base station as coordinates of the first position, and recording the orientation of the first electronic device as the orientation of the second electronic device; displaying, by the first electronic device, the control window of the second electronic device in response to detecting that the first electronic device is located in a front area of the second electronic device and points to the second electronic device, where a detection result that the first electronic device is located in the front area of the second electronic device and points to the second electronic device is associated with the position and the orientation of the second electronic device.

According to the eighth aspect, the first position is a position on the second electronic device; or the first position is a position in the display area of the second electronic device.

According to any one of the eighth aspect or the foregoing implementations of the eighth aspect, the displaying, by the first electronic device, the control window of the second electronic device in response to detecting that the first electronic device is located in the front area of the second electronic device and points to the second electronic device includes: in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the second electronic device, the width of the edge contour of the second electronic device, the second coordinates, the orientation of the second electronic device, and a pointing direction of the first electronic device, whether the first electronic device is located in the front area of the second electronic device and whether the first electronic device points to the second electronic device; or in response to detecting that the first electronic device is located at a second position outside the second electronic device, obtaining, by the first electronic device, second coordinates of the first electronic device that are based on the first ultra-wideband base station, and determining, by the first electronic device based on the first coordinates, the length of the edge contour of the display area of the second electronic device, the width of the edge contour of the display area of the second electronic device, the second coordinates, the orientation of the second electronic device, and a pointing direction of the first electronic device, whether the first electronic device is located in the front area of the second electronic device and whether the first electronic device points to the second electronic device.

According to any one of the eighth aspect or the foregoing implementations of the eighth aspect, the first electronic device obtains, based on the second coordinates, coordinate values of the second position in a third coordinate system, and determines, based on the coordinate values of the second position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the eighth aspect or the foregoing implementations of the eighth aspect, the first electronic device obtains, based on the second coordinates, a component of coordinate values of the second position in a third coordinate system on a coordinate axis of the third coordinate system, and determines, based on the coordinate values of the second position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the eighth aspect or the foregoing implementations of the eighth aspect, when the first electronic device is not located in the front area of the second electronic device, the first electronic device does not display the control window of the second electronic device.

According to any one of the eighth aspect or the foregoing implementations of the eighth aspect, when the first electronic device does not point to the second electronic device, the first electronic device does not display the control window of the second electronic device.

According to any one of the eighth aspect or the foregoing implementations of the eighth aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first position of the second electronic device, the first electronic device further performs calibration relative to the first coordinate system.

According to any one of the eighth aspect or the foregoing implementations of the eighth aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first position of the second electronic device, the first electronic device further performs calibration relative to the first coordinate system.

According to any one of the eighth aspect or the foregoing implementations of the eighth aspect, the second ultra-wideband base station and the third ultra-wideband base station are installed on a same plane as the first ultra-wideband base station.

According to any one of the eighth aspect or the foregoing implementations of the eighth aspect, the second ultra-wideband base station needs to be installed in a first direction of the first ultra-wideband base station, and/or the third ultra-wideband base station needs to be installed in a second direction of the first ultra-wideband base station.

According to any one of the eighth aspect or the foregoing implementations of the eighth aspect, the second electronic device does not include an ultra-wideband module, or the second electronic device includes an ultra-wideband module but the ultra-wideband module is unavailable.

According to any one of the eighth aspect or the foregoing implementations of the eighth aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the eighth aspect or the foregoing implementations of the eighth aspect, the straight line on which the pointing direction of the first electronic device is located is obtained based on the inertia measurement unit module.

For technical effects corresponding to any one of the eighth aspect or the implementations of the eighth aspect, refer to the technical effects corresponding to any one of the seventh aspect or the implementations of the seventh aspect. Details are not described herein again.

According to a ninth aspect, a method for displaying a control window of a second electronic device is provided. The method is applied to a first electronic device. The first electronic device includes an ultra-wideband module and an inertia measurement unit module. The first electronic device communicates with a first ultra-wideband base station through ultra-wideband wireless communication. The first electronic device obtains, through the ultra-wideband wireless communication, coordinates of the first electronic device that are based on the first ultra-wideband base station. The method includes: in response to a first input received when the first electronic device moves to a first position of the second electronic device and an orientation of the first electronic device is the same as an orientation of the second electronic device, recording first coordinates of the first electronic device that are based on the first ultra-wideband base station as coordinates of the first position, and recording the orientation of the first electronic device as the orientation of the second electronic device; recording, in response to a second input received when the first electronic device moves to a second position of the second electronic device, second coordinates of the first electronic device that are based on the first ultra-wideband base station as coordinates of the second position; displaying, by the first electronic device, the control window of the second electronic device in response to detecting that the first electronic device is located in a front area of the second electronic device and points to the second electronic device, where the first position and the second position are different from each other; and a detection result that the first electronic device is located in the front area of the second electronic device and points to the second electronic device is associated with the first position, the second position, and the orientation of the second electronic device.

According to the ninth aspect, the displaying, by the first electronic device, the control window of the second electronic device in response to detecting that the first electronic device is located in a front area of the second electronic device and points to the second electronic device includes: in response to detecting that the first electronic device is located at a third position outside the second electronic device, obtaining, by the first electronic device, third coordinates of the first electronic device that are based on the first ultra-wideband base station, and determining, by the first electronic device based on the first coordinates, the second coordinates, the third coordinates, the orientation of the second electronic device, and a pointing direction of the first electronic device, whether the first electronic device is located in the front area of the second electronic device and whether the first electronic device points to the second electronic device.

According to any one of the ninth aspect or the foregoing implementations of the ninth aspect, the first electronic device obtains, based on the third coordinates, coordinate values of the third position in a third coordinate system, and determines, based on the coordinate values of the third position in the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the ninth aspect or the foregoing implementations of the ninth aspect, the first electronic device obtains, based on the third coordinates, coordinate values of the third position in a third coordinate system, and determines, based on a component of the coordinate values of the third position in the third coordinate system on a coordinate axis of the third coordinate system, whether the first electronic device is located in the front area of the second electronic device, where the third coordinate system is a coordinate system established by the second electronic device, or the third coordinate system is a coordinate system preset on the second electronic device; and the first electronic device determines, depending on whether a falling point, on the second electronic device, of a straight line on which the pointing direction of the first electronic device is located is within an area formed by the edge contour of the second electronic device, whether the first electronic device points to the second electronic device; or the first electronic device determines, depending on whether a falling point, on the second electronic device, of a straight line on which the pointing direction of the first electronic device is located is within an area formed by the edge contour of the display area of the second electronic device, whether the first electronic device points to the second electronic device.

According to any one of the ninth aspect or the foregoing implementations of the ninth aspect, before the first electronic device performs the foregoing operations, the first electronic device cannot obtain position information of the second electronic device.

According to any one of the ninth aspect or the foregoing implementations of the ninth aspect, before the first electronic device performs the foregoing operations, the first electronic device cannot obtain orientation information of the second electronic device.

According to any one of the ninth aspect or the foregoing implementations of the ninth aspect, when the first electronic device is not located in the front area of the second electronic device, the first electronic device does not display the control window of the second electronic device.

According to any one of the ninth aspect or the foregoing implementations of the ninth aspect, when the first electronic device does not point to the second electronic device, the first electronic device does not display the control window of the second electronic device.

According to any one of the ninth aspect or the foregoing implementations of the ninth aspect, the coordinates of the first electronic device that are based on the first ultra-wideband base station include: coordinates of the first electronic device that are based on a first coordinate system of the first ultra-wideband base station, where the first coordinate system is a coordinate system established by the first ultra-wideband base station, or the first coordinate system is a coordinate system preset on the first ultra-wideband base station; and before responding to the first input received when the first electronic device is located at the first position of the second electronic device, the first electronic device further performs calibration relative to the first coordinate system.

According to any one of the ninth aspect or the foregoing implementations of the ninth aspect, the first electronic device further communicates with a second ultra-wideband base station and a third ultra-wideband base station through ultra-wideband wireless communication; any one of the first ultra-wideband base station, the second ultra-wideband base station, and the third ultra-wideband base station includes one antenna; and the first ultra-wideband base station, the second ultra-wideband base station, and the third ultra-wideband base station communicate with the first electronic device by using respective antennas through the ultra-wideband wireless communication; the coordinates of the first electronic device that are based on the first ultra-wideband base station include: coordinates of the first electronic device that are based on a first coordinate system of the first ultra-wideband base station, the second ultra-wideband base station, and the third ultra-wideband base station, where the first coordinate system is a coordinate system established by the first ultra-wideband base station, the second ultra-wideband base station, and the third ultra-wideband base station, or the first coordinate system is a coordinate system preset on the first ultra-wideband base station, the second ultra-wideband base station, and the third ultra-wideband base station; and before responding to the first input received when the first electronic device is located at the first position of the second electronic device, the first electronic device further performs calibration relative to the first coordinate system.

According to any one of the ninth aspect or the foregoing implementations of the ninth aspect, the second ultra-wideband base station and the third ultra-wideband base station are installed on a same plane as the first ultra-wideband base station.

According to any one of the ninth aspect or the foregoing implementations of the ninth aspect, the second ultra-wideband base station needs to be installed in a first direction of the first ultra-wideband base station, and/or the third ultra-wideband base station needs to be installed in a second direction of the first ultra-wideband base station.

According to any one of the ninth aspect or the foregoing implementations of the ninth aspect, the first electronic device communicates with the second electronic device through another wireless communication, where the another wireless communication is different from the ultra-wideband wireless communication; and the second electronic device does not include an ultra-wideband module, or the second electronic device includes an ultra-wideband module but the ultra-wideband module is unavailable.

According to any one of the ninth aspect or the foregoing implementations of the ninth aspect, that the first electronic device obtains, through the ultra-wideband wireless communication, coordinates of the first electronic device that are based on the first ultra-wideband base station includes: The first electronic device obtains, in real time or periodically through the ultra-wideband wireless communication, the coordinates of the first electronic device that are based on the first ultra-wideband base station.

According to any one of the ninth aspect or the foregoing implementations of the ninth aspect, the straight line on which the pointing direction of the first electronic device is located is obtained based on the inertia measurement unit module.

For technical effects corresponding to any one of the ninth aspect or the implementations of the ninth aspect, refer to the technical effects corresponding to any one of the seventh aspect or the implementations of the seventh aspect. Details are not described herein again.

This application further provides technical solutions of first electronic devices that are in a one-to-one correspondence with any one of the seventh aspect or the implementations of the seventh aspect, any one of the eighth aspect or the implementations of the eighth aspect, and any one of the ninth aspect or the implementations of the ninth aspect. Details are not described herein. However, a person skilled in the art understands that the technical solutions of the first electronic devices that are in the one-to-one correspondence with any one of the seventh aspect or the implementations of the seventh aspect, any one of the eighth aspect or the implementations of the eighth aspect, and any one of the ninth aspect or the implementations of the ninth aspect also fall within the scope of this application.

According to a tenth aspect, a computer-readable storage medium is provided. The computer-readable storage medium includes a computer program. When the computer program is run on a first electronic device, the first electronic device is enabled to perform the method according to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect.

For technical effects corresponding to the tenth aspect and any implementation of the tenth aspect, refer to the technical effects corresponding to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect. Details are not described herein again.

According to an eleventh aspect, a computer program product is provided. When the computer program product runs on a first electronic device, the first electronic device is enabled to perform the method according to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect.

For technical effects corresponding to the eleventh aspect and any implementation of the eleventh aspect, refer to the technical effects corresponding to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect. Details are not described herein again.

According to a twelfth aspect, a communication system is provided. The communication system includes a first electronic device, a second electronic device, and a first ultra-wideband base station. The first electronic device includes an ultra-wideband module and an inertia measurement unit module. The first electronic device communicates with the first ultra-wideband base station through ultra-wideband wireless communication, the first electronic device communicates with the second electronic device through another wireless communication, and the another wireless communication is different from the ultra-wideband wireless communication. The first electronic device obtains, through the ultra-wideband wireless communication, coordinates of the first electronic device that are based on the first ultra-wideband base station. The second electronic device does not include an ultra-wideband module, or the second electronic device includes an ultra-wideband module but the ultra-wideband module is unavailable. The first electronic device is configured to perform the method according to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect.

For technical effects corresponding to the twelfth aspect and any implementation of the twelfth aspect, refer to the technical effects corresponding to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect. Details are not described herein again.

According to a thirteenth aspect, a chip system is provided. The chip system includes one or more interface circuits and one or more processors. The interface circuit and the processor are connected to each other through a line. The chip system may be applied to a first electronic device including a communication module and a memory. The interface circuit is configured to receive a signal from the memory in the electronic device, and send the received signal to the processor, and the signal includes computer instructions stored in the memory. When the processor executes the computer instructions, the first electronic device may perform the method according to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect.

For technical effects corresponding to the thirteenth aspect and any implementation of the thirteenth aspect, refer to the technical effects corresponding to any one of the fourth aspect or the implementations of the fourth aspect, any one of the fifth aspect or the implementations of the fifth aspect, any one of the sixth aspect or the implementations of the sixth aspect, any one of the seventh aspect or the implementations of the seventh aspect, any one of the eighth aspect or the implementations of the eighth aspect, or any one of the ninth aspect or the implementations of the ninth aspect. Details are not described herein again.

BRIEF DESCRIPTION OF THE DRAWINGS

FIG. 4 is a schematic diagram of a hardware structure of an ultra-wideband (ultra-wideband, UWB) base station according to an embodiment of this application;

FIG. 5 is a schematic flowchart of a method for displaying a control window of a second electronic device according to an embodiment of this application;

FIG. 13 is a schematic diagram of an elevation angle $\varphi_e^b$, an azimuth $\psi_e^b$, and a roll angle $\theta_e^b$ of a second coordinate system relative to a first coordinate system according to an embodiment of this application;

FIG. 14 is a schematic diagram of an elevation angle $\varphi_e^t$, an azimuth $\psi_e^t$, and a roll angle $\theta_e^t$ of a third coordinate system relative to a first coordinate system according to an embodiment of this application;

FIG. 16(a) and FIG. 16(b) to FIG. 21 are schematic diagrams of a user interface for a method for displaying a control window of a second electronic device according to an embodiment of this application;

FIG. 22 is another schematic flowchart of a method for displaying a control window of a second electronic device according to an embodiment of this application;

FIG. 23 is another schematic flowchart of marking, by a first electronic device, a second electronic device in a method for displaying a control window of the second electronic device according to an embodiment of this application;

FIG. 24 is a schematic diagram of marking, by a first electronic device, a second electronic device in a method for displaying a control window of the second electronic device according to an embodiment of this application;

FIG. 25 is another schematic diagram of marking, by a first electronic device, a second electronic device in a method for displaying a control window of the second electronic device according to an embodiment of this application;

DETAILED DESCRIPTION OF ILLUSTRATIVE EMBODIMENTS

The following describes the technical solutions in embodiments of this application with reference to the accompanying drawings in embodiments of this application. In the descriptions of embodiments of this application, terms used in the following embodiments are merely intended to describe purposes of specific embodiments, but are not intended to limit this application. The terms "a", "the", and "the foregoing" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The term "and/or" is a description of an association relationship between associated objects and indicates that three relationships may exist. For example, A and/or B may indicate that only A exists, both A and B exist, and only B exists, where A and B may be singular or plural. A character "/" generally denotes an "or" relationship between the associated objects.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in still some other embodiments" that appear at different places in this specification do not necessarily refer to a same embodiment, but mean "one or more but not all embodiments", unless otherwise specifically emphasized in another manner. The terms "include", "comprise", "have", and variants thereof all mean "include but are not limited to", unless otherwise specifically emphasized in another manner. The term "connection" includes a direct connection and an indirect connection, unless otherwise indicated. "First" and "second" are merely intended for a purpose of description, and shall not be understood as an indication or implication of relative importance or implicit indication of the number of indicated technical features.

In embodiments of this application, the word "example", "for example", or the like is for representing giving an example, an illustration, or a description. Any embodiment or design solution described as "example" or "for example" in embodiments of this application should not be explained as being more preferred or having more advantages than another embodiment or design solution. Exactly, use of the word "example", "for example", or the like is intended to present a related concept in a specific manner.

Figure 1:
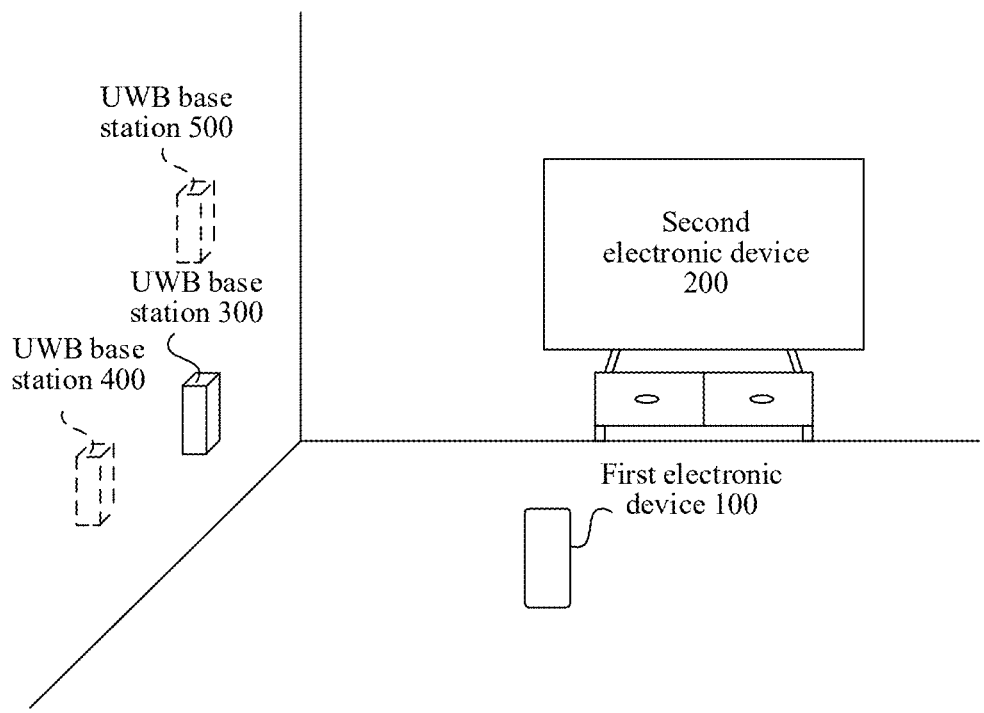
FIG. 1 is a schematic diagram of a scenario of a method for displaying a control window of a second electronic device according to an embodiment of this application.

FIG. 1 is a schematic diagram of a scenario of a method for displaying a control window of a second electronic device according to an embodiment of this application. As shown in FIG. 1, a first electronic device 100, a second electronic device 200, a UWB base station 300, a UWB base station 400, and a UWB base station 500 are located in same space. For example, the same space includes a same room. The first electronic device 100 includes a UWB module. The second electronic device 200 does not include a UWB module. The UWB module may include at least one of the following: a UWB tag, a UWB chip, and the like. For example, the UWB base station 300, the UWB base station 400 (optional), and the UWB base station 500 (optional) are fixed on a wall. Preferably, the UWB base station 300, the UWB base station 400 (optional), and the UWB base station 500 (optional) are fixed on the ceiling of the roof of a room. The first electronic device 100 further includes an inertia measurement unit (inertial measurement unit, IMU) module. The IMU module may include at least one of the following: an IMU chip, an IMU tag, and the like. For example, the first electronic device 100 may perform wireless communication with the UWB base station 300, the UWB base station 400, and the UWB base station 500 via the UWB module. The first electronic device 100 may perform wireless communication with the second electronic device 200, and a manner of wireless communication between the first electronic device 100 and the second electronic device 200 includes but is not limited to: wireless fidelity (wireless fidelity, Wi-Fi), Bluetooth (Bluetooth, BT), infrared, and ZigBee (ZigBee). Optionally, the first electronic device 100 and the second electronic device 200 may perform wireless communication through Wi-Fi peer-to-peer (peer-to-peer, P2P). Optionally, the first electronic device 100 and the second electronic device 200 may perform wireless communication through Bluetooth low energy (Bluetooth low energy, BLE). Optionally, the first electronic device 100 and the second electronic device 200 may be located in a same wireless local area network for communication. For example, the first electronic device 100 and the second electronic device 200 access a same router.

Optionally, as shown in FIG. 1, the first electronic device 100, the second electronic device 200, the UWB base station 300, the UWB base station 400, and the UWB base station 500 may form a communication system. In this case, each of the UWB base station 300, the UWB base station 400, and the UWB base station 500 includes at least one antenna.

It should be noted that, in FIG. 1, the UWB base station 400 and the UWB base station 500 are not necessary. To be specific, in FIG. 1, a quantity of UWB base stations is not necessarily at least three, and there may be only one UWB base station, for example, there is only one UWB base station 300. In this case, the UWB base station 300 needs to include at least three antennas. In this case, the first electronic device 100, the second electronic device 200, and the UWB base station 300 may form a communication system. That is, there are at least three UWB base stations or there is one UWB base station.

Optionally, the communication system may further include a router. The first electronic device 100, the second electronic device 200, the UWB base station 300, the UWB base station 400, and the UWB base station 500 may be connected to a same Wi-Fi network by using the router; or the first electronic device 100, the second electronic device 200, and the UWB base station 300 may be connected to a same Wi-Fi network by using the router. This is not limited in this application.

The first electronic device 100 may integrate control functions of different control devices (for example, a remote control of a smart television and a remote control of a smart air conditioner) of different second electronic devices, so that the first electronic device 100 may locate the second electronic device 200 after pointing to the second electronic device 200, and display a control window of the second electronic device 200. This reduces user operations and reduces time consumption. However, the second electronic device 200 needs to be configured with a circuit or module for precise positioning, causing an excessive cost increase of the second electronic device 200. In particular, this requires the foregoing circuit or module to be configured for all second electronic devices, for example, at home or in an office, causing a significant increase in costs. A common family or a common company may be unwilling to upgrade all second electronic devices or perform replacement in all second electronic devices due to cost considerations. In addition, sometimes, when the first electronic device points to the second electronic device from the back of the second electronic device, the control window of the second electronic device is also displayed, which is not intended by a user, and therefore brings inconvenience to the user.

Therefore, how to enable the first electronic device to accurately display the control window of the second electronic device in a low-cost manner to reduce or even avoid mis-display of the control window and facilitate user control is a technical problem to be resolved.

To resolve the foregoing technical problem, this application provides a first electronic device and a method for displaying a control window of a second electronic device. Even if none of second electronic devices is configured with the foregoing circuit or module for implementing precise positioning, the technical solutions provided in this application can enable a first electronic device of a user to point to a second electronic device that is not configured with the foregoing circuit or module. Moreover, after the first electronic device is located in a front area of the second electronic device and points to the second electronic device, the first electronic device can quickly display a control window of the second electronic device. This brings significant convenience to the user, reduces costs, and improves user experience. In other words, in the technical solutions provided in this application, in a low-cost manner, after the first electronic device points to the second electronic device from the front area of the second electronic device, the first electronic device can quickly display the control window of the second electronic device. The first electronic device is configured with a circuit or module for implementing precise positioning, and the second electronic device is not configured with a circuit or module for implementing precise positioning.

Figure 2:
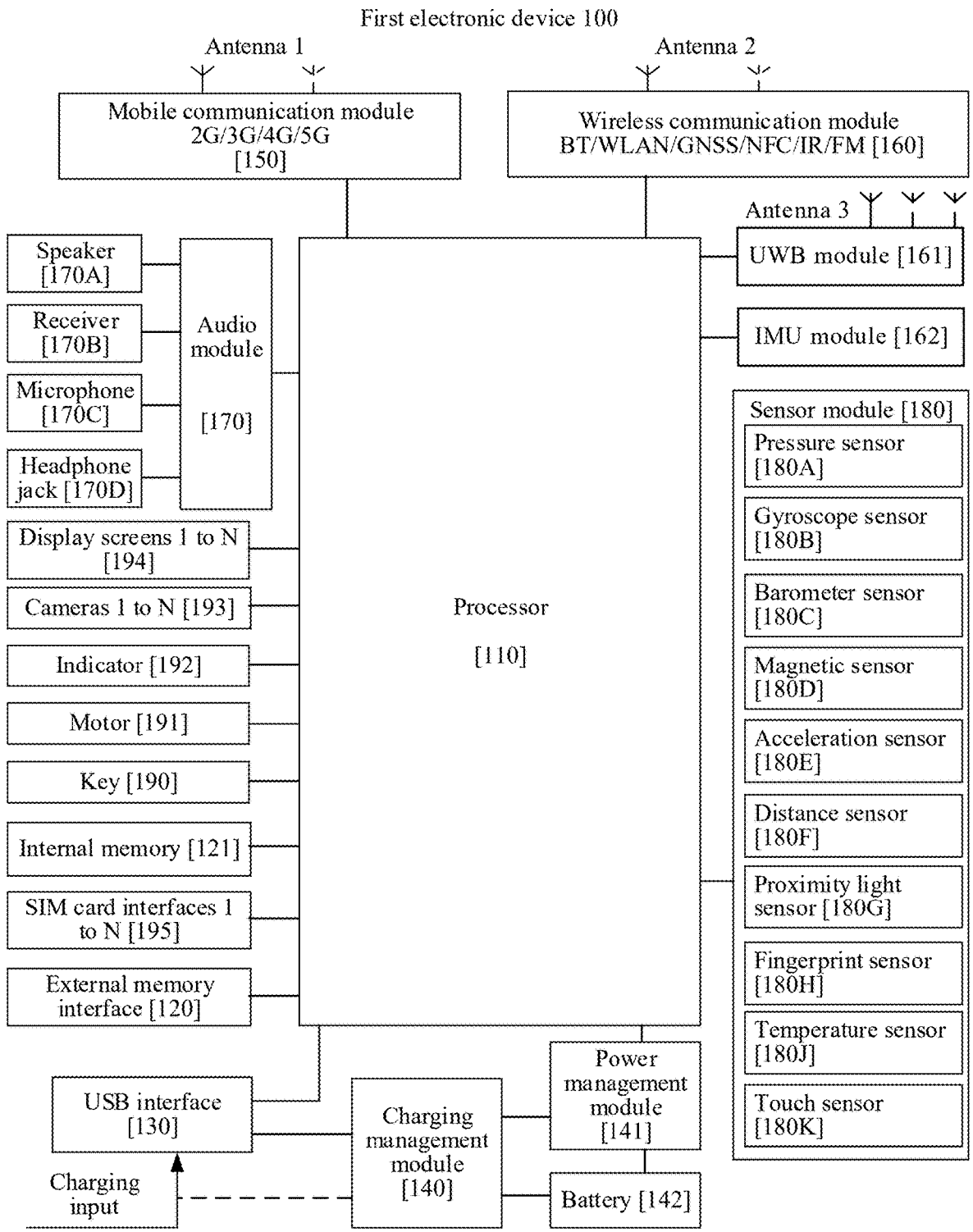
FIG. 2 is a schematic diagram of a hardware structure of a first electronic device according to an embodiment of this application.

For example, FIG. 2 is a schematic diagram of a hardware structure of a first electronic device according to an embodiment of this application. As shown in FIG. 2, the first electronic device 100 may include a processor no, an external memory interface 120, an internal memory 121, a universal serial bus (universal serial bus, USB) interface 130, a charging management module 140, a power management module 141, a battery 142, an antenna 1, an antenna 2, an antenna 3, a mobile communication module 150, a wireless communication module 160, a UWB module 161, an IMU module 162, an audio module 170, a speaker 170A, a receiver 170B, a microphone 170C, a headphone jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometer sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor, a bone conduction sensor, and the like. For example, the first electronic device wo is movable.

It may be understood that the structure illustrated in this embodiment of this application does not constitute a specific limitation on the first electronic device 100. In some other embodiments of this application, the first electronic device 100 may include more or fewer components than those shown in the figure, some components may be combined, some components may be split, or different component arrangements may be used. The components shown in the figure may be implemented by hardware, software, or a combination of software and hardware.

The charging management module 140 is configured to receive charging input from a charger. The power management module 141 is configured to connect to the battery 142, the charging management module 140, and the processor no. A wireless communication function of the first electronic device 100 may be implemented by using the antenna 1, the antenna 2, the antenna 3, the UWB module 161, the mobile communication module 150, the wireless communication module 160, a modem processor, a baseband processor, and the like.

The antenna 1, the antenna 2, and the antenna 3 are configured to transmit and receive electromagnetic wave signals. Each antenna in the first electronic device 100 may be configured to cover one or more communication frequency bands. Different antennas may be further reused, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution that includes 2G/3G/4G/5G and that is applied to the first electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110.

The wireless communication module 160 may provide a wireless communication solution that is applied to the first electronic device 100 and that includes a wireless local area network (wireless local area network, WLAN) (for example, a wireless fidelity network), Bluetooth, a global navigation satellite system (global navigation satellite system, GNSS), frequency modulation (frequency modulation, FM), near field communication (near field communication, NFC), and infrared (infrared, IR). For example, in this embodiment of this application, the first electronic device 100 may access a Wi-Fi network by using the wireless communication module 161. For another example, in this embodiment of this application, the first electronic device may send a message to the second electronic device by using the wireless communication module 160.

The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor no. The wireless communication module 160 may further receive a to-be-sent signal from the processor no, perform frequency modulation and amplification on the signal, and convert the signal into an electromagnetic wave for radiation through the antenna 2.

The UWB module 161 may be configured to perform UWB communication with another device to obtain positioning information. The first electronic device 100 may measure a distance between the first electronic device 100 and the second electronic device 200 through UWB communication. The UWB communication belongs to wireless carrier communication, and transmits data by using a nanosecond-level non-sine narrow pulse instead of a sine carrier. Therefore, a spectrum range occupied by the UWB communication is very wide. The UWB communication has advantages of low system complexity, low transmission-signal power spectral density, insensitivity to channel fading, a low interception capability, high positioning accuracy, and the like. It is especially applicable to high-speed wireless access in densely-populated multipath areas such as indoor areas.

The UWB module 161 may be one or more devices integrating at least one communication processing module. The UWB module 161 may receive an electromagnetic wave by using the antenna 3, and send a processed signal to the processor no. The UWB module 161 may further receive a to-be-sent signal from the processor no, and convert the to-be-sent signal into an electromagnetic wave for radiation through the antenna 3.

The UWB module 161 and the wireless communication module 160 may be integrated together or separately disposed. This is not limited in this application.

The IMU module 162 may provide acceleration and an angular velocity for the first electronic device 100, and may even provide direction information (for example, an orientation and a pointing direction) for the first electronic device 100. In some embodiments, the IMU module 162 may further provide a speed, a location variation, an angle variation, and the like for the first electronic device 100. The IMU module 162 may include an accelerometer and a gyroscope, and may even include a magnetometer.

Optionally, the first electronic device further includes a filter (for example, a Kalman filter). For example, an output of the IMU module 162 and an output of the UWB module 161 may be superimposed, and a signal obtained through the superimposing may be input to a Kalman filter for filtering, thereby reducing an error.

In some embodiments, the antenna 1 of the first electronic device 100 is coupled to the mobile communication module 150, and the antenna 2 is coupled to the wireless communication module 160, so that the first electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device 100 may implement a photographing function by using an ISP, the camera 193, a video codec, a GPU, the display screen 194, an application processor, and the like.

The external memory interface 120 may be configured to connect to an external storage card, for example, a Micro SD card, to extend a storage capability of the first electronic device 100. The external memory card communicates with the processor no through the external memory interface 120, to implement a data storage function. For example, files such as music and videos are stored in the external storage card.

The first electronic device 100 may implement an audio function, such as music playback and recording, by using the audio module 170, the speaker 170A, the receiver 170B, the microphone 170C, the headphone jack 170D, the application processor, and the like.

Alternatively, the first electronic device 100 may not include the antenna 3 and the UWB module 161, but the UWB module 161 is integrated into the wireless communication module 160. Similarly, a function of communication by the first electronic device 100 with the UWB base station can also be implemented.

For example, the first electronic device 100 may be a device of a type such as a smartphone, a smart remote control, a wearable device (for example, a smart band, a smart watch, or smart glasses), a palmtop computer, an augmented reality (augmented reality, AR)/virtual reality (virtual reality, VR) device, a portable multimedia player (portable multimedia player, PMP), or a media player. A specific type of the first electronic device is not limited in this embodiment of this application.

Figure 3:
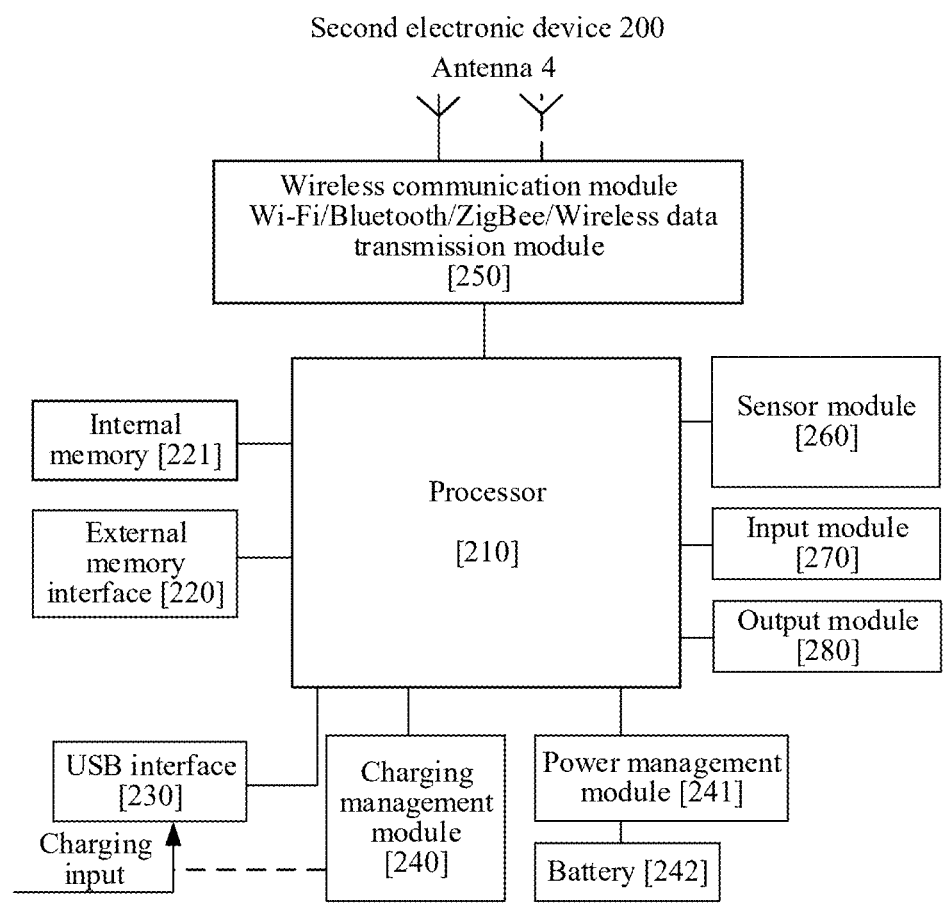
FIG. 3 is a schematic diagram of a hardware structure of a second electronic device according to an embodiment of this application.

For example, FIG. 3 is a schematic diagram of a hardware structure of a second electronic device 200 according to an embodiment of this application. As shown in FIG. 3, the second electronic device 200 may include a processor 210, an external memory interface 220, an internal memory 221, a USB interface 230, a charging management module 240, a power management module 241, a battery 242, an antenna 4, a wireless communication module 250, a sensor module 260, an input module 270, an output module 280, and the like.

The processor 210 may include one or more processing units. For example, the processor 210 may include an application processor (application processor, AP), a modem processor, a GPU, an ISP, a controller, a video codec, a digital signal processor (digital signal processor, DSP), a baseband processor, and/or a neural-network processing unit (neural-network processing unit, NPU).

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 230 is an interface that conforms to a USB standard specification, and may be specifically a mini USB interface, a micro USB interface, a USB Type-C interface, or the like.

It may be understood that, an interface connection relationship between the modules in this embodiment of this application is merely an example for description, and does not constitute a limitation on the structure of the second electronic device 200. In some other embodiments of this application, the second electronic device 200 may alternatively use different interface connection manners in the foregoing embodiments, or a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the second electronic device 200. When charging the battery 242, the charging management module 240 may further supply power to the second electronic device by using the power management module 241.

The power management module 241 is configured to connect to the battery 242, the charging management module 240, and the processor 210. The power management module 241 receives an input of the battery 242 and/or the charging management module 240, to supply power to the processor 210, the internal memory 221, the external memory interface 220, the wireless communication module 250, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210.

A wireless communication function of the second electronic device 200 may be implemented by using the antenna 4, the wireless communication module 250, and the like. The wireless communication module 250 may provide a wireless communication solution that is applied to the second electronic device 200 and that includes Wi-Fi, BLE, a wireless data transmission module (for example, 433 MHz, 868 MHz, or 915 MHz). The wireless communication module 250 may be one or more components integrating at least one communication processing module. The wireless communication module 250 receives an electromagnetic wave by using the antenna 4, performs filtering and frequency modulation processing on an electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation through the antenna 4.

The external memory interface 220 may be configured to connect to an external memory card, for example, a micro SD card, to extend a storage capability of the second electronic device 200. The external storage card communicates with the processor 210 through the external memory interface 220, to implement a data storage function. For example, files such as music and videos are stored in the external storage card.

The internal memory 221 may be configured to store one or more computer programs, and the one or more computer programs include instructions. The processor 210 may run the foregoing instructions stored in the internal memory 221, so that the second electronic device 200 performs the methods provided in some embodiments of this application, processes various applications and data, and the like. The internal memory 221 may include a code storage area and a data storage area. The code storage area may store an operating system. The data storage area may store data created in a process of using the second electronic device 200, and the like.

The input module 270 includes but is not limited to a keyboard, a touchscreen (which may also be a touchscreen), a mouse, a camera, a laser pen, a handwriting input board, a microphone, and the like. The microphone includes a single microphone, or includes a microphone array.

The output module 280 includes but is not limited to a display screen, an LED lamp, a speaker, an earphone, a motor that generates vibration and an auxiliary device thereof, a heat emitting device that generates heat, and the like.

The second electronic device 200 includes but is not limited to a smart television (for example, a smart screen), a desktop computer, a projector, a vehicle-mounted computer, a tablet computer, a portable second electronic device (for example, a laptop computer, Laptop), a smart sound box, an augmented reality (augmented reality, AR) device, a virtual reality (virtual reality, VR) device, another smart device with a display screen, and the like. An example embodiment of the second electronic device includes but is not limited to a portable or non-portable second electronic device that carries iOS®, Android®, Harmony®, Windows®, Linux, or another operating system.

It may be understood that the structure in this embodiment of this application does not constitute a specific limitation on the second electronic device 200. In some other embodiments of this application, the second electronic device 200 may include more or fewer components than those shown in the figure, some components may be combined, some components may be split, or different component arrangements may be used. The components shown in the figure may be implemented by hardware, software, or a combination of software and hardware.

In this embodiment of this application, a manner of wireless communication between the first electronic device and the second electronic device includes but is not limited to a manner of BLE, Wi-Fi awareness (Wi-Fi neighborhood aware network, Wi-Fi neighborhood aware network, NAN for short, also referred to as Wi-Fi aware), ZigBee, or the like. The wireless communication such as BLE and Wi-Fi aware is interaction performed based on a medium access control (medium access control, MAC) layer in a computer network, also referred to as interaction performed based on data link layer protocol extension, and does not need to involve upper-layer network communication at the MAC layer, and data interaction can be fully implemented at the data link layer. The BLE is an ultra-low power consumption near field wireless communication solution that is launched by a Bluetooth Special Interest Group in 2016 and that is applied to the second electronic device, and may implement communication by using the MAC layer. Wi-Fi aware is a new Wi-Fi Mesh communication technology with low power consumption and point-to-point interconnection and interworking. The technology can bypass a network infrastructure (such as an access point (access point, AP) or a cellular network) to implement one-to-one, one-to-many, or many-to-many connection and communication between devices, and may also implement communication by using the MAC layer. The first electronic device wo may specifically complete communication with the second electronic device 200 through wireless communication such as BLE or Wi-Fi aware. In the wireless communication such as BLE or Wi-Fi aware, data exchange may be directly implemented at the MAC layer in the computer network by sending a beacon frame, without involving data exchange at a network layer that is higher than the MAC layer in the computer network. Inter-device communication implemented through the wireless communication such as BLE or Wi-Fi aware can not only improve communication efficiency (where the first electronic device 100 does not need to complete steps such as Wi-Fi or Bluetooth connection and user identity login verification with the second electronic device 200, and content such as a network protocol of an upper-layer network does not need to be involved), but also improve security of data exchange (data transmission at the MAC layer).

For example, FIG. 4 is a diagram of a hardware structure of a UWB base station 300 according to an embodiment of this application. As shown in FIG. 4, the UWB base station 300 may include a wireless communication module 310, a UWB module 320, a processor 330, an internal memory 340, a power management module 350, a battery 360, a charging management module 370, an antenna 5, an antenna 6, and the like.

The processor 330 may include one or more processing units. For example, the processor 330 may include an application processor (application processor, AP), a modem processor, a GPU, an ISP, a controller, a video codec, a DSP, a baseband processor, and/or an NPU.

In some embodiments, the processor 330 may include one or more interfaces. The interface may include an I2C interface, an I2S interface, a PCM interface, a UART interface, an MIPI, a GPIO interface, a SIM card interface, and/or a USB interface.

It may be understood that, an interface connection relationship between the modules in this embodiment of this application is merely an example for description, and does not constitute a limitation on the structure of the UWB base station 300. In some other embodiments of this application, the UWB base station 300 may alternatively use different interface connection manners in the foregoing embodiments, or a combination of a plurality of interface connection manners.

The charging management module 370 is configured to receive charging input from a charger. The charger may be a wireless charger or a wired charger.

The power management module 350 is configured to connect to the battery 360, the charging management module 370, and the processor 330. The power management module 350 receives an input of the battery 360 and/or the charging management module 370, to supply power to the processor 330, the internal memory 340, the external memory interface 220, the wireless communication module 310, and the like. The power management module 350 may be further configured to monitor parameters such as a battery capacity, a quantity of battery cycles, and a battery health status (leakage and impedance).

A wireless communication function of the UWB base station 300 may be implemented by using the antenna 5, the antenna 6, the wireless communication module 310, the UWB module 320, and the like.

The UWB module 320 may provide a UWB technology applied to the UWB base station 300. The UWB base station 300 may measure a distance between a first electronic device 100 and the UWB base station 300 by using a UWB technology. Specifically, the UWB base station 300 communicates with a UWB module of the first electronic device by using the antenna 6.

The UWB module 320 and the wireless communication module 310 are integrated together or separately disposed. This is not limited in this application.

The internal memory 340 may be configured to store one or more computer programs, and the one or more computer programs include instructions.

In some embodiments, the UWB base station may be an intelligent device (for example, a router, a set-top box, a smart lamp, or a sound box) on which a UWB module is installed. In some other embodiments, the UWB base station may be a separately purchased UWB device.

It may be understood that the structure in this embodiment of this application does not constitute a specific limitation on the UWB base station 300. In some other embodiments of this application, the UWB base station 300 may include more or fewer components than those shown in the figure, some components may be combined, some components may be split, or different component arrangements may be used. The components shown in the figure may be implemented by hardware, software, or a combination of software and hardware.

For ease of description, in this embodiment of this application, three UWB base stations are used as an example to describe a method for displaying a control window of a second electronic device provided in embodiments of this application. It should be noted that a UWB base station including at least three antennas may also be applied to the method in this application. In this embodiment of this application, the first electronic device includes a UWB module, an IMU module, and a short-distance wireless communication module such as Bluetooth or Wi-Fi. The second electronic device does not include a UWB module, but includes a short-distance wireless communication module such as Bluetooth or Wi-Fi. The UWB base station may perform UWB communication with the first electronic device, and the first electronic device may perform short-distance wireless communication with the second electronic device by using the short-distance wireless communication module such as Bluetooth or Wi-Fi.

Embodiment 1

With reference to specific accompanying drawings, the following specifically describes a procedure of a method for displaying a control window of a second electronic device.

As shown in FIG. 5, the method for displaying the control window of the second electronic device provided in this embodiment of this application includes the following steps.

S510. A UWB base station, a first electronic device, and a second electronic device establish a first coordinate system, a second coordinate system, and a third coordinate system respectively.

The first coordinate system is also referred to as a UWB base station coordinate system, and is a coordinate system established by the UWB base station. The second coordinate system is also referred to as a first electronic device coordinate system, and is a coordinate system established by the first electronic device. The third coordinate system is also referred to as a second electronic device coordinate system, and is a coordinate system established by the second electronic device.

Optionally, when the UWB base station, the first electronic device, and the second electronic device are started for the first time, the first coordinate system, the second coordinate system, and the third coordinate system are established respectively. Then, the UWB base station, the first electronic device, and the second electronic device may respectively store a coordinate origin, three axes, and positive directions of the three axes of each of the first coordinate system, the second coordinate system, and the third coordinate system locally or on a server. In this way, when the UWB base station, the first electronic device, and the second electronic device are started again, the stored information is obtained locally or from the server, and the first coordinate system, the second coordinate system, and the third coordinate system do not need to be established again.

Optionally, each time the UWB base station, the first electronic device, and the second electronic device are started, the UWB base station, the first electronic device, and the second electronic device establish the first coordinate system, the second coordinate system, and the third coordinate system respectively.

For example, in a case of no specific input, any one of the UWB base station, the first electronic device, and the second electronic device uses a same manner each time a coordinate system is established. For example, each time the UWB base station is started, a manner of establishing the first coordinate system is the same. In a case of a specific input, after the UWB base station is started, a manner of establishing the first coordinate system may be different from a previous manner.

The following describes specific processes of establishing the first coordinate system, the second coordinate system, and the third coordinate system.

For example, FIG. 6(a) to FIG. 6(d) and FIG. 7 are schematic diagrams of several manners of establishing the first coordinate system in a case of at least three UWB base stations and a case of one UWB base station according to this embodiment of this application.

In the case of at least three UWB base stations, for ease of description, an example in which there are three UWB base stations is used for description. For example, when there are three UWB base stations, distribution of the three UWB base stations may be shown in FIG. 6(a) to FIG. 6(c). The UWB base station distribution manner shown in FIG. 6(a) is a preferred distribution mode of the three UWB base stations.

When there is one UWB base station, the UWB base station includes at least three antennas. For example, when the UWB base station includes three antennas, distribution of the three antennas in the UWB base station may be shown in FIG. 7. It should be noted that the distribution manner of the three antennas in the UWB base station may also be another distribution manner. For example, a connection line between an antenna 0 and an antenna 1 is not perpendicular to a connection line between the antenna 0 and an antenna 2. Possible distribution manners of the three antennas are not described one by one herein.

Figure 6A:
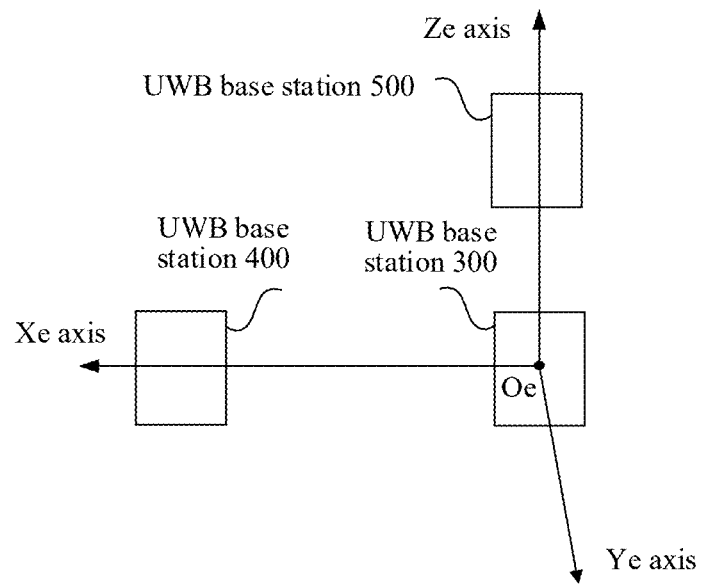
FIG. 6(a) to FIG. 6(d) are a schematic diagram of several manners of establishing a first coordinate system in a case of at least three UWB base stations according to an embodiment of this application.
Figure 6B:
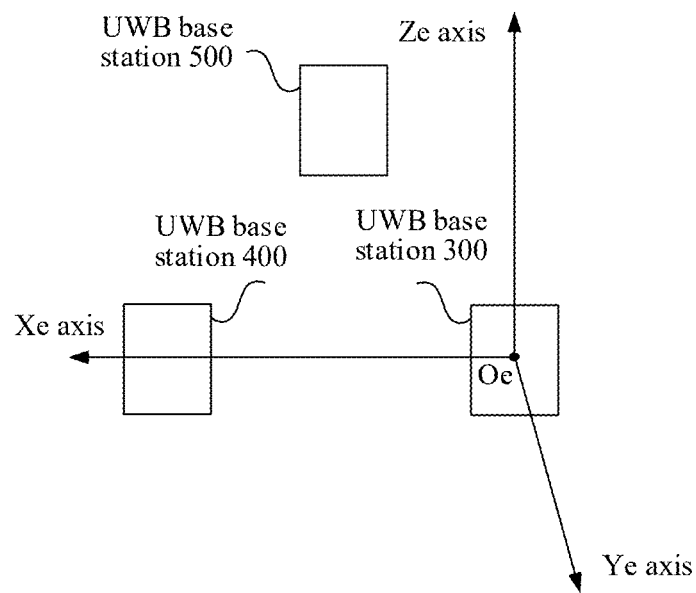
Figure 6C:
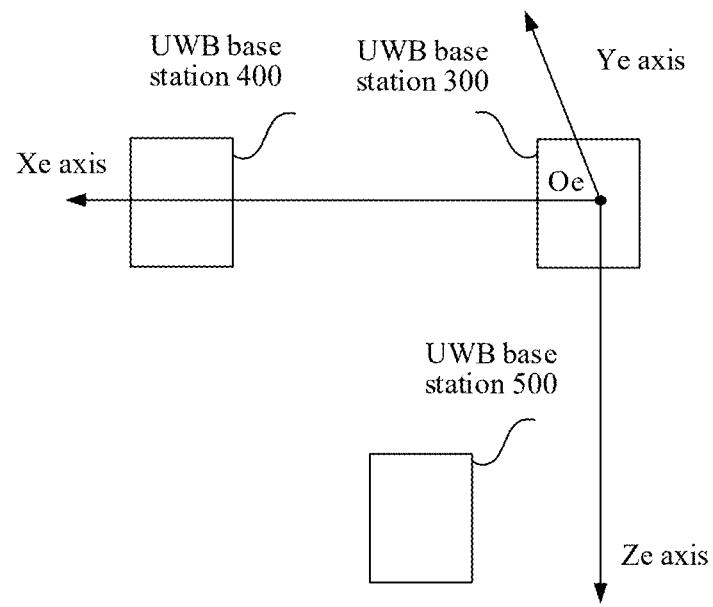

With reference to FIG. 6(a) to FIG. 6(d) and FIG. 7, the following specifically describes a process of establishing the first coordinate system. The three UWB base stations in FIG. 6(a) to FIG. 6(d) are used as an example. As shown in FIG. 6(a) to FIG. 6(c), any two of a UWB base station 300, a UWB base station 400, and a UWB base station 500 may communicate with each other, and a distance between any two UWB base stations may be determined based on communication between the two UWB base stations. For example, it is assumed that a center point of the UWB base station 300 is $O_e$, and a distance between the UWB base station 300 and the UWB base station 400 is r. Optionally, communication between UWB base stations may include identities of the UWB base stations.

Figure 6D:
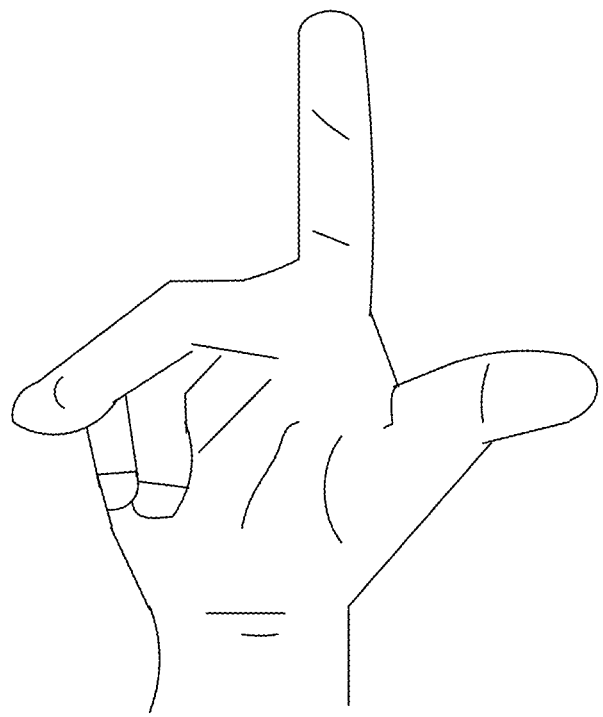

Optionally, an installation direction requirement of the two base stations is preset, and the installation personnel need to install the two base stations according to the foregoing requirement. For example, during installation, the UWB base station 400 is required to be installed on a side (for example, a horizontal left side) in a fixed direction of the UWB base station 300 and aligned with the UWB base station 300 at an equal height, and the UWB base station 300, the UWB base station 400, and the UWB base station 500 are installed on a same plane. In this case, during establishment of the first coordinate system, the UWB base station 300 takes a straight line in the horizontal left direction that passes through the point $O_e$ and that is parallel to the same plane, and takes a point on the straight line as a center point of the UWB base station 400, where the point is at a distance of r from $O_e$. Then, a connection line between the point $O_e$ and the center point of the UWB base station 400 is used as an $X_e$ axis, and a positive direction of the $X_e$ axis is from the UWB base station 300 to the UWB base station 400. Then, a direction of a $Z_e$ axis is determined based on a position relationship between the $X_e$ axis and the UWB base station 500. Finally, a direction of a $Y_e$ axis is determined based on directions of the $X_e$ axis and the $Z_e$ axis and according to a rule of a right-hand rectangular coordinate system. The right-hand rectangular coordinate system may be referred to as a right-hand system for short, and is one of methods for specifying a rectangular coordinate system in space. As shown in FIG. 6(d), positive directions of the $X_e$ axis, the $Y_e$ axis, and the $Z_e$ axis of the right-hand rectangular coordinate system are specified as follows: Place the right hand at a position of the origin, so that the thumb, the index finger, and the middle finger form a right angle, and the thumb and the index finger are in a same plane. When the thumb points to the positive direction of the $X_e$ axis and the middle finger points to the positive direction of the $Z_e$ axis, a direction pointed to by the index finger is the positive direction of the $Y_e$ axis.

Optionally, during installation, the UWB base station 400 may not be required to be installed on a side in a fixed direction of the UWB base station 300. It is assumed that a central point $O_e$ of the UWB base station 300 is an origin (0, 0, 0) of the first coordinate system, coordinates of a central point of the UWB base station 400 are (r, 0, 0), a connection line of the point $O_e$ and the central point of the UWB base station 400 is an $X_e$ axis, and a positive direction of the $X_e$ axis points from the UWB base station 300 to the UWB base station 400. Then, a direction of a $Z_e$ axis is determined based on a position relationship between the $X_e$ axis and the UWB base station 500. As shown in FIG. 6(b), if the UWB base station 500 is located above the $X_e$ axis, it is determined that the $Z_e$ axis is perpendicular to the $X_e$ axis. As shown in FIG. 6(c), if the UWB base station 500 is located below the $X_e$ axis, it is determined that the Z e axis is perpendicular to the $X_e$ axis downward. Then, for example, a direction of a $Y_e$ axis is determined based on directions of the $X_e$ axis and the $Z_e$ axis and according to a rule of a right-hand rectangular coordinate system (as shown in FIG. 6(d). Then, coordinates of the UWB base station 300, the UWB base station 400, and the UWB base station 500 may be determined. For example, coordinates of the UWB base station 500 in the first coordinate system may be determined. For a manner of determining a direction and coordinates, refer to the following reference document: Choi B, La K, Lee S. UWB TDOA/TOA measurement system with wireless time synchronization and simultaneous tag and anchor positioning[C], 2018 IEEE International Conference on Computational Intelligence and Virtual Environments for Measurement Systems and Applications (CIVEMSA). IEEE, 2018: 1-6. All content of this document is introduced in this application.

For example, the direction of the $Y_e$ axis is determined based on directions of the $X_e$ axis and the $Z_e$ axis and according to a rule of a left-hand rectangular coordinate system. The left-hand rectangular coordinate system may be referred to as a left-hand system for short, and is one of methods for specifying a rectangular coordinate system in space. Positive directions of the $X_e$ axis, the $Y_e$ axis, and the $Z_e$ axis of the left-hand rectangular coordinate system are specified as follows: Place the left hand at a position of the origin, so that the thumb, the index finger, and the middle finger form a right angle, and the thumb and the index finger are in a same plane. When the thumb points to the positive direction of the $X_e$ axis and the middle finger points to the positive direction of the $Z_e$ axis, a direction pointed to by the index finger is the positive direction of the $Y_e$ axis.

For ease of description, in this embodiment of this application, the $Y_e$ axis, a $Y_b$ axis, a $Y_t$ axis, and positive directions of the $Y_e$ axis, the $Y_b$ axis, and the $Y_t$ axis are determined according to the rule of the right-hand rectangular coordinate system. A person skilled in the art should understand that determining the $Y_e$ axis, the $Y_b$ axis, the $Y_t$ axis, and the positive directions of the $Y_e$ axis, the $Y_b$ axis, and the $Y_t$ axis according to the rule of the left-hand rectangular coordinate system or in another manner also falls within the scope of this application. In addition, names of any two or more axes of any one of the first coordinate system, the second coordinate system, and the third coordinate system may be changed provided that the foregoing rule or manner is met.

Figure 7:
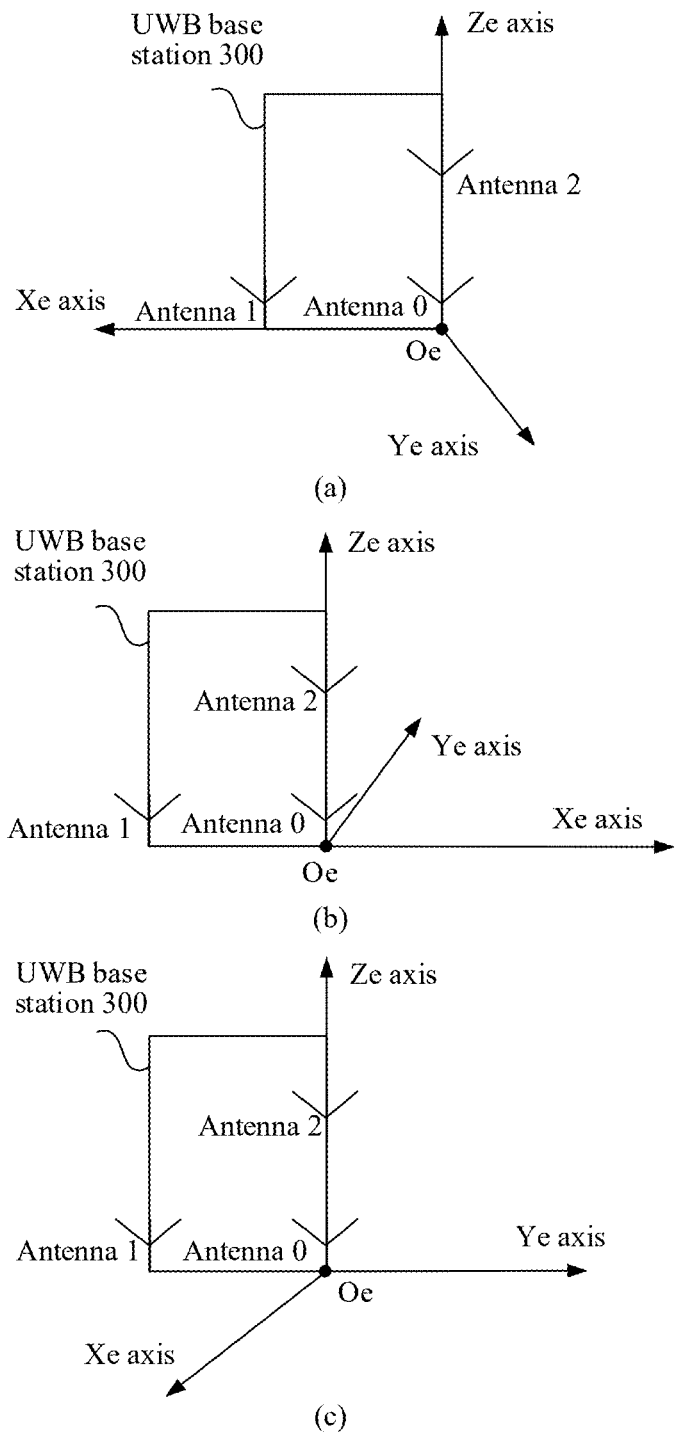
FIG. 7 is a schematic diagram of several manners of establishing a first coordinate system in a case of one UWB base station according to an embodiment of this application.

For example, in FIG. 7, there is only one UWB base station, and the UWB base station includes three antennas. The three antennas may be for constructing a first coordinate system. The antenna is configured to send and receive a UWB signal. The UWB base station establishes the first coordinate system based on a position relationship between the antennas. In some embodiments, the antennas in the UWB base station may present an L-shaped (or referred to as a right-angled triangle) distribution relationship. For example, as shown in (a) in FIG. 7 to (c) in FIG. 7, in the UWB base station, an antenna 0 and an antenna 1 are aligned in a first direction (for example, a horizontal direction), and the antenna 0 and an antenna 2 are aligned in a second direction (for example, a vertical direction). That is, the antenna 0, the antenna 1, and the antenna 2 present an L-shaped distribution relationship. The first direction is perpendicular to the second direction. Alternatively, the three antennas in the UWB base station may not be presented in an L shape, that is, the first direction is not perpendicular to the second direction. Next, the first coordinate system in FIG. 7 may be established with reference to a process of establishing the first coordinate system in FIG. 6(b) and FIG. 6(c). For example, the antennas of the UWB base station in FIG. 7 may present a distribution relationship of a triangle (for example, an equilateral triangle or an isosceles triangle) or the like. This is not limited in this application. It should be noted that a quantity of antennas of the UWB base station in FIG. 7 may be greater than 3.

The first coordinate system may be established by using a distance difference between a plurality of antennas in the UWB base station. For example, as shown in (a) in FIG. 7, coordinates of the antenna 0 may be used as an origin of the first coordinate system, a connection line between the antenna 0 and the antenna 1 is used as an $X_e$ axis of the first coordinate system, and a direction from the antenna 0 to the antenna 1 is a positive direction of the $X_e$ axis. A connection line between the antenna 0 and the antenna 2 is used as a $Z_e$ axis of the first coordinate system, and a direction from the antenna 0 to the antenna 2 is a positive direction of the $Z_e$ axis. Then, a $Y_e$ axis of the first coordinate system and a positive direction of the $Y_e$ axis are determined according to the rule of the right-hand rectangular coordinate system. For example, as shown in (b) in FIG. 7, a connection line between the antenna 0 and the antenna 1 may be used as an $X_e$ axis of the first coordinate system, and a direction from the antenna 1 to the antenna 0 is a positive direction of the $X_e$ axis; and a connection line between the antenna 0 and the antenna 2 is used as a $Z_e$ axis of the first coordinate system, and a direction from the antenna 0 to the antenna 2 is a positive direction of the $Z_e$ axis. Then, a $Y_e$ axis of the first coordinate system and a positive direction of the $Y_e$ axis are determined according to the rule of the right-hand rectangular coordinate system. It can be learned that, three axes and positive directions of the three axes in the first coordinate system may be established based on relative positions of the three antennas in the UWB base station and according to the rule of the right-hand rectangular coordinate system. For example, as shown in (c) in FIG. 7, a position of the antenna 0 may be used as an origin of the first coordinate system, a connection line between the antenna 0 and the antenna 1 is used as a $Y_e$ axis of the first coordinate system, and a direction from the antenna 1 to the antenna 0 is a positive direction of the $Y_e$ axis. A connection line between the antenna 0 and the antenna 2 is used as a $Z_e$ axis of the first coordinate system, and a direction from the antenna 0 to the antenna 2 is a positive direction of the $Z_e$ axis. Then, a positive direction of an $X_e$ axis of the first coordinate system is determined according to the rule of the right-hand rectangular coordinate system. For example, all connection lines between the antennas may be connected by using relative fixed points of the antennas, for example, by using root endpoints of the antennas. In this way, the point $O_e$, may be a root endpoint of the antenna 0. Certainly, the three axes and the positive directions of the three axes in the first coordinate system may also be determined according to the rule of the left-hand rectangular coordinate system or in another manner.

It should be noted that the foregoing uses the position of the antenna 0 as the origin of the first coordinate system, which is merely an example. A location of another antenna (for example, the antenna 1) may alternatively be an origin of the first coordinate system.

Optionally, the first coordinate system may be established in advance, provided that the installation personnel install the UWB base station 300, the UWB base station 400, and the UWB base station 500 based on the requirements. For example, before the UWB base station 300, the UWB base station 400, and the UWB base station 500 are delivered from a factory, the first coordinate system is already established, and related information of the first coordinate system is stored locally or on a server. For example, during installation, the UWB base station 400 needs to be installed on a horizontal left side of the UWB base station 300 on a same plane, and the UWB base station 500 needs to be installed on a vertical upper side of the UWB base station 300 on the same plane. When the UWB base station 300, the UWB base station 400, and the UWB base station 500 are started, or when the UWB base station 300, the UWB base station 400, and the UWB base station 500 are triggered, the UWB base station 300, the UWB base station 400, and the UWB base station 500 invoke the related information of the first coordinate system locally or from the server.

Unless otherwise specified, the server in this application may be a home central device, or may be a cloud server.

Figure 8:
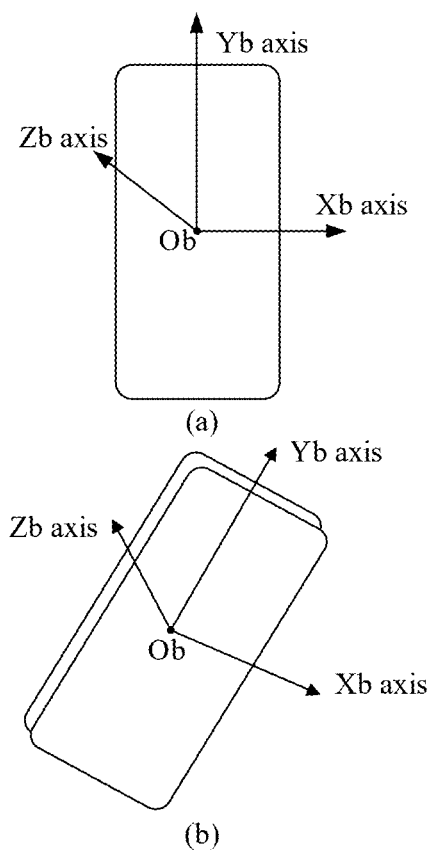
FIG. 8 is a schematic diagram of a manner of establishing a second coordinate system according to an embodiment of this application.

For example, FIG. 8 shows a process of establishing the second coordinate system according to this embodiment of this application. As shown in (a) in FIG. 8, an edge contour of the first electronic device includes four sides: two vertical sides and two horizontal sides. $O_b$ is a center of gravity or a center of the first electronic device. An axis that includes the point $O_b$ and that is parallel to the horizontal sides of the first electronic device is an $X_b$ axis, and a positive direction of the $X_b$ axis points to a right side of the first electronic device. An axis that includes the point $O_b$ and that is parallel to the vertical sides of the first electronic device is a $Y_b$ axis, and a positive direction of the $Y_b$ axis points to an upper side of the first electronic device. A pointing direction of the first electronic device is the positive direction of the $Y_b$ axis. A $Z_b$ axis is perpendicular to a plane to which the $X_b$ axis and the $Y_b$ axis belong, and a positive direction of the $Z_b$ axis is determined according to a rule of a right-hand rectangular coordinate system. Optionally, $O_b$ may be a center of the first electronic device, or $O_b$ may be a center of an IMU module of the first electronic device. Herein, (b) FIG. 8 is a three-dimensional diagram of (a) in FIG. 8.

It should be noted that FIG. 8 merely schematically describes the second coordinate system. The second coordinate system may also be defined according to another rule. For example, alternatively, a coordinate origin may be any point on the first electronic device or any point outside the first electronic device. In addition, directions of three axes in second coordinate system are not limited to the positive directions of the $X_b$ axis, the $Y_b$ axis, and the $Z_b$ axis shown in (a) in FIG. 8 or (b) in FIG. 8.

Optionally, the second coordinate system may be established in advance. For example, when the first electronic device is delivered from a factory, the first electronic device is already established, and related information of the second coordinate system is stored locally or on a server. When the first electronic device is started, or when the first electronic device is triggered, the first electronic device invokes the related information of the second coordinate system locally or from the server.

Figure 9:
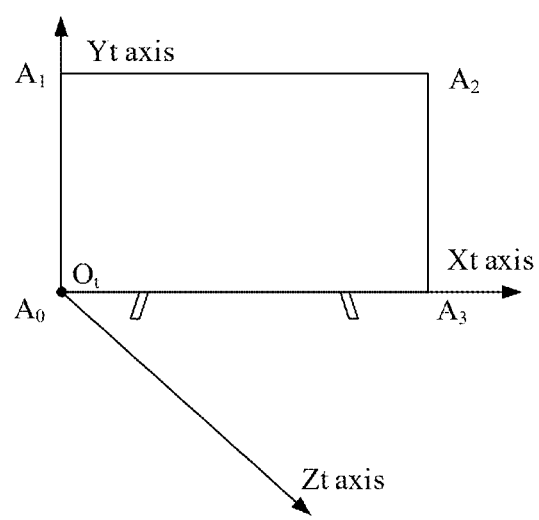
FIG. 9 is a schematic diagram of a manner of establishing a third coordinate system according to an embodiment of this application.

For example, FIG. 9 shows a process of establishing the third coordinate system according to this embodiment of this application. As shown in FIG. 9, an edge contour of the second electronic device includes four sides: a first side $A_0A_1$, a second side $A_1A_2$, a third side $A_2A_3$, and a fourth side $A_3A_0$. The first side $A_0A_1$ and the third side $A_2A_3$ are vertical sides, and the second side $A_1A_2$ and the fourth side $A_3A_0$ are horizontal sides. Optionally, an intersection point (that is, a lower left corner of a display area of the second electronic device) at which a leftmost side of the display area of the second electronic device intersects with a bottommost side of the display area of the second electronic device is used as a coordinate origin $O_t$. An axis that includes the point $O_t$ and that is parallel to $A_3A_0$ is used as an $X_t$ axis, and a positive direction of the $X_t$ axis is a pointing direction from a point $A_0$ to a point $A_3$. An axis that includes the point $O_t$ and that is parallel to $A_0A_1$ is used as a $Y_t$ axis, and a positive direction of the $Y_t$ axis is a pointing direction from the point $A_0$ to a point $A_1$. A $Z_t$ axis is perpendicular to a plane to which the $X_t$ axis and the $Y_t$ axis belong, and a positive direction of the $Z_t$ axis is determined according to a rule of a right-hand rectangular coordinate system.

It should be noted that FIG. 9 merely schematically describes the third coordinate system. The third coordinate system may also be defined according to another rule. Optionally, $O_t$ may be a center of the display area of the second electronic device, or any point in the display area of the second electronic device. In addition, positive directions of three axes of the third coordinate system are not limited to the positive directions indicated by the $X_t$ axis, the $Y_t$ axis, and the $Z_t$ axis shown in FIG. 9.

It should be noted that when an edge contour of the display area of the second electronic device is the edge contour of the second electronic device, the point $A_0$ of the second electronic device coincides with the point $O_t$; or when an edge contour of the display area of the second electronic device is not the edge contour of the second electronic device, for example, when there is a border outside the display area of the second electronic device, the point $A_0$ of the second electronic device does not coincide with the point $O_t$.

Optionally, the third coordinate system may be established in advance. For example, when the second electronic device is delivered from a factory, the third coordinate system is already established, and related information of the third coordinate system is stored locally or on a server. When the second electronic device is started, or when the second electronic device is triggered, the second electronic device invokes the third coordinate system locally or from the server.

That is, S510 is an optional step, and may be completed before the UWB base station, the first electronic device, and the second electronic device are delivered from a factory. When a consumer uses a positioning system, the first coordinate system, the second coordinate system, and the third coordinate system do not need to be re-established.

S520. Move the first electronic device to at least three positions in the display area of the second electronic device and one position in a front area of the second electronic device, and mark coordinates of the at least three positions in the display area of the second electronic device and coordinates of the position in the front area of the second electronic device by using coordinates of the first electronic device in the first coordinate system.

Optionally, before S520 is performed, the IMU module of the first electronic device may be first calibrated. To be specific, a coordinate system that is based on an elevation angle, an azimuth, and a roll angle output by the IMU module of the first electronic device is calibrated to the first coordinate system, or $C_b^e$ output by the IMU module of the first electronic device is calibrated to $$\begin{bmatrix} 1 & 0 & 0 \\ 0 & 1 & 0 \\ 0 & 0 & 1 \end{bmatrix}.$$

In this way, as the first electronic device moves subsequently, the elevation angle, the azimuth, and the roll angle that are output by the IMU module of the first electronic device are an elevation angle, an azimuth, and a roll angle of the second coordinated system relative to the first coordinate system; or a direction change of the second coordinate system relative to the first coordinate system may be reflected after $C_b^e$ output by the IMU module of the first electronic device is transposed.

For example, the second coordinate system of the first electronic device may be parallel to the first coordinate system (for example, the $X_b$ axis is parallel to the $X_e$ axis, the $Y_b$ axis is parallel to the $Y_e$ axis, and the $Z_b$ axis is parallel to the $Z_e$, axis), and positive directions of corresponding coordinate axes of the two coordinate systems are the same (for example, the positive direction of the $X_b$ axis is the same as the positive direction of the $X_e$ axis, the positive direction of the $Y_b$ axis is the same as the positive direction of the $Y_e$ axis, and the positive direction of the $Z_b$ axis is the same as the positive direction of the $Z_e$ axis). All of the elevation angle, the azimuth, and the roll angle that are output by the IMU module of the first electronic device are set to 0.

For example, the second coordinate system of the first electronic device may be parallel to the first coordinate system, and positive directions of all axes of the two coordinate systems are the same. In this case, the IMU module of the first electronic device outputs $$C_b^e = \begin{bmatrix} 1 & 0 & 0 \\ 0 & 1 & 0 \\ 0 & 0 & 1 \end{bmatrix}$$

through adjustment.

Specifically, through communication interaction between the first electronic device and the UWB base station, the first electronic device calculates coordinates of the first electronic device in real time or periodically. As the first electronic device moves to a position in the display area of the second electronic device, coordinates of the position in the display area of the second electronic device may be marked based on the first electronic device. Similarly, as the first electronic device moves to the position in the front area of the second electronic device, coordinates of the position in the front area of the second electronic device are marked by using the coordinates of the first electronic device in the first coordinate system.

For example, because the first electronic device keeps UWB communication with the UWB base station, the first electronic device may obtain a distance between the first electronic device and the UWB base station and the coordinates of the first electronic device in the first coordinate system. Because the first electronic device can learn of a coordinate origin, three axes, and positive directions of the three axes of the second coordinate system that correspond to the first electronic device, the first electronic device can convert the coordinates in the first coordinate system into coordinates in the second coordinate system based on the direction change of the second coordinate system relative to the first coordinate system. Optionally, the UWB communication is performed periodically or in real time.

Preferably, the first electronic device may move to at least three different positions in the display area of the second electronic device; and when moving to one position in the display area of the second electronic device, mark coordinates of the first electronic device at this time as coordinates of the position in the display area of the second electronic device based on a user input. In this way, coordinates of the at least three different positions in the display area of the second electronic device may be marked. Optionally, coordinates of three positions in the display area of the second electronic device are marked. Similarly, coordinates of the position in the front area of the second electronic device may be marked. In a process of marking the at least three different positions in the display area of the second electronic device, it is not required that the first electronic device has a consistent pointing direction, orientation, and the like at the at least three different positions, that is, an orientation, a pointing direction, and the like of the first electronic device are not limited during the marking.

Optionally, the at least three positions in the display area of the second electronic device may be at least three positions (for example, at a position of ½ or ⅓) of the edge contour (for example, a horizontal contour or a vertical contour of the display area) of the display area of the second electronic device, or may be at least three positions in a central part of the display area of the second electronic device.

For ease of description, the following specifically describes "at least three positions in the display area of the second electronic device" as "three positions in the display area of the second electronic device".

The following specifically describes obtaining of the coordinates of the first electronic device, and marking of three positions in the display area of the second electronic device and one position in the front area of the second electronic device by the first electronic device.

1. Obtaining of the Coordinates of the First Electronic Device

Figure 10:
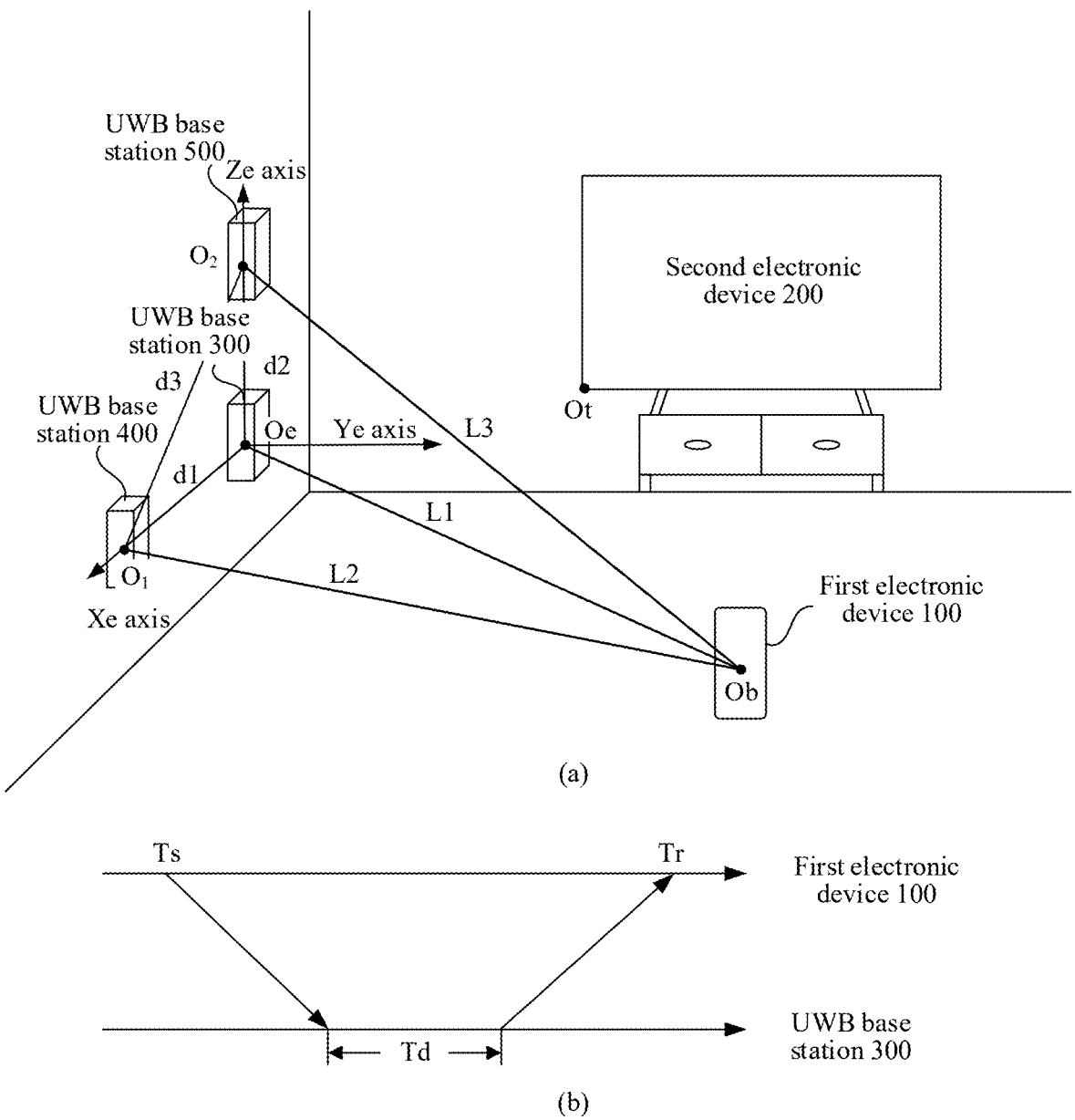
FIG. 10 is a schematic diagram of a principle of calculating coordinates of a first electronic device in a first coordinate system in a method for displaying a control window of a second electronic device according to an embodiment of this application.

For example, as shown in (a) in FIG. 10, a distance between a UWB base station 300 and a UWB base station 400 is d1, a distance between the UWB base station 300 and a UWB base station 500 is d2, and a distance between the UWB base station 400 and the UWB base station 500 is d3. d1, d2, and d3 may all be obtained through measurement by a user when or after the UWB base stations are installed; or d1, d2, and d3 may be obtained through calculation through UWB communication between the UWB base station 300, the UWB base station 400, and the UWB base station 500 and based on a time difference between receiving and sending of messages and the speed of light. Manners of obtaining d1, d2, and d3 are not limited in this application. Therefore, d1, d2, and d3 are known data.

Specifically, a first electronic device 100 performs UWB communication with one of the UWB base station 300, the UWB base station 400, and the UWB base station 500 in real time, and a distance between the first electronic device 100 and one of the UWB base stations may be determined accordingly.

For example, as shown in (b) in FIG. 10, that the first electronic device 100 communicates with the UWB base station 300 is used as an example. Communication interaction between the first electronic device 100 and the UWB base station 300 may include the following (1) to (3):

(1) At a moment $T_s$, the first electronic device 100 sends a first communication message.

Optionally, the first electronic device 100 may send the first communication message after receiving an input. For example, the input may include at least one of a touch input and a voice input.

Optionally, the first communication message includes a unique identification address of the first electronic device 100, for example, a MAC address.

Optionally, the sending includes broadcast. The foregoing broadcast may be broadcast at a specific period. Optionally, the period may be preset, or may be adjusted by a user. Optionally, during broadcast, the first communication message includes a randomly generated unique identification code for identifying the first communication message, to avoid confusion.

(2) After receiving the first communication message from the first electronic device 100, the UWB base station 300 sends a first response message to the first electronic device 100 after duration $T_d$.

Optionally, $T_d$ may be 0.

Optionally, the first response message includes a unique identification address of the UWB base station 300, for example, a MAC address.

Optionally, the UWB base station 300 obtains the unique identification address of the first electronic device 100 from the first communication message.

(3) The first electronic device 100 receives the first response message at a moment $T_r$.

After receiving the first response message, the first electronic device 100 may calculate a distance L1 between the first electronic device 100 and the UWB base station 300 by using a formula (1).

$$L1=(T_r-T_s-T_d)*c/2 \qquad \text{Formula (1)}$$

c is the speed of light. Optionally, the first communication message may alternatively be sent by the UWB base station 300. Correspondingly, the first response message may alternatively be sent by the first electronic device 100, and the UWB base station 300 calculates L1 based on the foregoing time difference and the formula (1).

It should be noted that the distance L1 between the first electronic device 100 and the UWB base station 300 may alternatively be calculated in another manner, which is not limited to the foregoing listed manners.

Correspondingly, both a distance L2 between the first electronic device 100 and the UWB base station 400 and a distance L3 between the first electronic device 100 and the UWB base station 500 may be calculated in the foregoing manner.

This application relates to the first coordinate system, the second coordinate system, and the third coordinate system. To distinguish coordinates in different coordinate systems, a corner mark in an upper right corner indicates a coordinate system to which a coordinate belongs. For example, coordinates of the point $O_e$ in the first coordinate system are $(0^e, 0^e, 0^e)$, where a corner mark in an upper right corner indicates that the point $O_e$ is in the first coordinate system, and the coordinates indicate that the point $O_e$ is a coordinate origin of the first coordinate system. Correspondingly, coordinates of the point $O_b$ in the second coordinate system are $(0^b, 0^b, 0^b)$, where a corner mark in an upper right corner indicates that the point $O_b$ is in the second coordinate system, and the coordinates indicate that the point $O_b$ is a coordinate origin of the second coordinate system. Coordinates of the point $O_t$ in the third coordinate system are $(0^t, 0^t, 0^t)$, where a corner mark in an upper right corner indicates that the point $O_t$ is in the third coordinate system, and the coordinates indicate that the point $O_t$ is a coordinate origin of the third coordinate system.

In the first coordinate system, the following data is known: coordinates $(0^e, 0^e, 0^e)$ of the point $O_e$, coordinates $(d_1^e, 0^e, 0^e)$ of a point $O_1$, coordinates $(0^e, 0^e, d_2^e)$ of a point $O_2$, a distance $L_1$ between $O_bO_e$ a distance $L_2$ between $O_bO_1$, and a distance $L_3$ between $O_bO_2$. Assuming that coordinates of a point $O_b$ are $(X_{Ob}^e, y_{Ob}^e, z_{Ob}^e)$, an equation (1) to an equation (3) may be obtained:

$$\sqrt{(X_{Ob}^e-0^e)^2+(y_{Ob}^e-0^e)^2+(z_{Ob}^e-0^e)^2}=L1 \qquad \text{Equation (1)}$$

$$\sqrt{(X_{Ob}^e-d_1^e)^2+(y_{Ob}^e-0_e)^2+(z_{Ob}^e-0_e)^2}=L2 \qquad \text{Equation (2)}$$

$$\sqrt{(X_{Ob}^e-0^e)^2+(y_{Ob}^e-0^e)^2+(z_{Ob}^e-d_2^e)^2}=L3 \qquad \text{Equation (3)}$$

According to the foregoing equation (1) to equation (3), it may be obtained that the coordinates of the point $O_b$ are $(x_{Ob}^e, y_{Ob}^e, z_{Ob}^e)$. Unique $x_{Ob}^e$ and $z_{Ob}^e$ can be obtained through the Newton iteration and the least square method. Similarly, $y_{Ob}^e$ may be obtained through the Newton iteration and the least square method. In this case, the first coordinate system is the first coordinate system shown in FIG. 6(a). Therefore, a positive value of $y_{Ob}^e$ is selected when $y_{Ob}^e$ is solved.

As the first electronic device 100 moves, the first electronic device 100 may obtain coordinates of any point in space in the first coordinate system. In this way, the first electronic device 100 may mark coordinates of any point in space in the first coordinate system based on, for example, a user input. For example, when the first electronic device 100 moves to a point $O_t$ in (a) in FIG. 10, coordinates of the point $O_t$ in the first coordinate system may be obtained, and may be input to or confirmed by the first electronic device 100 based on, for example, a user input. The coordinates of the point $O_t$ in the first coordinate system are coordinates of a lower left corner of the display area of the second electronic device in the first coordinate system.

2. Marking of Three Positions in the Display Area of the Second Electronic Device and One Position in the Front Area of the Second Electronic Device by the First Electronic Device Because the second electronic device does not include a UWB module, and cannot communicate and interact with the UWB base station, to determine coordinates of the second electronic device in the first coordinate system, the first electronic device may mark the coordinates in the first coordinate system.

Figure 11:
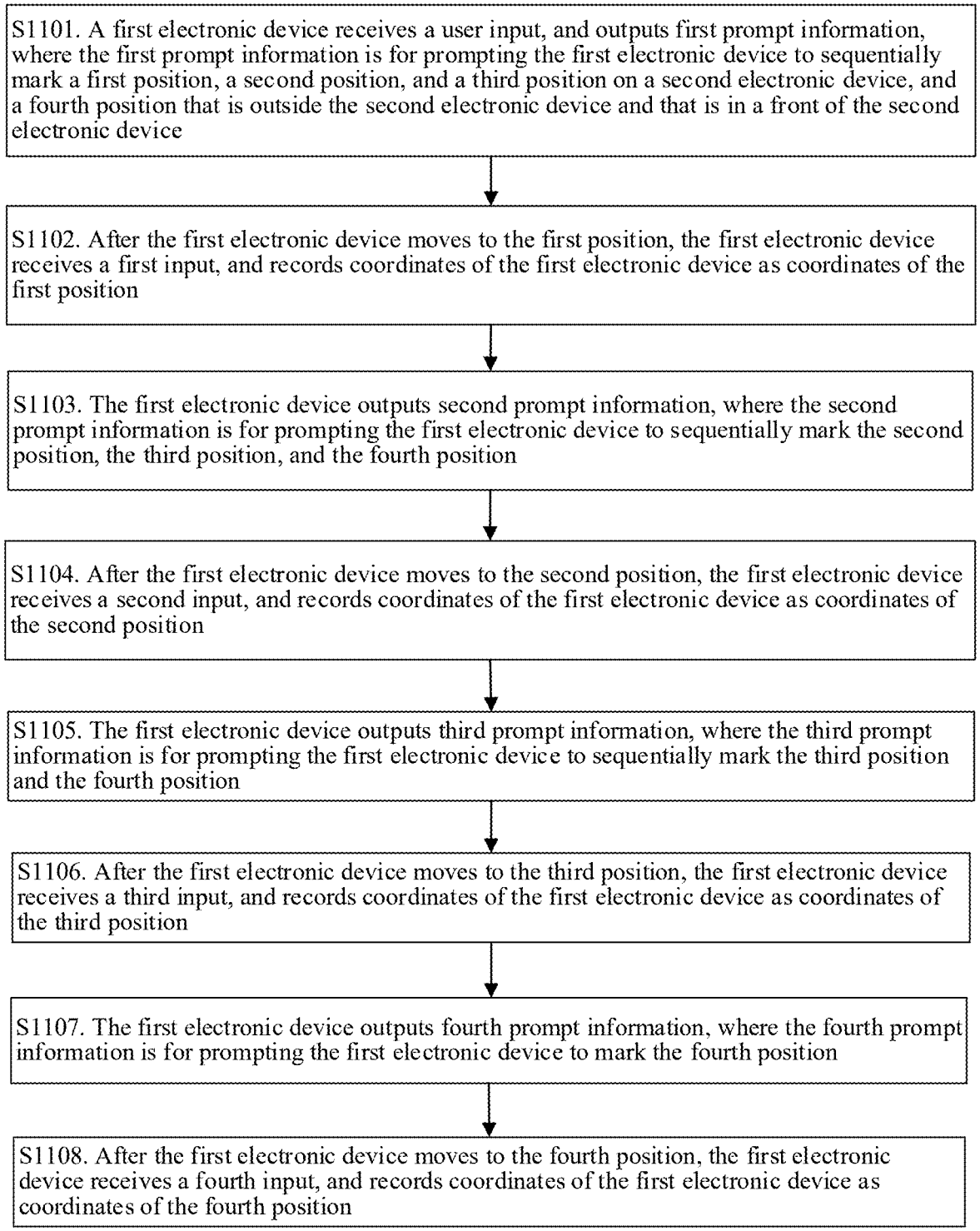
FIG. 11 is a schematic flowchart of marking, by a first electronic device, a second electronic device in a method for displaying a control window of the second electronic device according to an embodiment of this application.
Figure 12A:
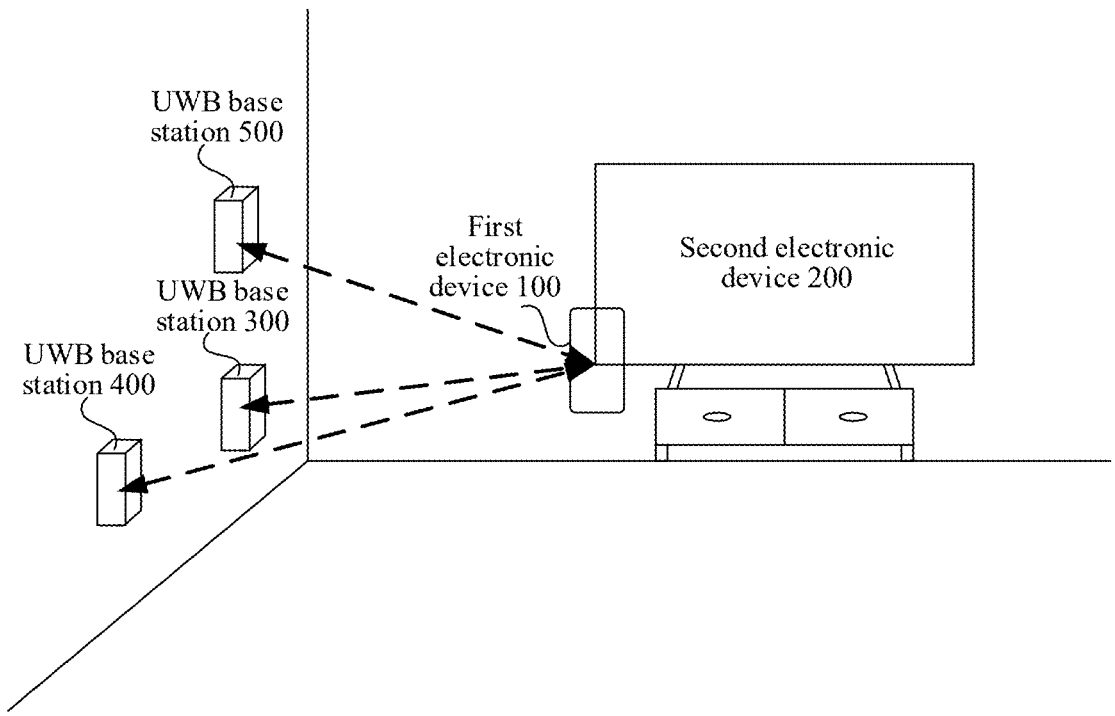
FIG. 12(a) to FIG. 12(d) are a schematic diagram of an operation of marking, by a first electronic device, a second electronic device in a method for displaying a control window of the second electronic device according to an embodiment of this application.
Figure 12B:
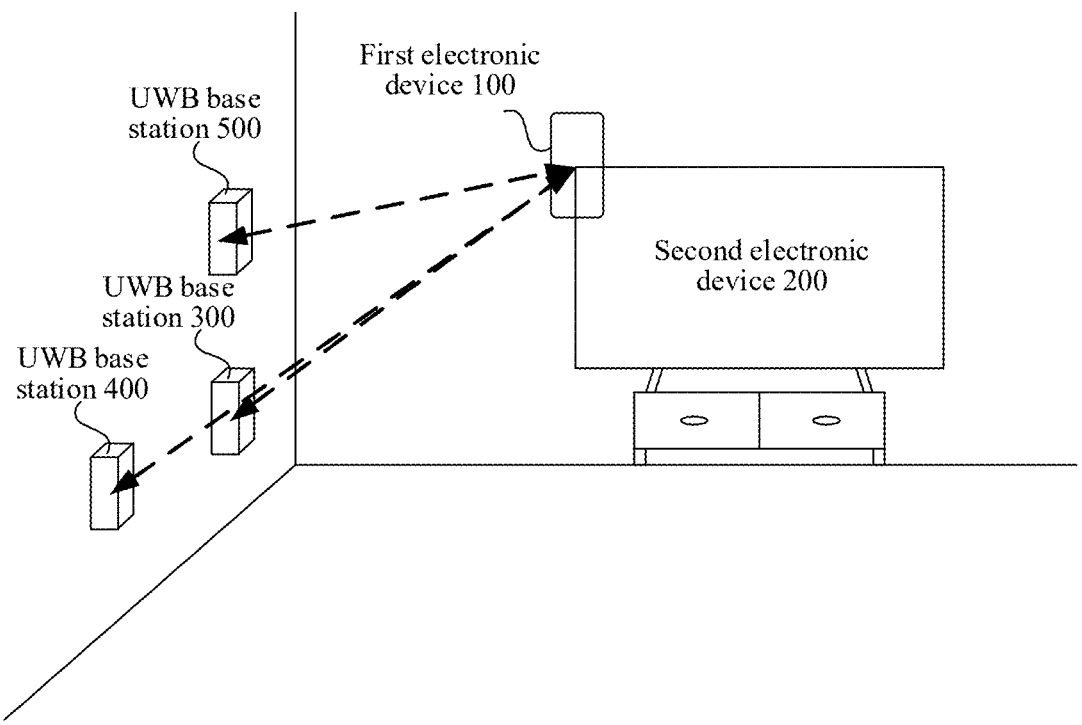
Figure 12C:
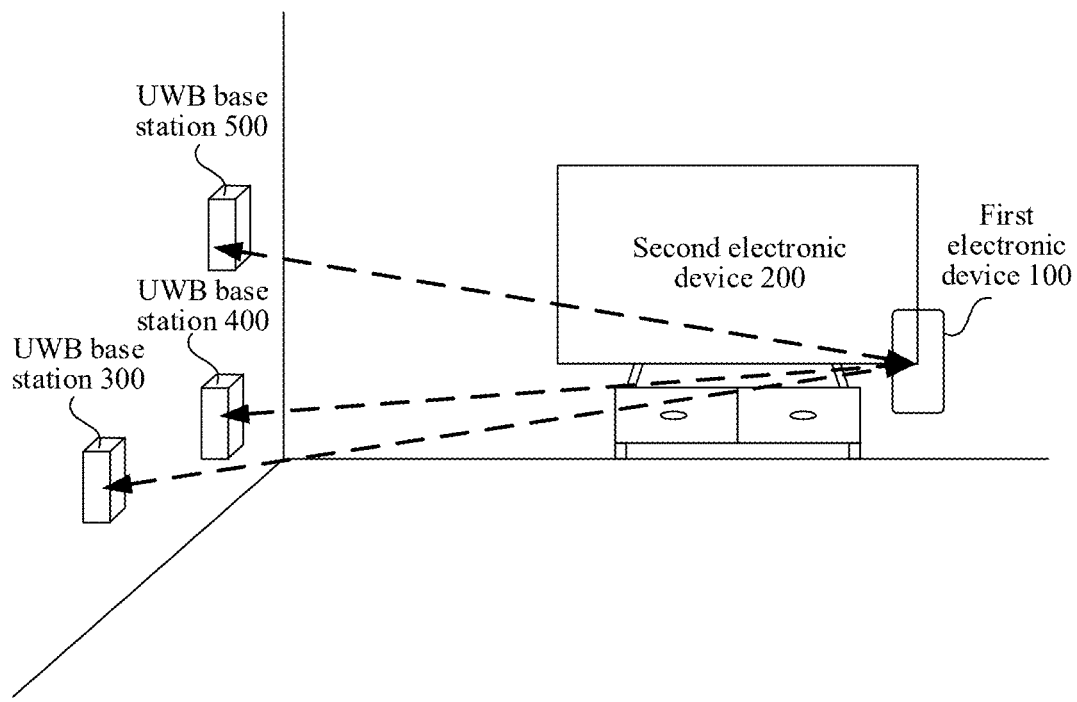
Figure 12D:
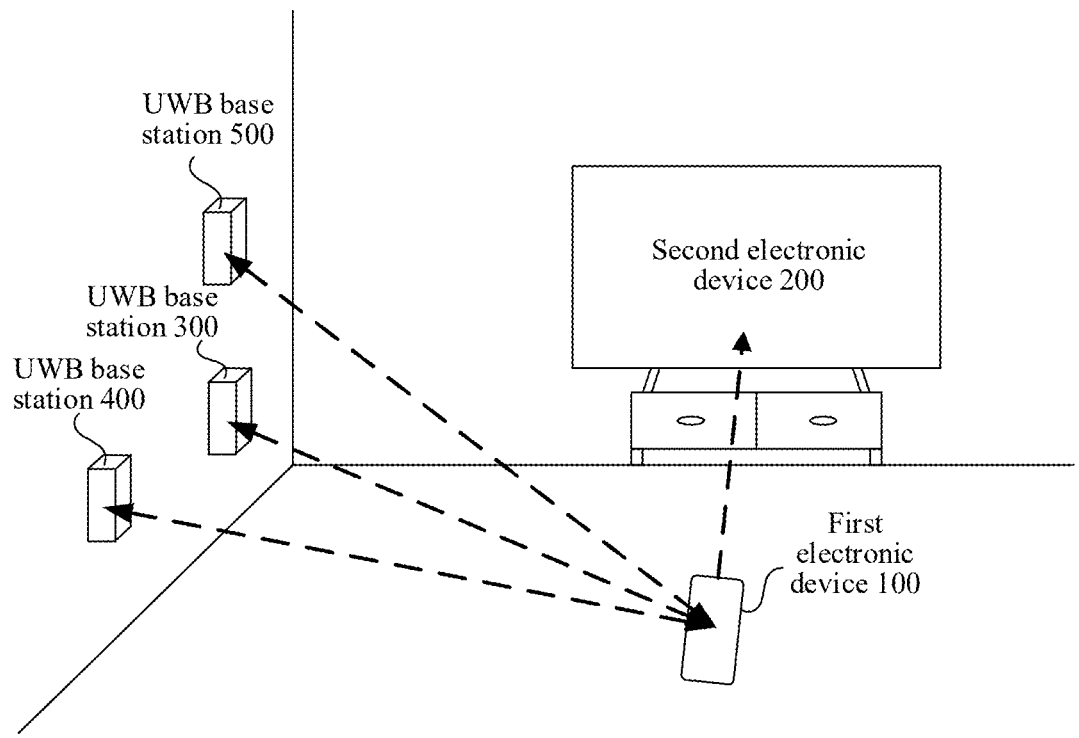

For example, FIG. 11 is a schematic flowchart of marking, by the first electronic device, the second electronic device in the method for displaying the control window of the second electronic device according to an embodiment of this application. As shown in FIG. 11, the procedure includes the following steps.

S1101. The first electronic device receives a user input, and outputs first prompt information, where the first prompt information is for prompting the first electronic device to sequentially mark a first position, a second position, and a third position in the display area of the second electronic device, and a fourth position that is outside the second electronic device and that is in the front area of the second electronic device.

Alternatively, the first prompt information in S1101 is for prompting the first electronic device to mark a first position on the second electronic device.

S1102. After the first electronic device moves to the first position, the first electronic device receives a first input, and records coordinates of the first electronic device as coordinates of the first position.

S1103. The first electronic device outputs second prompt information, where the second prompt information is for prompting the first electronic device to sequentially mark the second position, the third position, and the fourth position.

Alternatively, the second prompt information in S1103 is for prompting the first electronic device to mark the second position on the second electronic device.

S1104. After the first electronic device moves to the second position, the first electronic device receives a second input, and records coordinates of the first electronic device as coordinates of the second position.

S1105. The first electronic device outputs third prompt information, where the third prompt information is for prompting the first electronic device to sequentially mark the third position and the fourth position.

Alternatively, the third prompt information in S1105 is for prompting the first electronic device to mark the third position on the second electronic device.

S1106. After the first electronic device moves to the third position, the first electronic device receives a third input, and records coordinates of the first electronic device as coordinates of the third position.

S1107. The first electronic device outputs fourth prompt information, where the fourth prompt information is for prompting the first electronic device to mark the fourth position.

S1108. After the first electronic device moves to the fourth position, the first electronic device receives a fourth input, and records coordinates of the first electronic device as coordinates of the fourth position.

It should be noted that S1101, S1103, S1105, and S1107 are all optional steps, and are not mandatory steps.

It should be noted that in S1101 to S1108, a sequence of the first position, the second position, the third position, and the fourth position is merely an example. Any sequence of the first position, the second position, the third position, and the fourth position falls within the scope of this application. Correspondingly, after the sequence of the first position, the second position, the third position, and the fourth position is adjusted, content of the first prompt information, the second prompt information, the third prompt information, and the fourth prompt information, and content recorded by the first electronic device are correspondingly adjusted, to keep consistent with an adjusted sequence.

In addition, in the foregoing procedure, any two of the first position, the second position, the third position, and the fourth position are different positions. Preferably, the first position, the second position, and the third position are respectively a lower left corner, an upper left corner, and a lower right corner of the display area of the second electronic device. Optionally, the first position, the second position, and the third position are respectively a lower left corner, an upper left corner, and a lower right corner of the second electronic device. When the second electronic device has no border, the lower left corner, the upper left corner, and the lower right corner of the display area of the second electronic device are respectively the same as the lower left corner, the upper left corner, and the lower right corner of the second electronic device. The fourth position may be a position that is outside the second electronic device and that is in the front area of the second electronic device.

Optionally, the first position, the second position, the third position, and prompt information may be further displayed in the display area of the second electronic device. Optionally, the prompt information may prompt the user to move the first electronic device to the first position, the second position, the third position, and the fourth position in sequence. The fourth position may not be displayed in the display area of the second electronic device, but is prompted to the user by using the prompt information. Optionally, the fourth position may alternatively be displayed in the display area of the second electronic device, so that the user learns that the fourth position needs to be in the front area of the second electronic device.

The following uses an example in which the first position, the second position, and the third position are respectively the lower left corner, the upper left corner, and the lower right corner of the display area of the second electronic device, and the fourth position is the position that is outside the second electronic device and that is in the front area of the second electronic device for description. In this case, the first position, the second position, the third position, and the fourth position may be respectively positions of the first electronic device shown in FIG. 12(a), FIG. 12(b), FIG. 12(c), and FIG. 12(d).

For example, that the first electronic device is located at the first position means that the first electronic device is near the lower left corner of the display area of the second electronic device. For example, the first electronic device may be placed close to the lower left corner of the display area of the second electronic device. In this case, spatial coordinates of the first electronic device in the first coordinate system are spatial coordinates of the lower left corner of the display area of the second electronic device in the first coordinate system. In addition, when the first electronic device is closer to the lower left corner, the spatial coordinates corresponding to the lower left corner in the first coordinate system are more accurate. In addition, when the first electronic device is placed, a posture of the first electronic device is not limited. For example, a pointing direction, an orientation, and the like of the first electronic device are not limited.

Optionally, when the first electronic device is separately placed at three vertex angles (the lower left corner, the upper left corner, and the lower right corner) of the display area of the second electronic device, the first electronic device may be placed in a same posture. For example, when the first electronic device is placed at each vertex angle, the center of the first electronic device may be located at the vertex angle, and a vertical contour of the first electronic device may be parallel to the vertical contour of the display area of the second electronic device (or a horizontal contour of the first electronic device may be parallel to the horizontal contour of the display area of the second electronic device). In this way, if a length of the vertical contour of the display area of the second electronic device is known, when the first electronic device is placed at the lower left corner, coordinates of the lower left corner may be obtained, and coordinates of an upper left corner may be obtained based on the coordinates of the lower left corner and the length of the vertical contour of the display area of the second electronic device. When the first electronic device is placed at the upper left corner, coordinates of an upper left corner may further be obtained. In this case, the coordinates of the two upper left corners may be averaged and a result may be used as coordinates of the upper left corner, to reduce a marking error, thereby improving data accuracy. Placement at other vertex corners and data processing are similar to those described above. Details are not described herein again.

If the first electronic device has obtained a length of the vertical contour and a length of the horizontal contour of the display area of the second electronic device by communicating with the second electronic device, the first electronic device marks only one vertex angle position of the display area of the second electronic device and the foregoing fourth position. If the first electronic device cannot know information such as an orientation and a tilt of the display area of the second electronic device, accurate marking cannot be ensured. This is because a plane of the display area of the second electronic device cannot be uniquely determined based on only the length of the vertical contour, the length of the horizontal contour, and coordinates of the vertex angle. For example, the second electronic device tilts up and down around the point $O_t$. In this case, coordinates of the point $A_1$ and the point $A_3$ in the first coordinate system cannot be known, and $\varphi_e^t$, $\psi_e^t$, and $\theta_e^t$ cannot be calculated by using subsequent formulas (14) to (16) and formulas (18) and (19). Therefore, $C_e^t$ cannot be calculated by using a formula (2).

Optionally, the coordinates of the first position, the second position, the third position, and the fourth position that recorded by the first electronic device and corresponding meanings may be stored locally in the first electronic device, may be stored on a cloud server (where the first electronic device may be connected to the cloud server) connected to the first electronic device, or may be stored on a home central device (not shown in the figure) connected to the first electronic device. A home may be equipped with one home central device. The home central device and various electronic devices in the home may be connected to a same router. When the coordinates of the first position, the second position, the third position, and the fourth position and the corresponding meanings are stored on the home central device, a third electronic device may obtain the coordinates of the first position, the second position, the third position, and the fourth position and the corresponding meanings through communication connection to the home central device, to obtain position information and orientation information of the second electronic device.

For example, in a family, a mobile phone of a husband is the first electronic device, and a mobile phone of a wife is the second electronic device. The husband marks a television by using the mobile phone of the husband. Through the foregoing marking process, the mobile phone of the husband obtains position information and orientation information of the television, and stores the position information and the orientation information of the television on a home central device. The mobile phone of the wife may obtain the position information and the orientation information of the television from the home central device. Therefore, when the mobile phone of the wife is located in a front area of the television and points to the television, the mobile phone of the wife also displays a control window of the television. In other words, the mobile phone of the husband only needs to mark the television once, and the mobile phone of the wife does not need to mark the television. When the mobile phone of the husband or the mobile phone of the wife is located in the front area of the television and points to the television, the mobile phone of the husband or the mobile phone of the wife displays the control window of the television. Herein, only the mobile phones and the television are used as an example. The first electronic device includes but is not limited to the mobile phone, and the second electronic device includes but is not limited to the television.

If the second electronic device does not have a border, the foregoing "display area of the second electronic device" may all be replaced with "second electronic device". If the second electronic device has a border, the foregoing "display area of the second electronic device" may also be replaced with "second electronic device".

In the foregoing marking process, the position information and the orientation information of the second electronic device may be obtained through calculation for four times of position marking. Specifically, the position information of the second electronic device may be obtained through calculation for the first three times of position marking, and the orientation information of the second electronic device may be obtained through calculation for the first four times of position marking.

Subsequently, all or some of the coordinates of the first electronic device, the coordinates of the at least three positions in the display area of the second electronic device, coordinates of the UWB base station, and the coordinates of the position in the front area of the second electronic device are converted into coordinates in a same coordinate system based on a relative direction change between coordinate systems. This facilitates subsequent calculation and determining.

S530. The first electronic device displays the control window of the second electronic device when the first electronic device is located in the front area of the second electronic device and points to the second electronic device.

Specifically, a first position relationship between the first electronic device and the second electronic device may be determined based on the coordinates of the second electronic device and the coordinates of the first electronic device in the same coordinate system. Further, a second position relationship between the first electronic device and the second electronic device may be accurately determined based on the pointing direction of the first electronic device. It is comprehensively determined, based on the first position relationship and the second position relationship, that the first electronic device is located in the front area of the second electronic device and points to the second electronic device. The same coordinate system based on which the first position relationship is determined may be different from a coordinate system based on which the second position relationship is determined. For example, the same coordinate system based on which the first position relationship is determined may be the first coordinate system, and the coordinate system based on which the second position relationship is determined may be the third coordinate system.

For example, the first position relationship between the first electronic device and the second electronic device includes whether the first electronic device is located in the front area of the second electronic device; and the first position relationship between the first electronic device and the second electronic device includes whether the first electronic device points to the second electronic device. The first electronic device displays the control window of the second electronic device when determining that the first electronic device is located in the front area of the second electronic device and points to the second electronic device.

Before it is determined that the first electronic device is located in the front area of the second electronic device and points to the second electronic device, it is inconvenient to use only the coordinates in the first coordinate system. In this case, the coordinates in the first coordinate system need to be converted into coordinates in another coordinate system, for example, converted into coordinates in the second coordinate system or coordinates in the third coordinate system.

In this application, coordinate conversion in different coordinate systems may be performed through vector conversion. Specifically, distances between two points in different coordinate systems are the same, but directions of vectors formed by the two points in different coordinate systems may be different. For example, to convert the coordinates of the point $O_e$, in the first coordinate system into coordinates of the point $O_e$ in the second coordinate system, vector conversion may be performed. For example, conversion is performed by using $\overrightarrow{O_e O_b}$. Distances (both are L1) of the vector $\overrightarrow{O_e O_b}$ in the first coordinate system and the second coordinate system are the same, but a direction, represented in the first coordinate system, of the vector $\overrightarrow{O_e O_b}$ is different from a direction, represented in the second coordinate system, of the vector $\overrightarrow{O_e O_b}$. When a relative direction change between the first coordinate system and the second coordinate system is obtained, and the direction that is of the vector $\overrightarrow{O_e O_b}$ and represented in the first coordinate system is known, the direction that is of the vector $\overrightarrow{O_e O_b}$ and represented in the second coordinate system may be learned. Then, the coordinates of the point $O_e$ in the second coordinate system may be obtained based on the coordinates of the point $O_e$ and the coordinates of the point $O_b$ in the first coordinate system and the coordinates of the point $O_b$ in the second coordinate system.

The foregoing coordinate conversion manner of a same point in different coordinate systems is merely an example, and the coordinate conversion manner is not limited in this application.

A relative direction change between different coordinate systems may be expressed by an elevation (pitch) angle $\varphi$, an azimuth (yaw) $\psi$, and a roll (roll) angle $\theta$ between coordinate systems. The azimuth may also be referred to as a yaw or a course angle. For example, the elevation angle, the azimuth, and the roll angle are an elevation angle, an azimuth, and a roll angle of the second coordinate system relative to the first coordinate system, or an elevation angle, an azimuth, and a roll angle of the third coordinate system relative to the first coordinate system. To facilitate calculation of the elevation angles, the azimuths, and the roll angles between the three coordinate systems, it is assumed that coordinate origins of the three coordinate systems are all aggregated to one point. For example, the coordinate origin $O_e$ of the UWB base station is moved in parallel to the coordinate origin $O_b$ of the second coordinate system. Correspondingly, the first coordinate system also moves accordingly. Definitions of the elevation angle, the azimuth, and the roll angle are well known to a person skilled in the art, and are not described herein.

For example, FIG. 13 shows the elevation angle $\varphi_e^b$, the azimuth $\psi_e^b$, and the roll angle $\theta_e^b$ of the second coordinate system relative to the first coordinate system.

The coordinate origin $O_b$ of the second coordinate system coincides with a coordinate origin $O_e$ of the first coordinate system that is obtained after parallel movement, three axes of the second coordinate system are an $X_b$ axis, a $Y_b$ axis, and a $Z_b$ axis, and three axes of the first coordinate system are an $X_e$ axis, a $Y_e$ axis, and a $Z_e$ axis. As shown in (a) in FIG. 13, $O_e Y_b'$ (that is, $O_b Y_b'$) is a projection of the $Y_b$ axis on a plane $X_e O_e Y_e$ of the first coordinate system. As shown in (b) in FIG. 13, $O_e Z_b'$ (that is, $O_b Z_b'$) is a projection of the $Z_b$ axis on a plane $Y_b O_b Z_e$.

The elevation angle $\varphi_e^b$ of the second coordinate system relative to the first coordinate system is an angle between the $Y_b$ axis of the second coordinate system and the plane $X_e O_e Y_e$ of the first coordinate system. $\varphi_e^b$ is an angle between $O_b Y_b'$ and the $Y_b$ axis. When a $Z_e$-axis component of $O_b Y_b$ is located on a positive $Z_e$ axis, $\varphi_e^b$ is positive; and when the $Z_e$-axis component of $O_b Y_b$ is located on a negative $Z_e$ axis, $\varphi_e^b$ is negative.

The azimuth $\psi_e^b$ of the second coordinate system relative to the first coordinate system is an angle between a projection of the $Y_b$ axis of the second coordinate system on the plane $X_e O_e Y_e$ of the first coordinate system and the $Y_e$ axis of the first coordinate system. $\psi_e^b$ is an angle between $O_b Y_b'$ and the $Y_e$ axis. When an $X_e$-axis component of $O_b Y_b'$ is located on a positive $X_e$ axis, $\psi_e^b$ is positive; and when the $X_e$-axis component of $O_b Y_b'$ is located on a negative $X_e$ axis, $\psi_e^b$ is negative.

The roll angle $\theta_e^b$ of the second coordinate system relative to the first coordinate system is an angle between the $Z_b$ axis of the second coordinate system and the plane $Y_b O_e Z_e$. $\theta_e^b$ is an angle between $O_b Z_b'$ and the $Z_b$ axis. When an $X_b$-axis component of a projection of a positive $Z_b$ axis on the plane $Y_b O_e Z_e$ is located on a positive $X_b$ axis, $\theta_e^b$ is positive; and when the $X_b$-axis component of the projection of the positive $Z_b$ axis on the plane $Y_b O_e Z_e$ is located on a negative $X_b$ axis, $\theta_e^b$ is negative.

Alternatively, when an $X_b$-axis component of a projection of $O_b Z_b'$ on the plane $X_b O_b Y_b$ is located on a positive $X_b$ axis, $\theta_e^b$ is positive; when the $X_b$-axis component of the projection of $O_b Z_b$ on the plane $X_b O_b Y_b$ is located on a negative $X_b$ axis, $\theta_e^b$ is negative.

For example, FIG. 14 shows the elevation angle $\varphi_e^t$, the azimuth $\psi_e^t$, and the roll angle $\theta_e^t$ of the third coordinate system relative to the first coordinate system.

As shown in FIG. 14, the coordinate origin $O_t$ of the third coordinate system coincides with a coordinate origin $O_e$ of the first coordinate system that is obtained after parallel movement, three axes of the third coordinate system are an $X_t$ axis, a $Y_t$ axis, and a $Z_t$ axis, and three axes of the first coordinate system are an $X_e$ axis, a $Y_e$ axis, and a $Z_e$ axis. As shown in (a) in FIG. 14, $O_e Y_t'$ (that is, $O_t Y_t'$) is a projection of the $Y_t$ axis on the plane $X_e O_e Y_e$ of the first coordinate system. As shown in (b) in FIG. 14, $O_e Z_t'$ (that is, $O_t Z_t'$) is a projection of the $Z_t$ axis on the plane $Y_t O_e Z_e$.

The elevation angle $\varphi_e^t$ of the third coordinate system relative to the first coordinate system is an angle between the $Y_t$ axis of the third coordinate system and the plane $X_e O_e Y_e$ of the first coordinate system. $\varphi_e^t$ is an angle between $O_e Y_t'$ (that is, $O_t Y_t$) and the $Y_t$ axis. When a $Z_e$-axis component of $O_e Y_t$ is located on a positive $Z_e$ axis, $\varphi_e^t$ is positive; and when the $Z_e$-axis component of $O_e Y_t$ is located on a negative $Z_e$ axis, $\varphi_e^t$ is negative.

The azimuth $\psi_e^t$ of the third coordinate system relative to the first coordinate system is an angle between a projection of the $Y_t$ axis of the third coordinate system on the plane $X_e O_e Y_e$ of the first coordinate system and the $Y_e$ axis of the first coordinate system. $\psi_e^t$ is an angle between $O_e Y_t$ (that is, $O_t Y_t$) and the $Y_e$ axis. When an $X_e$-axis component of $O_e Y_t$ is located on a positive $X_e$ axis, $\psi_e^t$ is positive; and when the $X_e$-axis component of $O_e Y_t$ is located on a negative $X_e$ axis, $\psi_e^t$ is negative.

The roll angle $\theta_e^t$ of the third coordinate system relative to the first coordinate system is an angle between the $Z_t$ axis of the third coordinate system and the plane $Y_t O_e Z_e$. $\theta_e^t$ is an angle between $O_t Z_t'$ and the $Z_t$ axis. When an $X_t$-axis component of a projection of a positive $Z_t$ axis on the plane $Y_t O_e Z_e$ is located on a positive $X_t$ axis, $\theta_e^t$ is positive; and when the $X_t$-axis component of the projection of the positive $Z_t$ axis on the plane $Y_t O_e Z_e$ is located on a negative $X_t$ axis, $\theta_e^t$ is negative.

Alternatively, when an $X_t$-axis component of a projection of $O_t Z_t'$ on the plane $X_t O_t Y_t$ is located on a positive $X_t$ axis, $\theta_e^t$ is positive; when the $X_t$-axis component of the projection of $O_t Z_t'$ on the plane $X_t O_t Y_t$ is located on a negative $X_t$ axis, $\theta_e^t$ is negative.

The direction change of the third coordinate system relative to the first coordinate system may be expressed by using an attitude matrix $C_e^t$.

$$C_e^t = \begin{bmatrix} \cos\theta_e^t\cos\psi_e^t + \sin\varphi_e^t\sin\theta_e^t\sin\psi_e^t & -\cos\theta_e^t\sin\psi_e^t + \sin\varphi_e^t\sin\theta_e^t\cos\psi_e^t & -\cos\varphi_e^t\sin\theta_e^t \\ \cos\theta_e^t\sin\psi_e^t & \cos\varphi_e^t\cos\psi_e^t & \sin\varphi_e^t \\ \sin\theta_e^t\cos\psi_e^t - \sin\varphi_e^t\cos\theta_e^t\sin\psi_e^t & -\sin\theta_e^t\sin\psi_e^t - \sin\varphi_e^t\cos\theta_e^t\cos\psi_e^t & \cos\varphi_e^t\cos\theta_e^t \end{bmatrix}$$

Formula (2)

The foregoing formula of the attitude matrix $C_e^t$ is a conventional technology, and a person skilled in the art may obtain the formula from the conventional technology. For example, the attitude matrix in 1.2.1 of Chapter 1 of the book "Inertial Navigation" (Beijing: Science Press, ISBN 7-03-016428-8, by Qin Yongyuan, 1st edition in May 2006, 1st print in May 2006).

It should be noted that, the foregoing at least three UWB base stations may be replaced with one UWB base station including three antennas. A related calculation manner is similar to the foregoing calculation manner. Details are not described herein again.

In addition, when there is only one UWB base station and the UWB base station includes three antennas, after receiving a positioning request sent by a first electronic device (for example, the first electronic device), different antennas may measure a signal coming direction of the positioning request, and send a response signal based on a fixed delay, where the response signal includes information about the measured signal coming direction. After receiving the response signal, the first electronic device calculates a distance between the first electronic device and the UWB base station, and calculates spatial position information of the first electronic device in a coordinate system by using a spatial position of the UWB base station and the signal coming direction measured by the UWB base station. For related specific content, refer to Chinese Patent Application No. 202011636500.6 entitled "Indoor Positioning Method, Terminal, and System", which is incorporated herein by reference in its entirety.

(1) Determine Whether the First Electronic Device is Located in the Front Area of the Second Electronic Device Based on the foregoing principle of converting coordinates in different coordinate systems by using a vector and the foregoing principle of the elevation angle, the azimuth, and the roll angle of the third coordinate system relative to the first coordinate system, a relative direction change of the third coordinate system relative to the first coordinate system may be specifically represented by using a mathematical matrix $C_e^t$.

For ease of description, the following still uses the example in which the first electronic device marks the lower left corner, the upper left corner, and the lower right corner of the display area of the second electronic device and one position in the front area for description.

Figure 15:
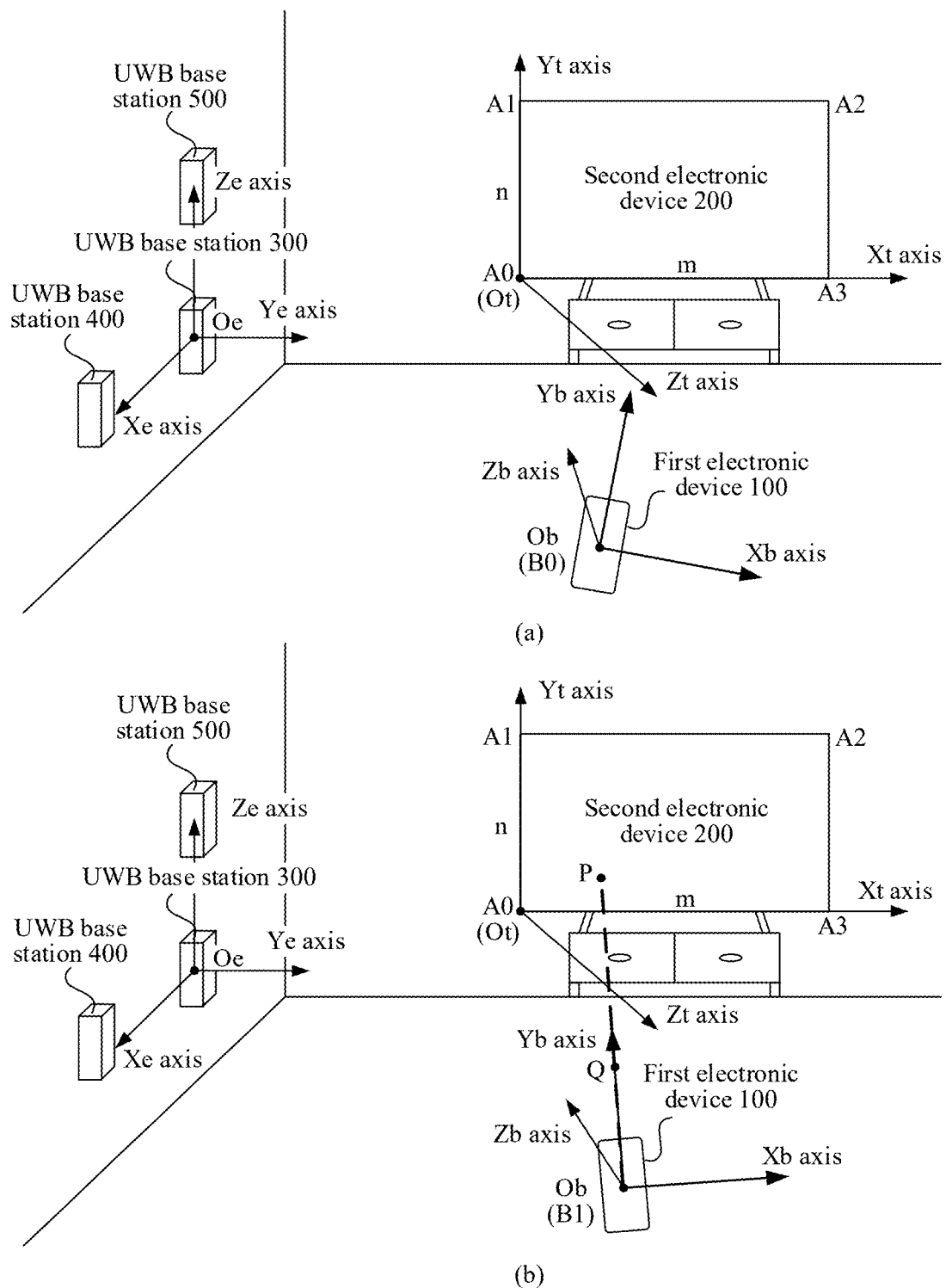
FIG. 15 is a schematic diagram of a principle of determining that a first electronic device is located in a front area of a second electronic device and that the first electronic device points to the second electronic device in a method for displaying a control window of the second electronic device according to an embodiment of this application.

As shown in FIG. 15, it is assumed that the length of the vertical contour of the display area of the second electronic device is m, the length of the horizontal contour of the display area of the second electronic device is n, and the first electronic device marks the lower left corner, the upper left corner, and the lower right corner of the display area of the second electronic device and the position in the front area as $A_0$, $A_1$, $A_3$, and $B_0$ respectively. In (a) in FIG. 15, the point $B_0$ coincides with the point $O_b$, and the point $B_0$ is a fixed point in space, and remains fixed even if the first electronic device 100 moves the point $B_0$. The point $O_b$ represents a center of gravity or a center of the first electronic device 100, and the point $O_b$ moves as the first electronic device 100 moves.

After the marking process shown in FIG. 12(a) to FIG. 12(d), based on the foregoing principle, the first electronic device 100 may obtain coordinates $(x_{A0}^e, y_{A0}^e, z_{A0}^e)$ of $A_0^e$, coordinates $(x_{A1}^e, y_{A1}^e, z_{A1}^e)$ of $A_1^e$, coordinates $(x_{A3}^e, y_{A3}^e, z_{A3}^e)$ of $A_3^e$, and coordinates $(x_{B0}^e, y_{B0}^e, z_{B0}^e)$ of $B_0^e$, that is, may obtain coordinates of $A_0$, $A_1$, $A_3$, and $B_0$ in the first coordinate system. Then, the first electronic device may calculate m and n by using a formula (3) and a formula (4):

$$m = \sqrt{(x_{A3}^e - x_{A0}^e)^2 + (y_{A3}^e - y_{A0}^e)^2 + (z_{A3}^e - z_{A0}^e)^2}$$

Formula (3)

$$n = \sqrt{(x_{A1}^e - x_{A0}^e)^2 + (y_{A1}^e - y_{A0}^e)^2 + (z_{A1}^e - z_{A0}^e)^2}$$

Formula (4)

That is, lengths of a vector $\overrightarrow{A_0A_1}$ and a vector $\overrightarrow{A_0A_3}$ are m and n respectively. In the first coordinate system, the vector $\overrightarrow{A_0A_1}$ and the vector $\overrightarrow{A_0A_3}$ are expressed as $(\overrightarrow{A_0A_1})^e$ and $(\overrightarrow{A_0A_3})^e$ respectively. In the third coordinate system, the vector $\overrightarrow{A_0A_1}$ and the vector $\overrightarrow{A_0A_3}$ are expressed as $(\overrightarrow{A_0A_1})^t$ and $(\overrightarrow{A_0A_3})^t$ respectively. Because the vector $\overrightarrow{A_0A_1}$ and the vector $\overrightarrow{A_0A_3}$ are fixed in space, lengths of $(\overrightarrow{A_0A_1})^t$ and $(\overrightarrow{A_0A_1})^e$ are the same, and lengths $(\overrightarrow{A_0A_3})^t$ of $(\overrightarrow{A_0A_3})^e$ and are the same. Therefore, a change of $(\overrightarrow{A_0A_1})^t$ relative to $(\overrightarrow{A_0A_1})^e$ is the direction change of the third coordinate system relative to the first coordinate system. Similarly, a change of $(\overrightarrow{A_0A_3})^t$ relative to $(\overrightarrow{A_0A_3})^e$ is the direction change of the third coordinate system relative to the first coordinate system.

$$(\overrightarrow{A_0A_1})^t = C_e^t \cdot (\overrightarrow{A_0A_1})^e$$

Formula (5)

$$(\overrightarrow{A_0A_3})^t = C_e^t \cdot (\overrightarrow{A_0A_3})^e$$

Formula (6)

With reference to the foregoing formula (2) and the following formula (7) to formula (10):

$$(\overrightarrow{A_0A_1})^t = \begin{bmatrix} 0 \\ n \\ 0 \end{bmatrix}$$

Formula (7)

$$(\overrightarrow{A_0A_3})^t = \begin{bmatrix} m \\ 0 \\ 0 \end{bmatrix}$$

Formula (8)

$$(\overrightarrow{A_0A_1})^e = A_1^e - A_0^e$$

Formula (9)

$$(\overrightarrow{A_0A_3})^e = A_3^e - A_0^e$$

Formula (10)

The following can be obtained:

$$A_1^e - A_0^e = n \begin{bmatrix} \cos\varphi_e^t \sin\psi_e^t \\ \cos\varphi_e^t \cos\psi_e^t \\ \sin\varphi_e^t \end{bmatrix} \quad \text{Formula (11)}$$

$$A_3^e - A_0^e = m \begin{bmatrix} \cos\theta_e^t \cos\psi_e^t + \sin\varphi_e^t \sin\theta_e^t \sin\psi_e^t \\ -\cos\theta_e^t \sin\psi_e^t + \sin\varphi_e^t \sin\theta_e^t \cos\psi_e^t \\ -\cos\varphi_e^t \sin\theta_e^t \end{bmatrix} \quad \text{Formula (12)}$$

Because $A_0^e$, $A_1^e$, $A_3^e$, m, and n are all known data, $\varphi_e^t$, $\psi_e^t$, and $\theta_e^t$ may be calculated based on the foregoing formula (11) and formula (12).

In a calculation process, the elevation angle, the azimuth, and the roll angle of the second electronic device relative to the first coordinate system meet the following angle range conditions:

$$\begin{cases} \varphi_e^t \in \left[-\frac{\pi}{2}, \frac{\pi}{2}\right] \\ \psi_e^t \in \left[-\frac{\pi}{2}, \frac{\pi}{2}\right] \\ \theta_e^t \in [-\pi, \pi] \end{cases} \quad \text{Formula (13)}$$

Further, there are two cases for further discussion:

Case (1): When $\varphi_e^t \neq \pm\pi/2$, the following may be obtained:

$$\varphi_e^t = \arcsin\left(\frac{z_{A1}^e - z_{A0}^e}{n}\right) \quad \text{Formula (14)}$$

$$\psi_e^t = \arcsin\left(\frac{x_{A1}^e - x_{A0}^e}{n \cdot \cos\varphi_e^t}\right) \quad \text{Formula (15)}$$

$$\theta_e^t = \begin{cases} \arcsin\left(-\frac{z_{A3}^e - z_{A0}^e}{m \cdot \cos\varphi_e^t}\right) \text{ or } \left(\pi - \arcsin\left(-\frac{z_{A3}^e - z_{A0}^e}{m \cdot \cos\varphi_e^t}\right)\right), \\ \quad \text{when } \arcsin\left(-\frac{z_{A3}^e - z_{A0}^e}{m \cdot \cos\varphi_e^t}\right) \geq 0 \\ \arcsin\left(-\frac{z_{A3}^e - z_{A0}^e}{m \cdot \cos\varphi_e^t}\right) \text{ or } -\left(\pi + \arcsin\left(-\frac{z_{A3}^e - z_{A0}^e}{m \cdot \cos\varphi_e^t}\right)\right), \\ \quad \text{when } \arcsin\left(-\frac{z_{A3}^e - z_{A0}^e}{m \cdot \cos\varphi_e^t}\right) < 0 \end{cases} \quad \text{Formula (16)}$$

A value of $\theta_e^t$ in the formula (16) is related to positive and negative values of arcsin $$\left(-\frac{z_{A3}^e - z_{A0}^e}{m \cdot \cos\varphi_e^t}\right)$$

and when arcsin $$\left(-\frac{z_{A3}^e - z_{A0}^e}{m \cdot \cos\varphi_e^t}\right) \geq o$$

or arcsin $$\left(-\frac{z_{A3}^e - z_{A0}^e}{m \cdot \cos\varphi_e^t}\right) < o,$$

there are also two values. For example, if arcsin $$\left(-\frac{z_{A3}^e - z_{A0}^e}{m \cdot \cos\varphi_e^t}\right) = \frac{\pi}{4}, \theta_e^t = \frac{\pi}{4} \text{ or } \frac{3\pi}{4}.$$

For another example, if $$\arcsin\left(-\frac{z_{A3}^e - z_{A0}^e}{m \cdot \cos\varphi_e^t}\right) = -\frac{\pi}{4}, \theta_e^t = -\frac{\pi}{4} \text{ or } -\frac{3\pi}{4}.$$

To prevent the value of $\theta_e^t$ from being incorrect, the following steps are performed for further verification. Specifically, a plurality of values of $\theta_e^t$ are substituted into the formula (2), to calculate a plurality of values of $C_e^t$. Then, the plurality of values of $C_e^t$ are substituted into a formula (17):

$$C_e^t \cdot (B_0^e - A_0^e) = \begin{bmatrix} x_{B0} \\ y_{B0} \\ z_{B0} \end{bmatrix}^t - \begin{bmatrix} 0 \\ 0 \\ 0 \end{bmatrix}^t = \begin{bmatrix} x_{B0} \\ y_{B0} \\ z_{B0} \end{bmatrix} \quad \text{Formula (17)}$$

Because the coordinates of both $B_0^e$ and $A_0^e$ may be obtained through calculation, $z_{B0}$ may be obtained through calculation after the plurality of values of $C_e^t$ are substituted. If $z_{B0}$ is less than or equal to 0, $B_0$ does not match the position in the front area of the second electronic device, and therefore a value of $\theta_e^t$ is discarded. If $z_{B0}$ is greater than 0, $B_0$ matches the position in the front area of the second electronic device, and therefore a value of $\theta_e^t$ is reserved.

Case (2): When $\varphi_e^t = \pm\pi/2$, because $\cos\varphi_e^t = 0$, $\psi_e^t$ and $\theta_e^t$ cannot be calculated by using the formula (15) and the formula (16), $\psi_e^t$ is calculated by using the following formula:

$$\psi_e^t = \arccos\left(\frac{z_{A1}^e - z_{A0}^e}{n}\right) \quad \text{Formula (18)}$$

Then, $\varphi_e^t$ calculated by using the formula (14) and $\psi_e^t$ calculated by using the formula (18) are substituted into the formula (12), and the following may be obtained:

$$\theta_e^t = \pm\arccos\left((a \cdot k - b \cdot h)/(a^2 + b^2)\right) \quad \text{Formula (19)}$$

$$a = \cos\psi_e^t,\ b = \sin\psi_e^t,\ k = \frac{x_{A3}^e - x_{A0}^e}{m},$$

and $h = \frac{y_{A3}^e - y_{A0}^e}{m}.$

Similarly, in the formula (19), $\theta_e^t$ may have two values. For example, $\theta_e^t$ may be $$\frac{\pi}{4} \text{ or } -\frac{\pi}{4}.$$

To avoid an error in a value of $\theta_e^t$ two values of $\theta_e^t$ are substituted into the formula (2), to calculate two values of $C_e^t$. Then, the two values of $C_e^t$ are substituted into the formula (17). Because the coordinates of both $B_0^e$ and $A_0^e$ may be obtained through calculation, $z^{B0}$ may be obtained through calculation after the two values of $C_e^t$ are substituted into the formula (17). If $z^{B0}$ is less than or equal to 0, $B^0$ does not match the position in the front area of the second electronic device, and therefore a value of $\theta_e^t$ is discarded. If $z_{B0}$ is greater than 0, $B_0$ matches the position in the front area of the second electronic device, and therefore a value of $\theta_e^t$ is reserved.

In this way, after the foregoing calculation process in (1) or (2), specific values of $\varphi_e^t$, $\psi_e^t$, and $\theta_e^t$ may be obtained, so that a specific value of $C_e^t$ may be calculated. Because both the first coordinate system and the third coordinate system are fixed, the specific value of $C_e^t$ is also fixed. Even if the first electronic device moves, the specific value of $C_e^t$ is not affected.

After the first electronic device moves to a point $B_1$ (as shown in (b) in FIG. 15, the point $B_1$ is any point), coordinates of $B_1^e$ may be calculated by using the foregoing procedure; and $z_{B1}$ may be calculated based on the foregoing obtained specific value of $C_e^t$ by using the formula (20). In this way, it can be determined, based on that $z_{B1}$ greater than 0, that the first electronic device is located in the front area of the second electronic device.

$$C_e^t \cdot (B_1^e - A_0^e) = \begin{bmatrix} x_{B1} \\ y_{B1} \\ z_{B1} \end{bmatrix}^t - \begin{bmatrix} 0 \\ 0 \\ 0 \end{bmatrix}^t = \begin{bmatrix} x_{B1} \\ y_{B1} \\ z_{B1} \end{bmatrix} \qquad \text{Formula (20)}$$

After it is determined that the first electronic device is located in the front area of the second electronic device, whether the first electronic device points to the second electronic device is further determined. It should be noted that if $z_{B1}$ is less than or equal to 0, it indicates that the first electronic device is located on the back of the second electronic device. In this case, the procedure shown in FIG. 5 may be directly exited, and a subsequent procedure is not continued.

(2) Determine Whether the First Electronic Device Points to the Second Electronic Device There are a plurality of manners of determining whether the first electronic device points to the second electronic device. The following describes a manner in detail with reference to (b) in FIG. 15.

Manner 1:

As shown in (b) in FIG. 15, a point Q is selected on a $Y_b$ axis of the second coordinate system. For ease of description, the following uses an example in which coordinates of the point Q in the second coordinate system are $(0^b, q^b, 0^b)$ for description. q is known data. For example, q=1. According to the foregoing principle, a formula (21) and a formula (22) may be obtained:

$$Q^e - O_b^e = C_b^e \cdot (Q^b - O_b^b) \qquad \text{Formula (21)}$$

$$Q^t - A_0^t = C_e^t \cdot (Q^e - A_0^e) \qquad \text{Formula (22)}$$

Optionally, the IMU module of the first electronic device may output $c_b^e$ in real time. In addition, $Q^b$, $O_b^e$, and $O_b^b$ are known data. Therefore, $Q^e$ may be calculated based on the formula (21). Then, because $C_e^t$, $A_0^e$, and $A_0^t$ are known data, and $Q^e$ has been calculated based on the formula (21), $Q^t$ may be calculated based on the formula (22).

Optionally, the IMU module of the first electronic device may output the elevation angle, the azimuth, and the roll angle in real time. A processor of the first electronic device may obtain real-time $C_b^e$ through calculation in real time based on the elevation angle, the azimuth, and the roll angle that are output in real time. Because $Q^b$, $O_b^e$, and $O_b^b$ are known data, $Q^e$ may be calculated based on the formula (21). Then, because $C_e^t$, $A_0^e$, and $A_0^t$ are known data and $Q^e$ has been calculated based on the formula (21), $Q^t$ may be calculated based on the formula (22).

A specific calculation manner of $C_b^e$ is a conventional technology, and may be obtained by a person skilled in the art from the conventional technology, for example, the attitude update algorithm in 4.1.2 of Chapter 4 of the book "Strapdown Inertial Navigation Algorithm and Principle of Integrated Navigation" (Northwestern Polytechnical University Press, ISBN 978-7-5612-6547-5, by Yan Gongmin and Weng Jun, 1st edition in August 2019, 2nd print in January 2020).

A vector from the point $O_b$ to the point Q in the third coordinate system is $\overrightarrow{O_b Q^t} = Q^t - Q_b^t$. Because both $Q^t$ and $Q_b^t$ in the third coordinate system may be calculated, $\overrightarrow{O_b Q^t}$ may be calculated, so that an $X_t$-axis component, a $Y_t$-axis component, and a $Z_t$-axis component of a vector $\overrightarrow{O_b Q}$ in the third coordinate system may be obtained, that is, $\overrightarrow{O_b Q}^{tx}$, $\overrightarrow{O_b Q}^{ty}$, and $\overrightarrow{O_b Q}^{tz}$. For example, assuming that coordinates of the point Q in the third coordinate system are (5, 3, 2), and coordinates of the point $O_b$ in the third coordinate system are (3, 2, 1), $\overrightarrow{O_b Q}^{tx}$, $\overrightarrow{O_b Q}^{ty}$, and $\overrightarrow{O_b Q}^{tz}$ are 2, 1, and 1 respectively.

Then, according to $Q^t$ and $O_b^t$, the following equations may be listed:

$$\frac{x^t - O_b^{tx}}{\overrightarrow{O_b Q}^{tx}} = \frac{y^t - O_b^{ty}}{\overrightarrow{O_b Q}^{ty}} = \frac{z^t - O_b^{tz}}{\overrightarrow{O_b Q}^{tz}} \qquad \text{Equation (4)}$$

$(x^t, y^t, z^t)$ are coordinates of any point on a straight line represented by the equation in the third coordinate system. $O_b^{tx}$, $O_b^{ty}$, and $O_b^{tz}$ are an $X_t$ coordinate, a $Y_t$ coordinate, and a $Z_t$ coordinate of the point $O_b$ in the third coordinate system. $\overrightarrow{O_b Q}^{tx}$, $\overrightarrow{O_b Q}^{ty}$, and $\overrightarrow{O_b Q}^{tz}$ are an $X_t$-axis component, a $Y_t$-axis component, and a $Z_t$-axis component of the vector $\overrightarrow{O_b Q}$ in the third coordinate system.

In the equation (a), assuming that z t is equal to 0, an $X_t$ coordinate and a Y t coordinate, in the third coordinate system, of an intersection point P of a straight line on which the point $O_b$ and the point Q are located and a plane to which the display area of the second electronic device belongs may be obtained. Coordinates of the point P in (b) in FIG. 15 in the third coordinate system are:

$$\left[ \frac{-O_b^{tz} \cdot \overrightarrow{O_b Q}^{tx}}{\overrightarrow{O_b Q}^{tz}} + O_b^{tx}, \; \frac{-O_b^{tz} \cdot \overrightarrow{O_b Q}^{ty}}{\overrightarrow{O_b Q}^{tz}} + O_b^{ty}, \; 0^t \right]$$

$\overrightarrow{O_b Q}^{tx}$, $\overrightarrow{O_b Q}^{ty}$, $\overrightarrow{O_b Q}^{tz}$, $O_b^{tx}$, and $O_b^{ty}$, $O_b^{tz}$ may be obtained through calculation.

When $$\left( \frac{-O_b^{tz} \cdot \overrightarrow{O_b Q}^{tx}}{\overrightarrow{O_b Q}^{tz}} + O_b^{tx} \right) \in [0^t, m^t] \text{ and } \left( \frac{-O_b^{tz} \cdot \overrightarrow{O_b Q}^{ty}}{\overrightarrow{O_b Q}^{tz}} + O_b^{ty} \right) \in [0^t, n^t],$$

it may be considered that the first electronic device points to the second electronic device; otherwise, it may be considered that the first electronic device does not point to the second electronic device.

Manner 2:

The second electronic device may also include an IMU module. In this case, the second electronic device may obtain the direction information of the second electronic device by using the IMU module of the second electronic device. The second electronic device may communicate with the first electronic device periodically or in real time, for example, through short-distance wireless communication. The short-distance wireless communication includes but is not limited to Bluetooth, Wi-Fi communication, and the like. The first electronic device may obtain the orientation information of the second electronic device.

The first electronic device obtains pointing direction information of the first electronic device by using the IMU module of the first electronic device. The first electronic device may determine, based on the pointing direction information of the first electronic device, the orientation information of the second electronic device, and the position information of the second electronic device, whether the first electronic device points to the second electronic device.

It should be noted that, if the manner 2 is used, when marking the second electronic device, the first electronic device only needs to mark at least three positions on the second electronic device, and a fourth time of marking is not required. For example, the first electronic device only needs to mark three different positions of the second electronic device, such as the lower left corner, the upper left corner, and the lower right corner.

It should be noted that, S4 and S5 may be exchanged in order. For example, S5 uses the manner 2. In this case, S5 may be performed first, and then S4 is performed.

(3) After the first electronic device is located in the front area of the second electronic device and points to the second electronic device, the first electronic device displays the control window of the second electronic device The first electronic device automatically displays the control window of the second electronic device after it is determined that the first electronic device is located in the front area of the second electronic device and points to the second electronic device in the foregoing process. In this way, the first electronic device automatically displays or displays the control window of the second electronic device provided that the user places the first electronic device in the front area of the second electronic device and the first electronic device points to the second electronic device. Further, if the second electronic device includes a display screen, the display screen of the second electronic device displays a cursor corresponding to a position pointed by the first electronic device. For the user, this increases convenience, and reduces misjudgment, and therefore user experience is better.

With reference to FIG. 16(a) and FIG. 16(b) to FIG. 21, the following describes UI interfaces that may be displayed by the first electronic device and the second electronic device in the method provided in this embodiment of this application.

Figure 16A:
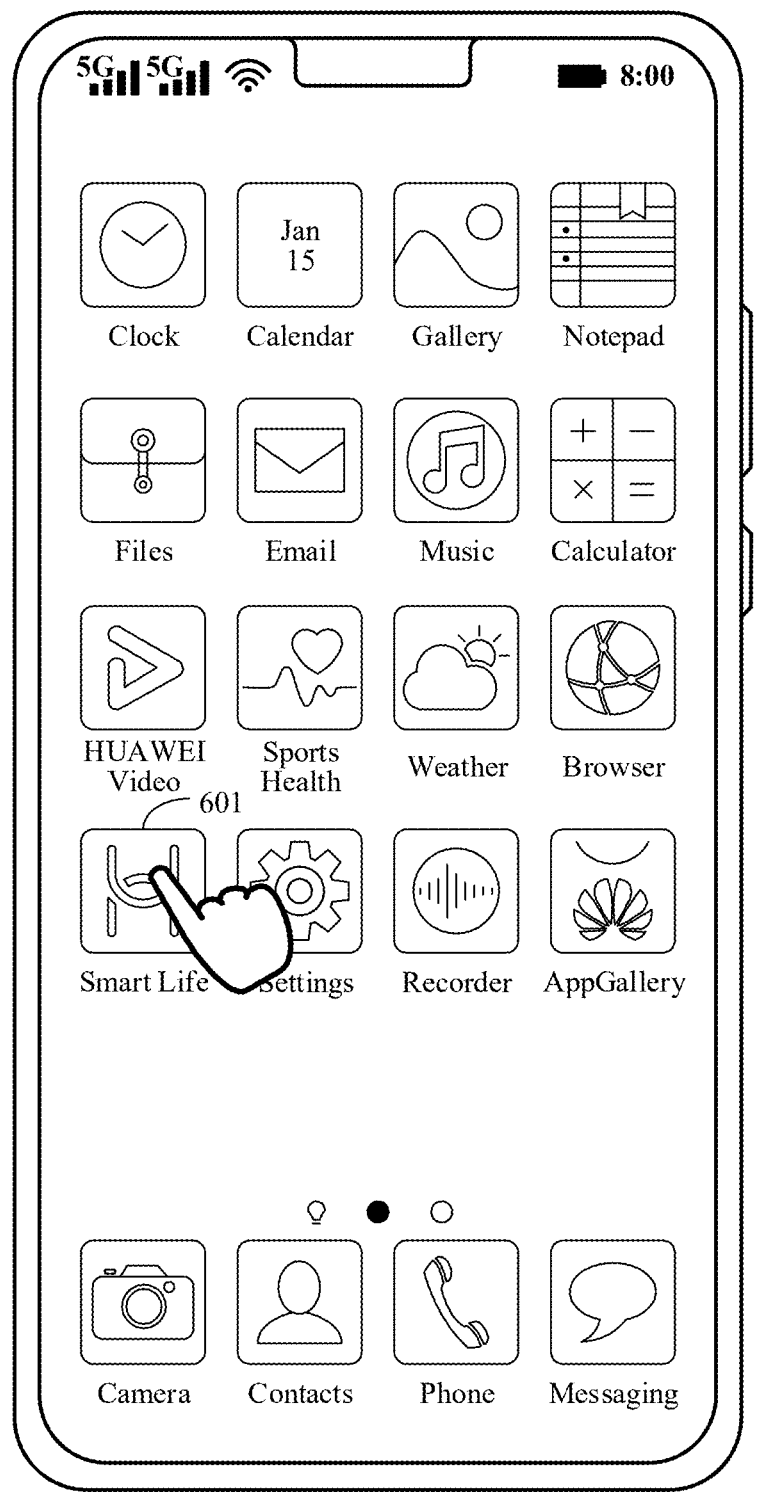

For example, as shown in FIG. 16(a), the first electronic device may receive a tapping operation performed by the user on an icon "Smart Life" 601. "Smart Life" may be considered as a smart home app. In response to the tapping operation, the first electronic device may start the Smart Life app, and display a home interface (which may also be referred to as a device manager) 602 of the Smart Life app shown in FIG. 16(b). The home interface 602 includes icons of a plurality of second electronic devices bound to the Smart Home app. The plurality of second electronic devices include the foregoing second electronic device (for example, the foregoing second electronic device may be a television in a living room). Optionally, a mobile phone may display, by default, the device manager 602 shown in FIG. 16(b). Alternatively, the first electronic device may receive a tapping operation performed by the user on a "Home" control 604a. In response to the tapping operation performed by the user on the "Home" control 604a, the first electronic device may display a device manager 602 shown in FIG. 16(b).

Figure 16B:
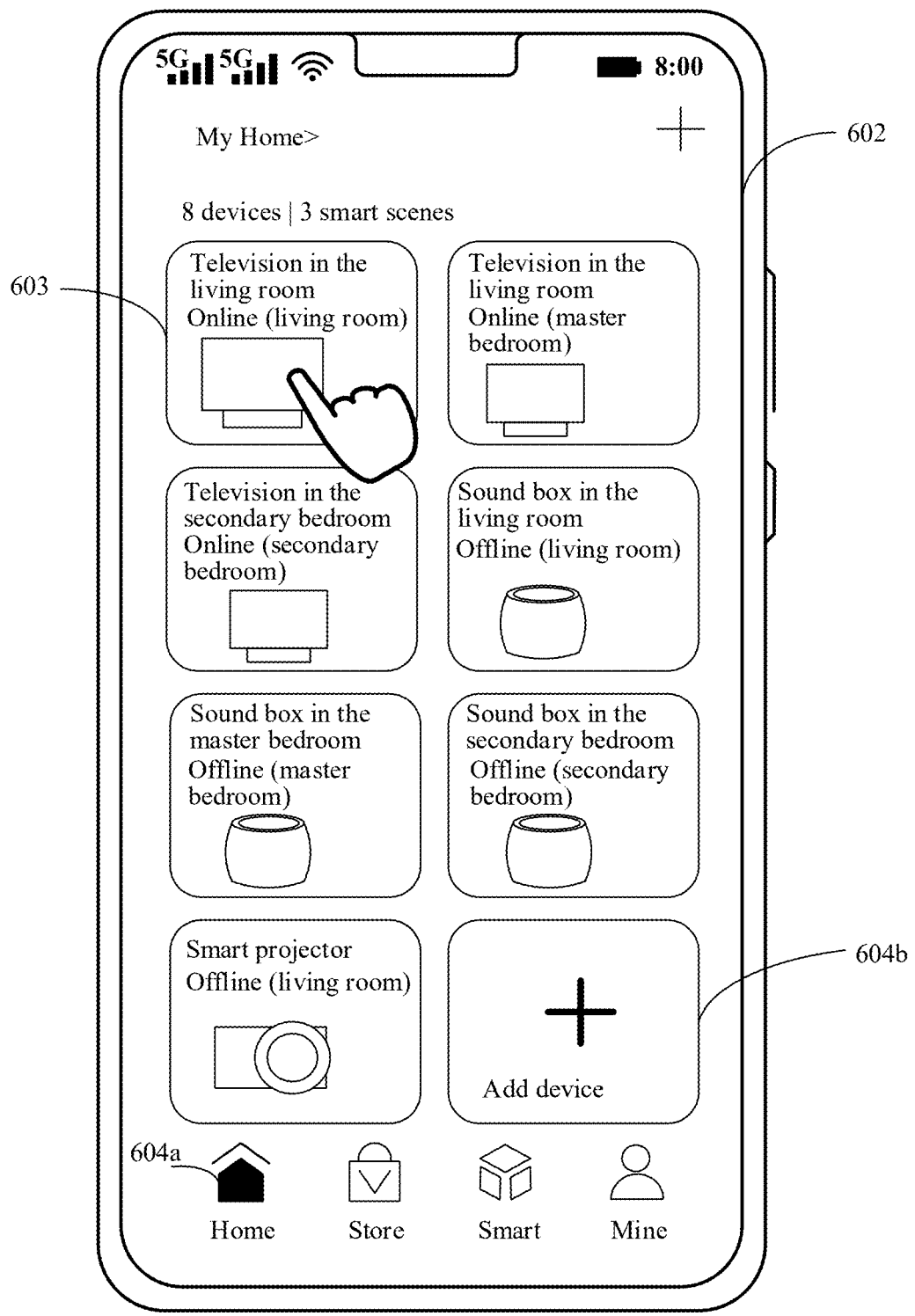

Optionally, if the home interface 602 does not include a device that the user expects to mark, as shown in FIG. 16(b), the first electronic device may be triggered, by using an "Add device" control 604b, to search for a second electronic device, to bind the corresponding second electronic device.

Further, as shown in FIG. 16(b), the first electronic device may receive an operation performed by the user on an icon 603 on the second electronic device (for example, a television in a living room), where the operation may be any operation performed by the user on the icon on the second electronic device, such as a touch and hold operation, a tap operation, or a double-tap operation.

Figure 17:
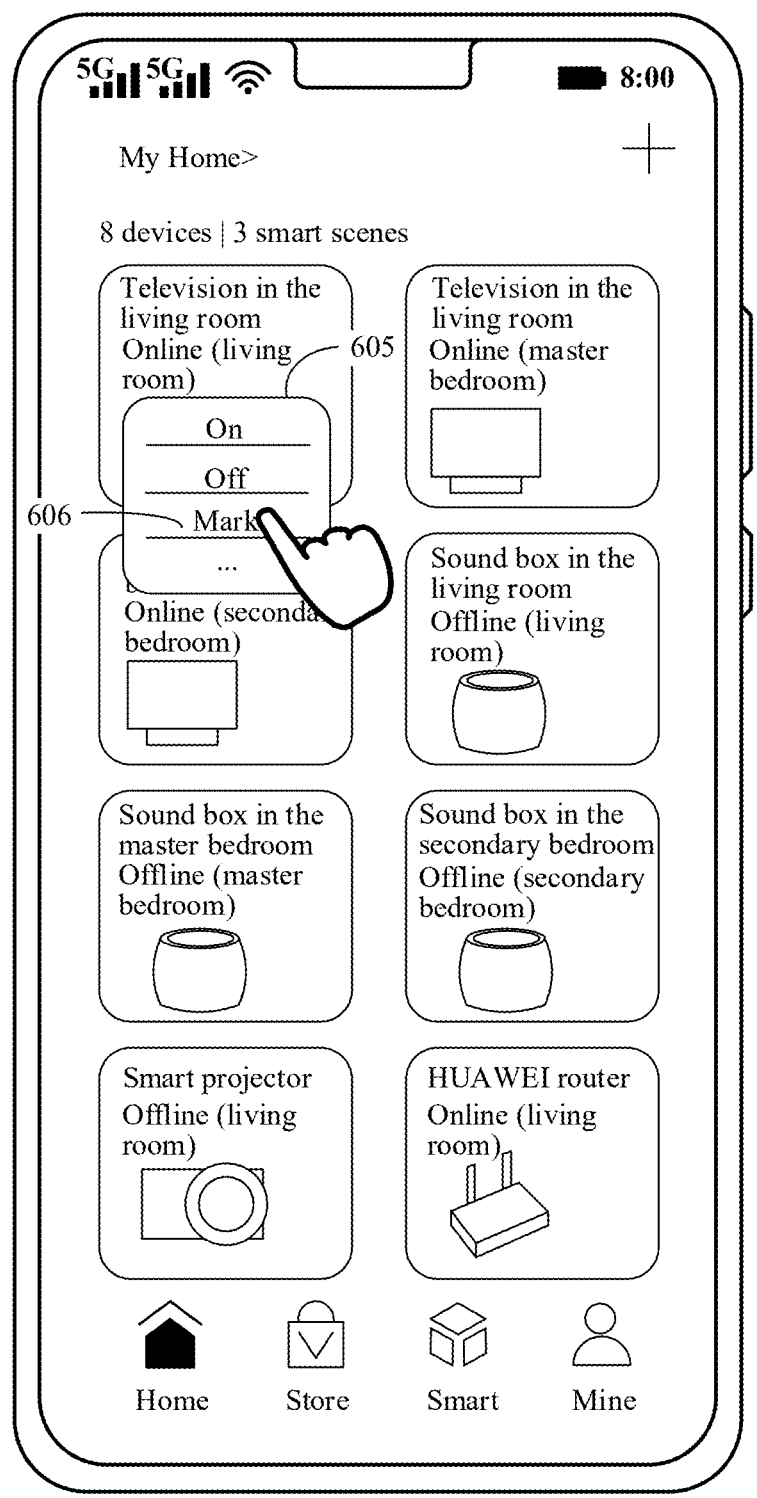

In some embodiments, in response to an operation performed by the user on the icon 603 on the second electronic device shown in FIG. 16(b), as shown in FIG. 17, the first electronic device may display a shortcut function menu 605, and the shortcut function menu 605 may include a plurality of operation controls (for example, "On", "Off", and "Mark"). A "Mark" control 606 is for triggering the first electronic device to mark a position of the second electronic device. In response to an operation (for example, a tap operation) of the user on the "Mark" control 606, the first electronic device may mark the position of the second electronic device.

Figure 18:
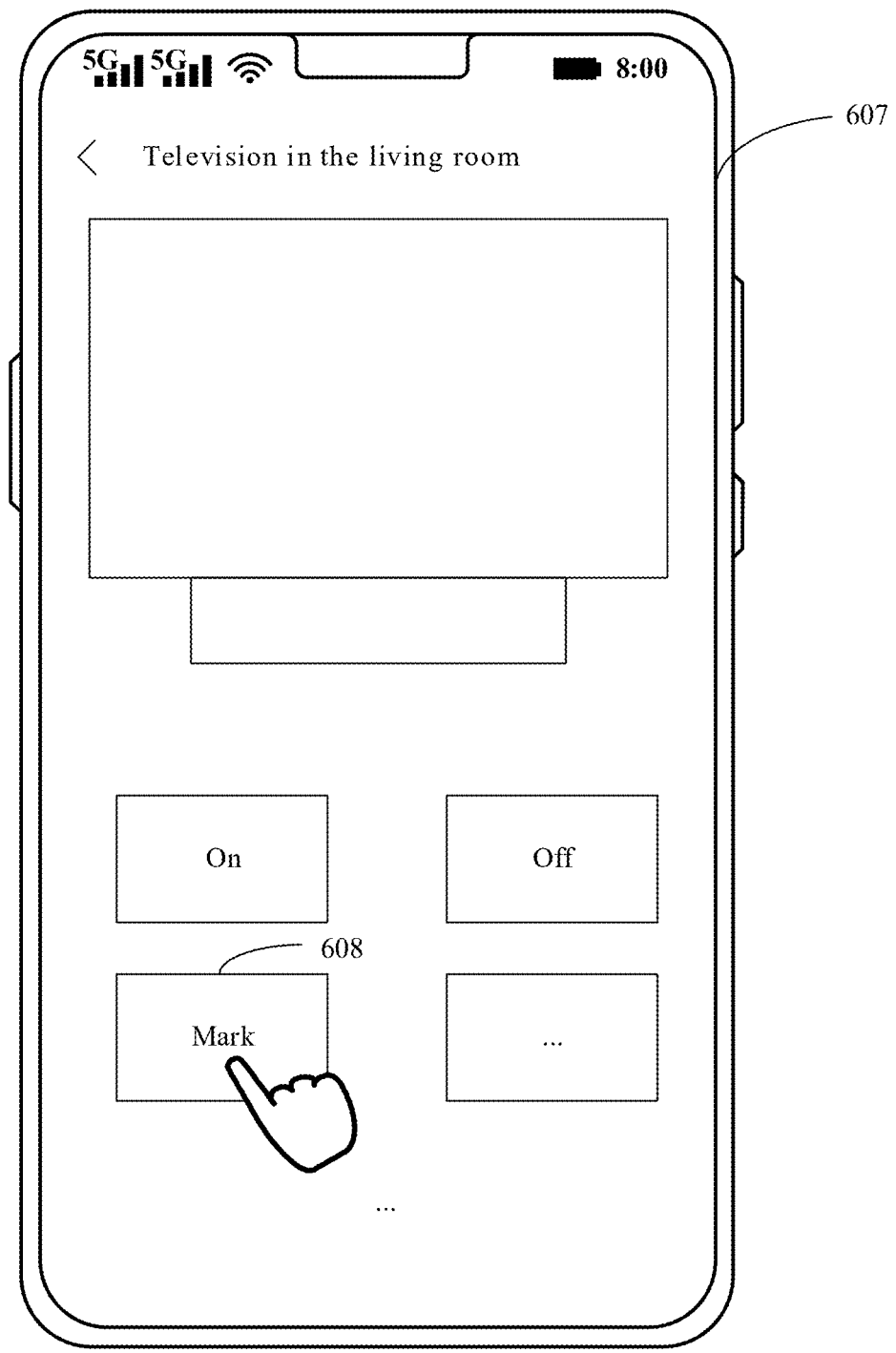

In some other embodiments, in response to an operation performed by the user on the icon 603 of the second electronic device shown in FIG. 16(b), as shown in FIG. 18, the first electronic device may display a control interface 607 of the second electronic device. The control interface 607 of the second electronic device may include an icon on the second electronic device and operation controls such as "On", "Off", and "Mark". In response to an operation (for example, a tap operation) performed by the user on a "Mark" control 608, the first electronic device may mark the position of the second electronic device.

Figure 19A:
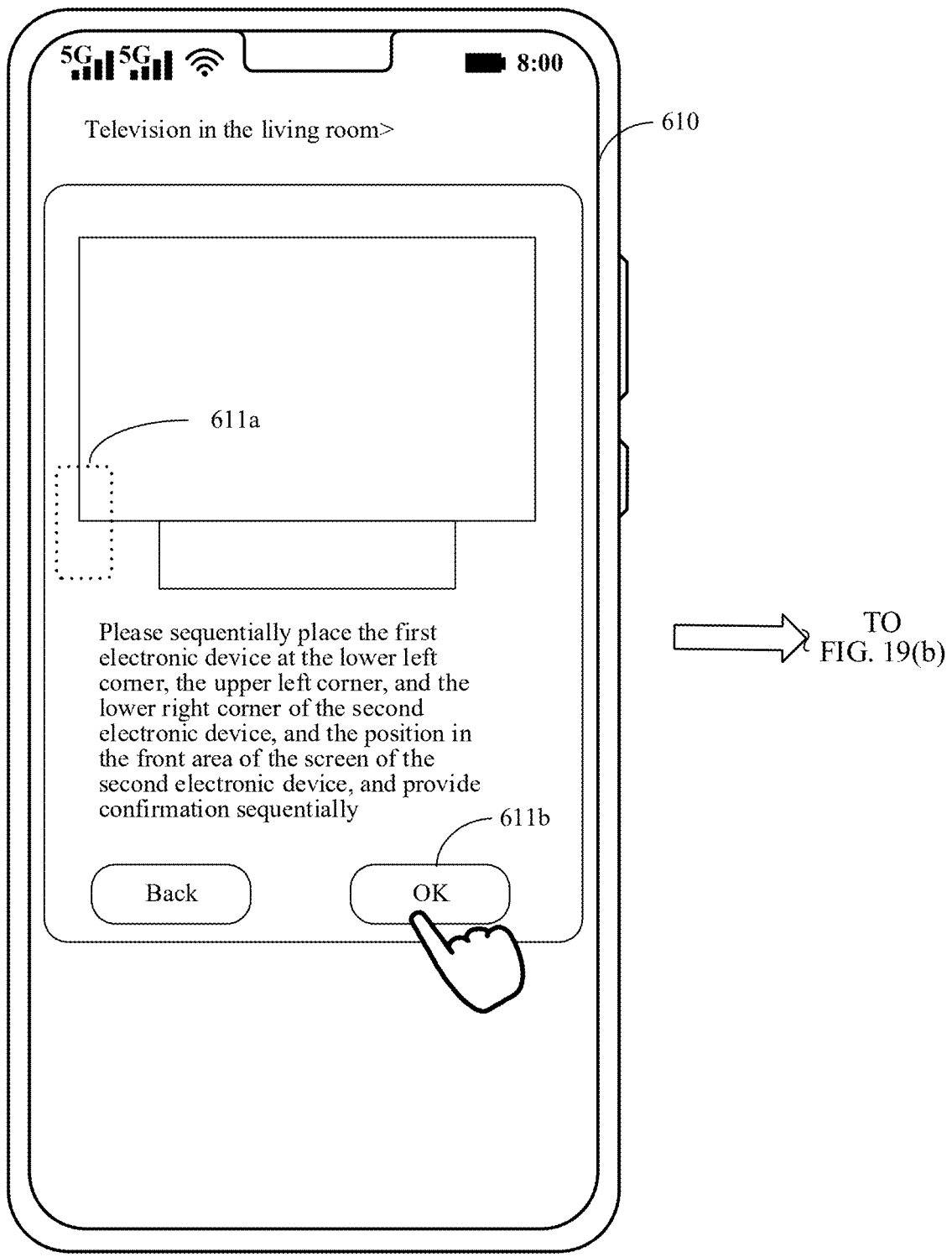

For example, as shown in FIG. 17, in response to the operation performed by the user on the "Mark" control 606, or as shown in FIG. 18, in response to the operation performed by the user on the "Mark" control 608, the first electronic device displays a prompt interface 610 shown in FIG. 19(a). The prompt interface 610 includes first prompt information, for example, "Please sequentially place the first electronic device at the lower left corner, the upper left corner, and the lower right corner of the second electronic device, and the position in the front area of the screen of the second electronic device, and provide confirmation sequentially". Optionally, the first electronic device may further output the first prompt information in a voice manner. Optionally, the first electronic device may output the first prompt information in two manners: a voice manner and a display manner.

Figure 19B:
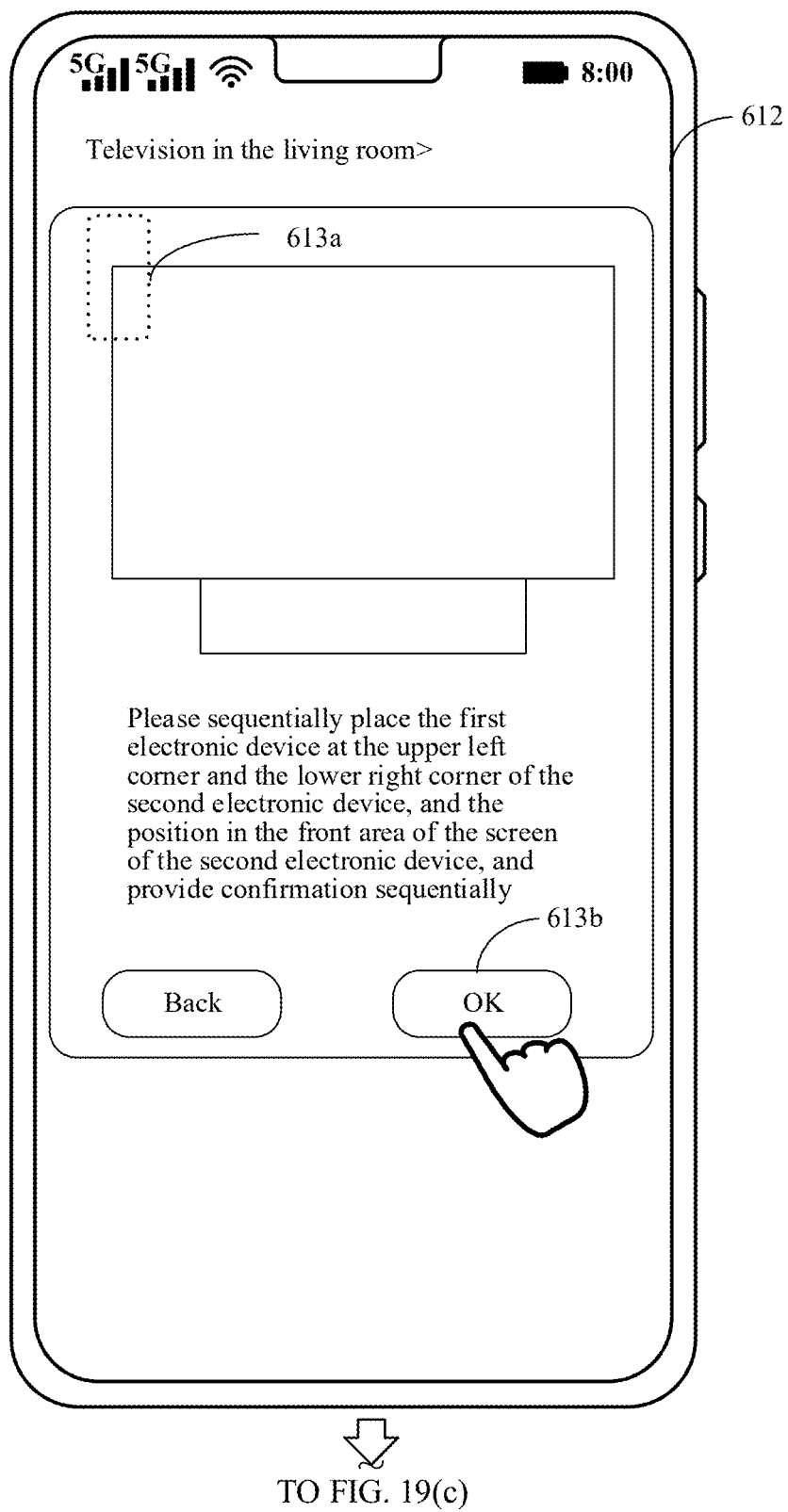
Figure 19C:
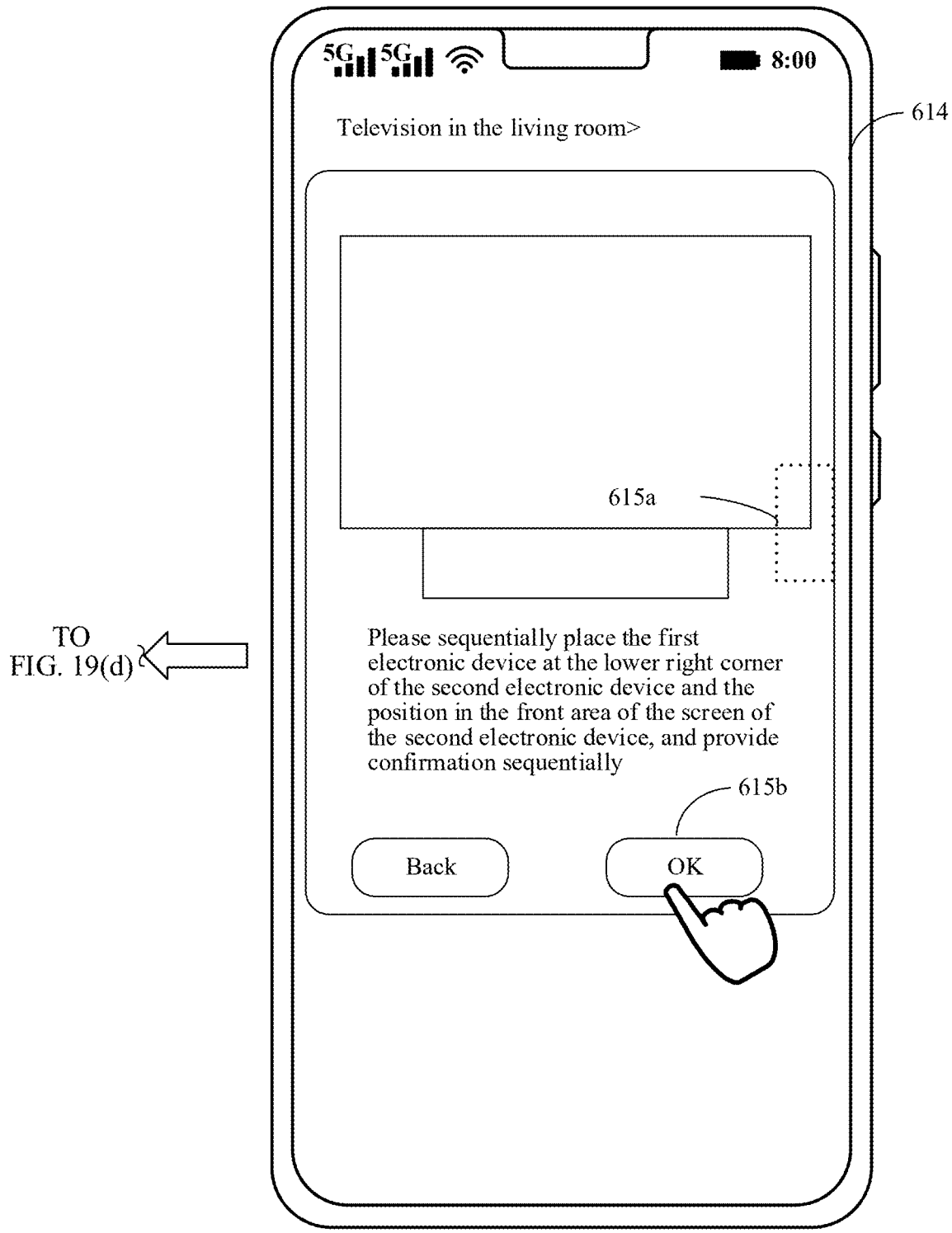
Figure 19D:
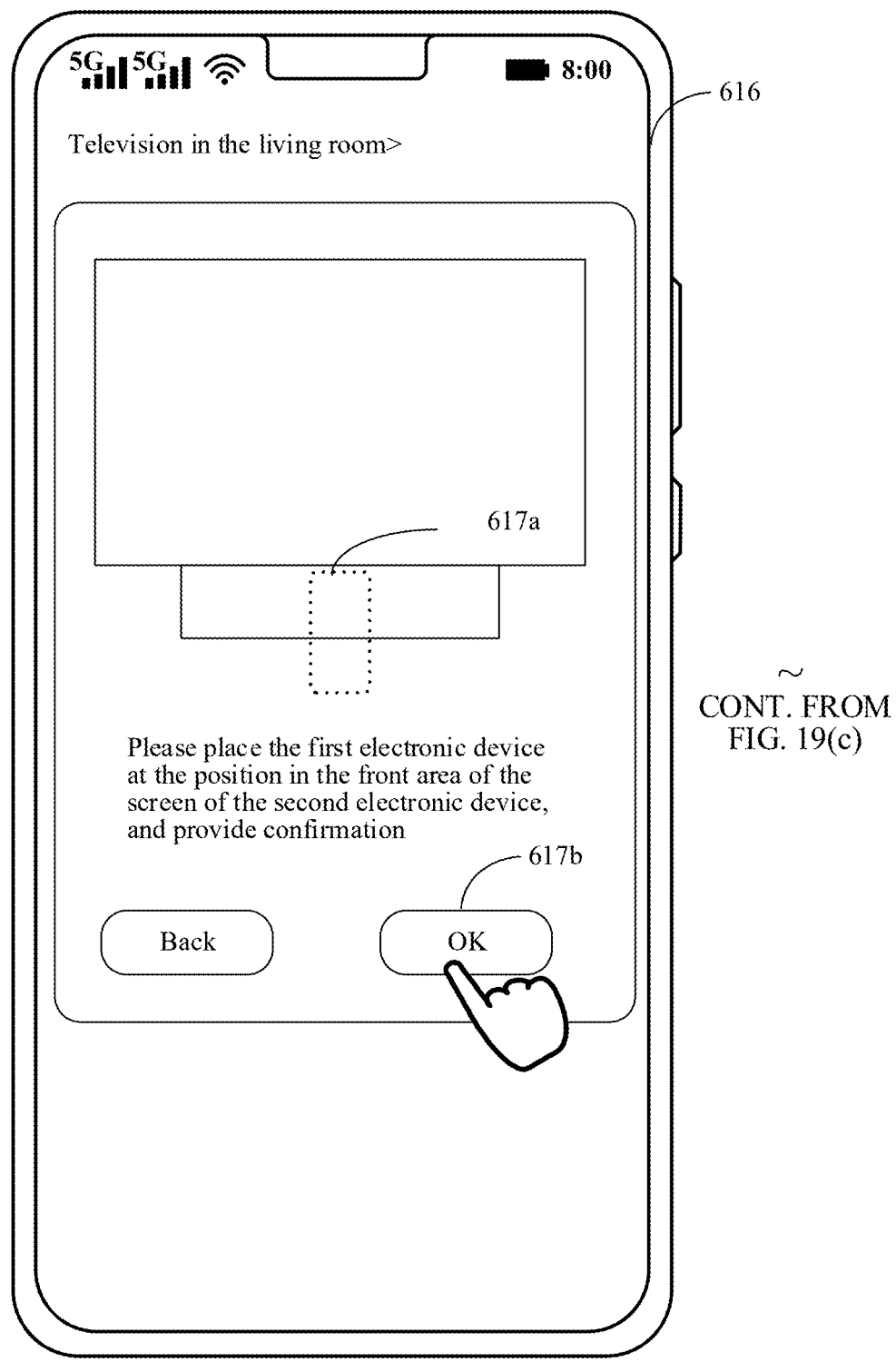

As shown in FIG. 19(a), an icon 611a may blink to prompt the user to place the first electronic device at a lower left corner of the second electronic device. When placing the first electronic device at the lower left corner of the second electronic device, the user may operate (for example, tap) an "OK" key 611b. In response to the operation performed by the user on the "OK" key 611b, the first electronic device may record current spatial position information of the first electronic device. Further, as shown in FIG. 19(b), an icon 613a may blink to prompt the user to place the first electronic device at an upper left corner of the second electronic device. When placing the first electronic device at the upper left corner of the second electronic device, the user may tap an "OK" key 613b. In response to the operation of tapping the "OK" key 613b by the user, the first electronic device may record current spatial position information of the first electronic device. Further, as shown in FIG. 19(c), an icon 615a may blink to prompt the user to place the first electronic device at a lower right corner of the second electronic device. When placing the first electronic device at the lower right corner of the second electronic device, the user may operate an "OK" key 615b. In response to the operation performed by the user on the "OK" key 615b, the first electronic device may record current spatial position information of the first electronic device. Further, as shown in FIG. 19(d), an icon 617a may blink to prompt the user to place the first electronic device at a position in the front area of the second electronic device. After the user places the first electronic device at the position in the front area of the second electronic device, the user may operate an "OK" key 617b. In this case, the first electronic device may record current spatial position information of the first electronic device.

Figure 20:
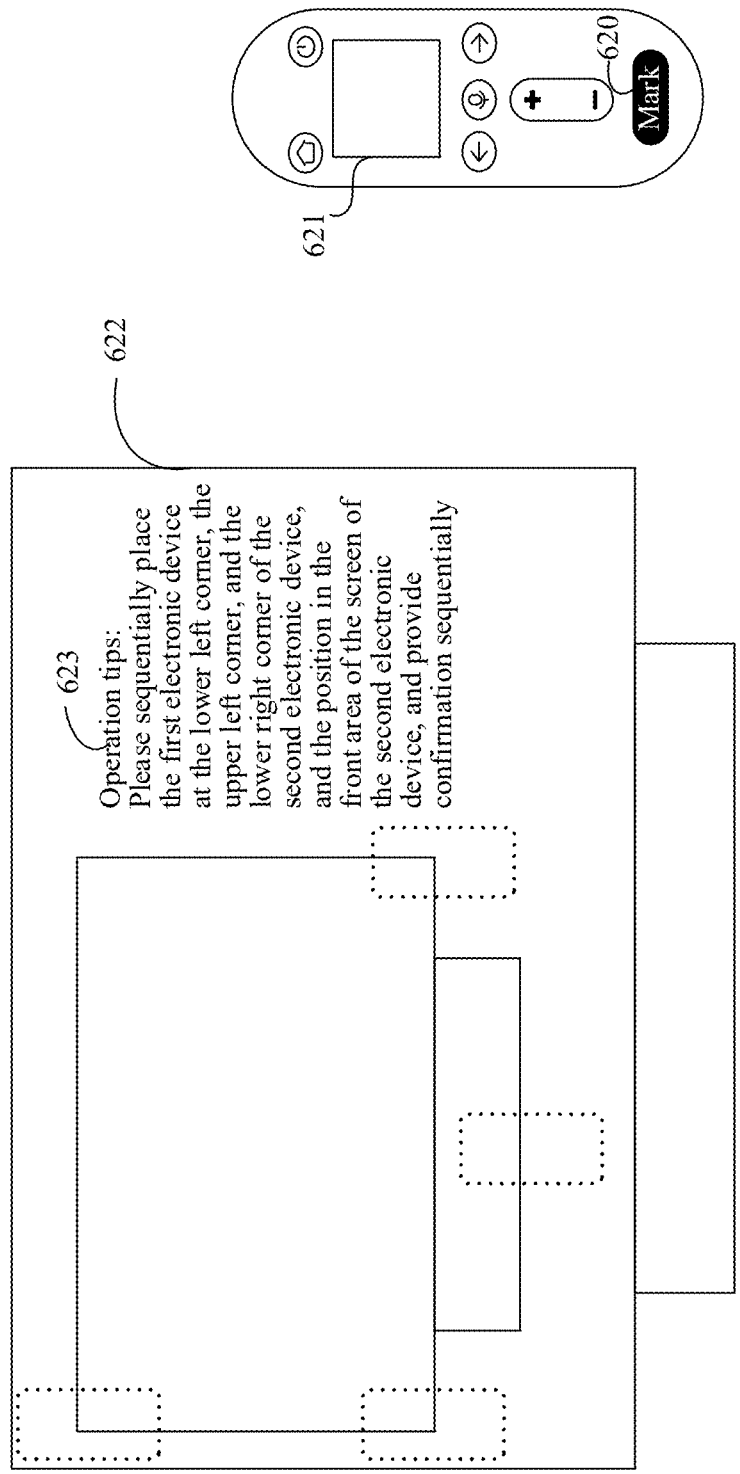

In some other embodiments, the second electronic device may be installed with an application (for example, a "Settings" application) having a function of marking the position of the second electronic device. For example, the first electronic device may be a mobile phone, a remote control, or another device. The first electronic device includes a display screen. For example, the remote control includes a display screen. An example in which the first electronic device is a remote control is used for description. The user starts the second electronic device by using the remote control, and controls, based on an input on the remote control, an application on the second electronic device to enable a corresponding function (for example, controlling a "Settings" application on the second electronic device to enable a universal remote control function), so that the second electronic device starts to accept a position mark. For example, as shown in FIG. 20, the user may operate (for example, tap) a "Mark" key 620 on the remote control, and in response to the operation performed by the user on the "Mark" key 620, the second electronic device may display a prompt interface 622. The prompt interface 622 includes first prompt information 623, for example, "Please sequentially place the first electronic device at the lower left corner, the upper left corner, and the lower right corner of the second electronic device, and in the front area of the screen of the second electronic device, and provide confirmation sequentially". For a specific marking process, refer to the foregoing related descriptions. Details are not described herein again. Optionally, after the marking is completed, the second electronic device may further display second prompt information, to prompt that the remote control is located in the front area of the second electronic device and points to the second electronic device, so that the control window of the second electronic device can be displayed on a display screen 621 of the remote control. The second prompt information may be displayed for preset duration (for example, 10 seconds). Alternatively, the display of the first prompt information and/or the second prompt information may be replaced with a voice output, or may be replaced with display and a voice output.

According to the method provided in this embodiment of this application, the first electronic device marks the position of the second electronic device. In this way, position marking and orientation marking on the second electronic device for which no UWB module is configured may be performed, to determine a specific position and orientation of the second electronic device in space. In this way, when the first electronic device is located in a valid control range (for example, the front area of the second electronic device) of the second electronic device and points to the second electronic device, the first electronic device can quickly display the control window of the second electronic device, to facilitate user control, reduce a user operation, save time, and improve user experience.

Figure 21:
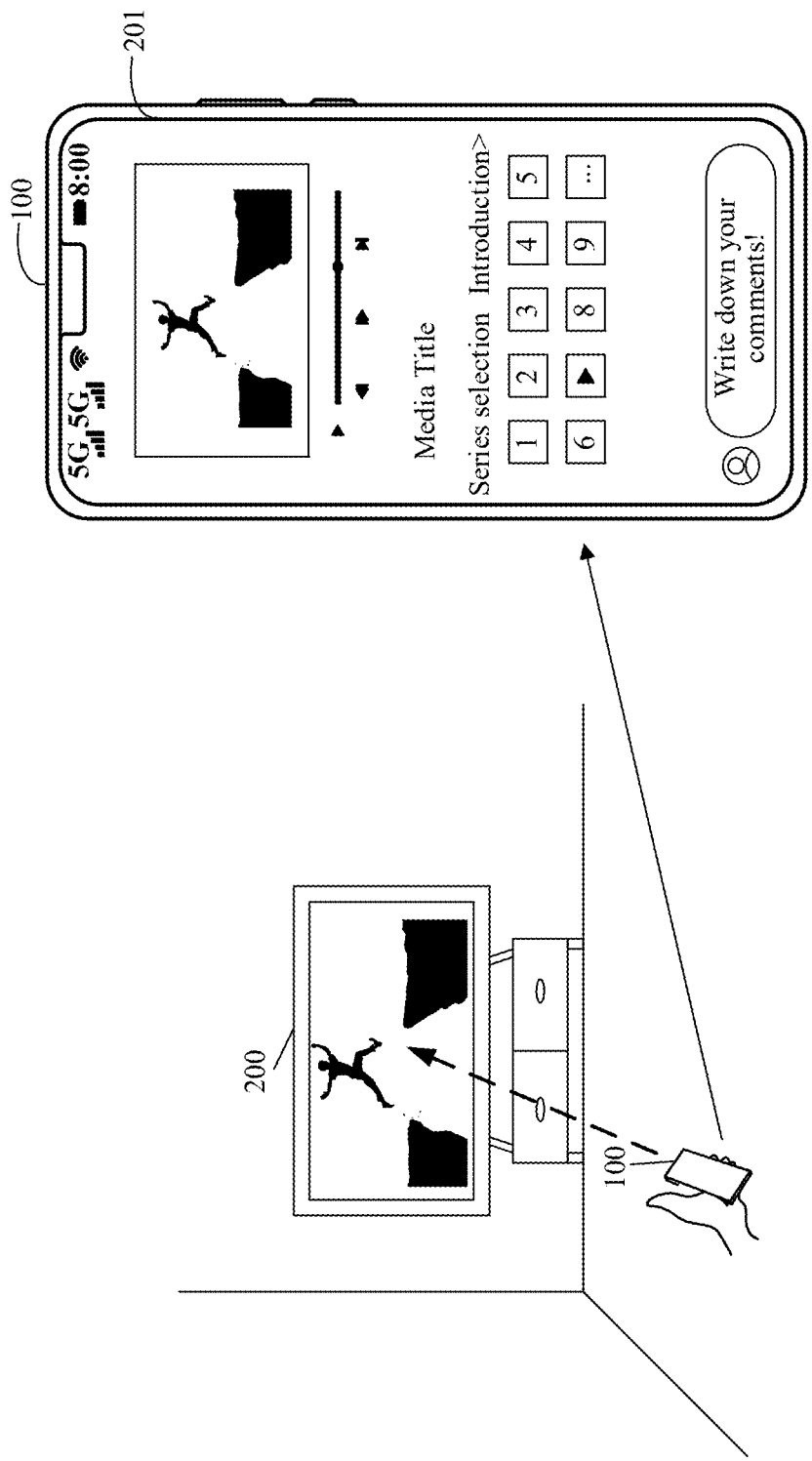

For example, as shown in FIG. 21, when the user enables the first electronic device wo located in the front area of the second electronic device 200 to point to the second electronic device 200, the first electronic device boo immediately displays the control window 201 of the second electronic device 200. Optionally, the control window 201 may be an interface displayed in full screen, or may be a window that does not occupy full screen. The control window 201 may be displayed on the display screen in a floating manner, or may be fixedly displayed at a position on the display screen. The control window 201 may be displayed at a top layer of the display interface. The user can perform subsequent control on the second electronic device without performing an unnecessary operation, and user experience is good.

For example, the first electronic device calculates and obtains the coordinates of the first electronic device in the first coordinate system in real time through real-time communication interaction between the first electronic device and the UWB base station, obtains coordinates of three different positions on the second electronic device and coordinates of a position in front of a screen area of the second electronic device through marking by the first electronic device, and converts all or some of the coordinates of the first electronic device, the coordinates of the three different positions on the second electronic device, the coordinates of the position in front of the screen area of the second electronic device, and the coordinates of the UWB base station into coordinates in a same coordinate system based on a relative direction change between coordinate systems.

It is determined, based on that $z_{B1}$ in the third coordinate system obtained in the foregoing calculation process is greater than 0, that the first electronic device is located in the front area of the second electronic device.

It is determined, based on $$\left(\frac{-O_b^{tz} \cdot \overline{O_bQ}^{tx}}{\overline{O_bQ}^{tz}} + O_b^{tx}\right) \in [0', m'] \text{ and } \left(\frac{-O_b^{tz} \cdot \overline{O_bQ}^{ty}}{\overline{O_bQ}^{tz}} + O_b^{ty}\right) \in [0', n'],$$

that the first electronic device points to the front area of the second electronic device. Alternatively, the first electronic device determines, based on the pointing direction information of the first electronic device, the orientation information of the second electronic device, and the position information of the second electronic device, that the first electronic device points to the second electronic device.

After the first electronic device is located in the front area of the second electronic device and points to the second electronic device, the first electronic device displays the control window of the second electronic device.

Embodiment 2

With reference to specific accompanying drawings, the following specifically describes a procedure of a method for displaying a control window of a second electronic device.

As shown in FIG. 22, the method for displaying the control window of the second electronic device provided in this embodiment of this application includes the following steps.

S2210. A UWB base station, a first electronic device, and a second electronic device establish a first coordinate system, a second coordinate system, and a third coordinate system respectively.

Specific content of S2210 is the same as specific content of S510. Refer to the descriptions of S510. Details are not described herein again.

S2220. Move the first electronic device to one position or two positions in the display area of the second electronic device, and mark coordinates of the one position or the two positions in the display area of the second electronic device in the first coordinate system by using coordinates of the first electronic device in the first coordinate system.

When the first electronic device marks the one position in the display area of the second electronic device, an orientation of the first electronic device at the position is limited, and even an orientation, a pointing direction, and the like are all limited. For example, the orientation of the first electronic device is the same as an orientation of the second electronic device. For another example, the orientation of the first electronic device is the same as an orientation of the second electronic device, where a pointing direction of the first electronic device is upward and parallel to a vertical side or a horizontal side of an edge contour of the second electronic device, or a pointing direction of the first electronic device is upward and parallel to a vertical side or a horizontal side of the display area of the second electronic device (for example, as shown in (a) in FIG. 24, the first electronic device may be placed in a landscape manner, or may be placed in a portrait manner). In this case, the first electronic device receives a user input, and the first electronic device records coordinates, an orientation, and the like of the first electronic device at the position, which are respectively used as coordinates of the position in the display area of the second electronic device and the orientation of the second electronic device.

Optionally, as shown in (a) in FIG. 25, the second electronic device may tilt by a specific angle. In this case, the orientation of the first electronic device is the same as the orientation of the second electronic device, and the pointing direction of the first electronic device is upward and parallel to a vertical side or a horizontal side of the second electronic device, or the pointing direction of the first electronic device is upward and parallel to the vertical side or the horizontal side of the display area of the second electronic device.

When the first electronic device marks the two positions in the display area of the second electronic device, an orientation of the first electronic device at one of the two positions is limited, and even an orientation, a direction, and the like are all limited. The orientations of the first electronic device at the two positions are the same. For example, the two locations are a first position and a second position. For example, orientations of the first electronic device at the first position and the second position are the same as an orientation of the second electronic device. In addition, pointing directions of the first electronic device at the first position and the second position are the same.

Alternatively, an orientation of the first electronic device at the first position is limited, and even an orientation, a pointing direction, and the like are all limited. However, an orientation, a pointing direction, and the like of the first electronic device at the second position are not limited. That is, the orientation and the pointing direction of the first electronic device at the second position may be performed based on the foregoing limitation, or may not be performed based on the foregoing limitation.

When the first electronic device is at the first position, the first electronic device receives a first user input, and records coordinates, an orientation, and the like of the first electronic device at the first position, which are respectively used as coordinates of the first position in the display area of the second electronic device and an orientation of the second electronic device. When the first electronic device is at the second position, the first electronic device receives a second user input, and records coordinates of the first electronic device at the second position as coordinates of the second position in the display area of the second electronic device. Optionally, the first electronic device may further record an orientation of the first electronic device, and use the recorded orientation as an orientation of the second electronic device. Optionally, the first electronic device may obtain, through calculation, a more accurate orientation of the second electronic device based on the orientations of the second electronic device that are recorded.

Optionally, one or two positions in the display area of the second electronic device may be one position (for example, at a position of ½ or ⅓) or two positions of an edge contour (for example, a horizontal contour or a vertical contour of the display area) of the display area of the second electronic device, or may be one position (for example, a central point of the display area) or two positions (for example, an intersection of a horizontal side center and a vertical side center of the display area, and an intersection of a horizontal side center and ⅓ of a vertical side of the display area) in a central part of the display area of the second electronic device.

It should be noted that, in S2220, if the first electronic device marks only one position (for example, a vertex angle position) in the display area of the second electronic device, the first electronic device needs to obtain a length of a vertical contour and a length of a horizontal contour of the display area of the second electronic device. Optionally, the length of the vertical contour and the length of the horizontal contour of the display area of the second electronic device may be obtained by the second electronic device in advance; and the second electronic device transmits the length of the vertical contour and the length of the horizontal contour to the first electronic device through short-distance wireless communication (for example, Bluetooth or Wi-Fi) with the first electronic device. In this way, the first electronic device can obtain the length of the vertical contour and the length of the horizontal contour of the display area of the second electronic device.

If the first electronic device cannot obtain the length of the vertical contour and the length of the horizontal contour of the display area of the second electronic device from the second electronic device, the first electronic device may mark two positions in the display area of the second electronic device. Two vertex angle positions, namely, a lower left corner and an upper right corner (or two vertex angle positions: an upper left corner and a lower right corner) of the display area are used as an example. In this case, the IMU module of the first electronic device may output a relative direction change of the second coordinate system relative to the first coordinate system. In this case, a relative direction change of the second coordinate system relative to the first coordinate system is the same as a relative direction change of the third coordinate system relative to the first coordinate system (that is $C_e^b = C_e^t$, where $C_e^b$ is known data output by the IMU module or a processor of the first electronic device). Therefore, the first electronic device may obtain coordinates, in the third coordinate system, of a position of the upper right corner $A_2$ of the display area of the second electronic device through calculation based on a formula (23). In this way, the first electronic device may obtain the length of the vertical contour and the length of the horizontal contour of the display area of the second electronic device through calculation.

$$A_2^t - A_0^t = C_e^t \cdot (A_2^e - A_0^e) \quad \text{Formula (23)}$$

In this way, values of m and n may be calculated by using a horizontal coordinate difference and a vertical coordinate difference between $A_2$ and $A_0$ in the third coordinate system.

Then, $z_{B1}$ in the third coordinate system may be obtained based on the formula (20). It is determined, based on that $z_{B1}$ in the third coordinate system obtained in the foregoing calculation process is greater than 0, that the first electronic device is located in the front area of the second electronic device.

It is determined, based on the foregoing $$\left( \frac{-O_b^{tz} \cdot \overline{O_b Q}^{tx}}{\overline{O_b Q}^{tz}} + O_b^{tx} \right) \in [0^t, m^t] \text{ and } \left( \frac{-O_b^{tz} \cdot \overline{O_b Q}^{ty}}{\overline{O_b Q}^{tz}} + O_b^{ty} \right) \in [0^t, n^t],$$

that the first electronic device points to the second electronic device; or the first electronic device determines, based on pointing direction information of the first electronic device, orientation information of the second electronic device, and position information of the second electronic device, that the first electronic device points to the second electronic device.

After the first electronic device is located in the front area of the second electronic device and points to the second electronic device, the first electronic device displays the control window of the second electronic device.

For ease of description, for example, the following specifically uses "one position or two positions in the display area of the second electronic device" as "one position in the display area of the second electronic device" for description. Content of obtaining of the coordinates of the first electronic device and communication interaction between the UWB base station and the first electronic device is the same as related content in S520. Refer to related descriptions in S520. Details are not described herein again. Because the second electronic device does not include a UWB module, and cannot communicate and interact with the UWB base station, to determine coordinates of the second electronic device in the first coordinate system, the first electronic device may mark the coordinates in the first coordinate system. A procedure in which the first electronic device marks one position in the display area of the second electronic device may be the following procedure:

For example, FIG. 23 is a schematic flowchart of marking, by the first electronic device, the second electronic device in the method for displaying the control window of the second electronic device according to an embodiment of this application. As shown in FIG. 23, the procedure includes the following steps.

S2301. The first electronic device receives a user input, and outputs first prompt information, where the first prompt information is for prompting the first electronic device to sequentially mark a first position in the display area of the second electronic device and a fourth position that is outside the second electronic device and that is in the front area of the second electronic device.

Alternatively, the first prompt information in S2301 is for prompting the first electronic device to mark a first position on the second electronic device.

S2302. After the first electronic device moves to the first position, where an orientation and a pointing direction of the first electronic device maintain correspondences with an orientation and a pointing direction of the second electronic device, the first electronic device receives a first input, records coordinates of the first electronic device as coordinates of the first position, and records, through conversion based on the correspondences, the orientation and the pointing direction of the first electronic device as the orientation and the pointing direction of the second electronic device.

Preferably, the orientation and the pointing direction of the first electronic device are the same as the orientation and the pointing direction of the second electronic device. Specifically, the orientation of the first electronic device is the same as the orientation of the second electronic device, and the pointing direction of the first electronic device is upward and parallel to a vertical side or a horizontal side of the second electronic device, or the pointing direction of the first electronic device is upward and parallel to a vertical side or a horizontal side of the display area of the second electronic device (for example, as shown in (a) in FIG. 24, the first electronic device may be placed in a landscape manner, or may be placed in a portrait manner). The first electronic device receives the first input, records the coordinates of the first electronic device as the coordinates of the first position, and records the orientation and the pointing direction of the first electronic device as the orientation and the pointing direction of the second electronic device. In practice, a user needs to execute, as far as possible, the orientation, the pointing direction, and the like of the first electronic device at the position based on the foregoing operation.

Optionally, the orientation of the first electronic device is opposite to the orientation of the second electronic device, and the pointing direction of the first electronic device is the same as the pointing direction of the second electronic device. Specifically, the orientation of the first electronic device is opposite to the orientation of the second electronic device, and the pointing direction of the first electronic device is upward and parallel to a vertical side or a horizontal side of the second electronic device, or the pointing direction of the first electronic device is upward and parallel to a vertical side or a horizontal side of the display area of the second electronic device. The first electronic device receives the first input, records the coordinates of the first electronic device as the coordinates of the first position, records a direction opposite to the orientation of the first electronic device as the orientation of the second electronic device, and records the pointing direction of the first electronic device as the pointing direction of the second electronic device. In practice, a user needs to implement, as far as possible, the orientation, the pointing direction, and the like of the first electronic device at the position based on the foregoing operation.

Optionally, the user may be reminded of information such as the orientation and the pointing direction of the first electronic device at the first position by outputting prompt information. Optionally, the prompt information may be included in the first prompt information, or new prompt information may be output in addition to the first prompt information to remind the user.

It should be noted that S2301 is an optional step, and is not a mandatory step.

Optionally, the first position may be one of a lower left corner, an upper left corner, and a lower right corner of the display area of the second electronic device. Optionally, the first position may be one of a lower left corner, an upper left corner, and a lower right corner of the second electronic device. When the second electronic device has no border, the lower left corner, the upper left corner, and the lower right corner of the display area of the second electronic device are respectively the same as the lower left corner, the upper left corner, and the lower right corner of the second electronic device.

For example, that the first electronic device is located at the first position means that the first electronic device is near the lower left corner of the display area of the second electronic device. For example, the first electronic device may be placed close to the lower left corner of the display area of the second electronic device. In this case, spatial coordinates of the first electronic device in the first coordinate system are spatial coordinates of the lower left corner of the display area of the second electronic device in the first coordinate system. In addition, when the first electronic device is closer to the lower left corner, the spatial coordinates corresponding to the lower left corner in the first coordinate system are more accurate.

In this way, information such as the orientation and the pointing direction of the first electronic device is obtained by using information output by the IMU module of the first electronic device, and information such as the orientation and the pointing direction of the second electronic device can be obtained, so that a position of only one vertex angle of the second electronic device needs to be marked, without marking positions of a plurality of vertex angles of the second electronic device.

For example, the first position may be a position by the first electronic device shown in (a) in FIG. 24.

For example, the first position may be a position by the first electronic device shown in (a) in FIG. 25.

S2230. The first electronic device displays the control window of the second electronic device when the first electronic device is located in the front area of the second electronic device and points to the second electronic device.

Specific content of S2230 is the same as specific content of S530. Refer to the descriptions of S530. Details are not described herein again.

For example, as shown in (b) in FIG. 24, the first electronic device is located in the front area of the second electronic device and points to the second electronic device. In this case, the first electronic device displays the control window of the second electronic device.

For example, as shown in (b) in FIG. 25, the first electronic device is located in the front area of the second electronic device and points to the second electronic device. In this case, the first electronic device displays the control window of the second electronic device.

It should be noted that, if the second electronic device does not have a border, the foregoing "display area of the second electronic device" may all be replaced with "second electronic device". If the second electronic device has a border, the foregoing "display area of the second electronic device" may also be replaced with "second electronic device".

Optionally, the coordinates of the first position recorded by the first electronic device and the corresponding meaning may be locally stored in the first electronic device, may be stored on a cloud server (where the first electronic device may be connected to the cloud server) connected to the first electronic device, or may be stored on a home central device (not shown in the figure) connected to the first electronic device. A home may be equipped with one home central device. The home central device and various electronic devices in the home may be connected to a same router. When the coordinates of the first position and the corresponding meanings are stored on the home central device, a third electronic device may obtain the coordinates of the first position and the corresponding meanings through communication connection to the home central device, to obtain position information and orientation information of the second electronic device.

For example, in a family, a mobile phone of a husband is the first electronic device, and a mobile phone of a wife is the second electronic device. The husband marks a television by using the mobile phone of the husband. Through the foregoing marking process, the mobile phone of the husband obtains position information and orientation information of the television, and stores the position information and the orientation information of the television on a home central device. The mobile phone of the wife may obtain the position information and the orientation information of the television from the home central device. Therefore, when the mobile phone of the wife is located in a front area of the television and points to the television, the mobile phone of the wife also displays a control window of the television. In other words, the mobile phone of the husband only needs to mark the television once, and the mobile phone of the wife does not need to mark the television. When the mobile phone of the husband or the mobile phone of the wife is located in the front area of the television and points to the television, the mobile phone of the husband or the mobile phone of the wife displays the control window of the television. Herein, only the mobile phones and the television are used as an example. The first electronic device includes but is not limited to the mobile phone, and the second electronic device includes but is not limited to the television.

Figure 26:
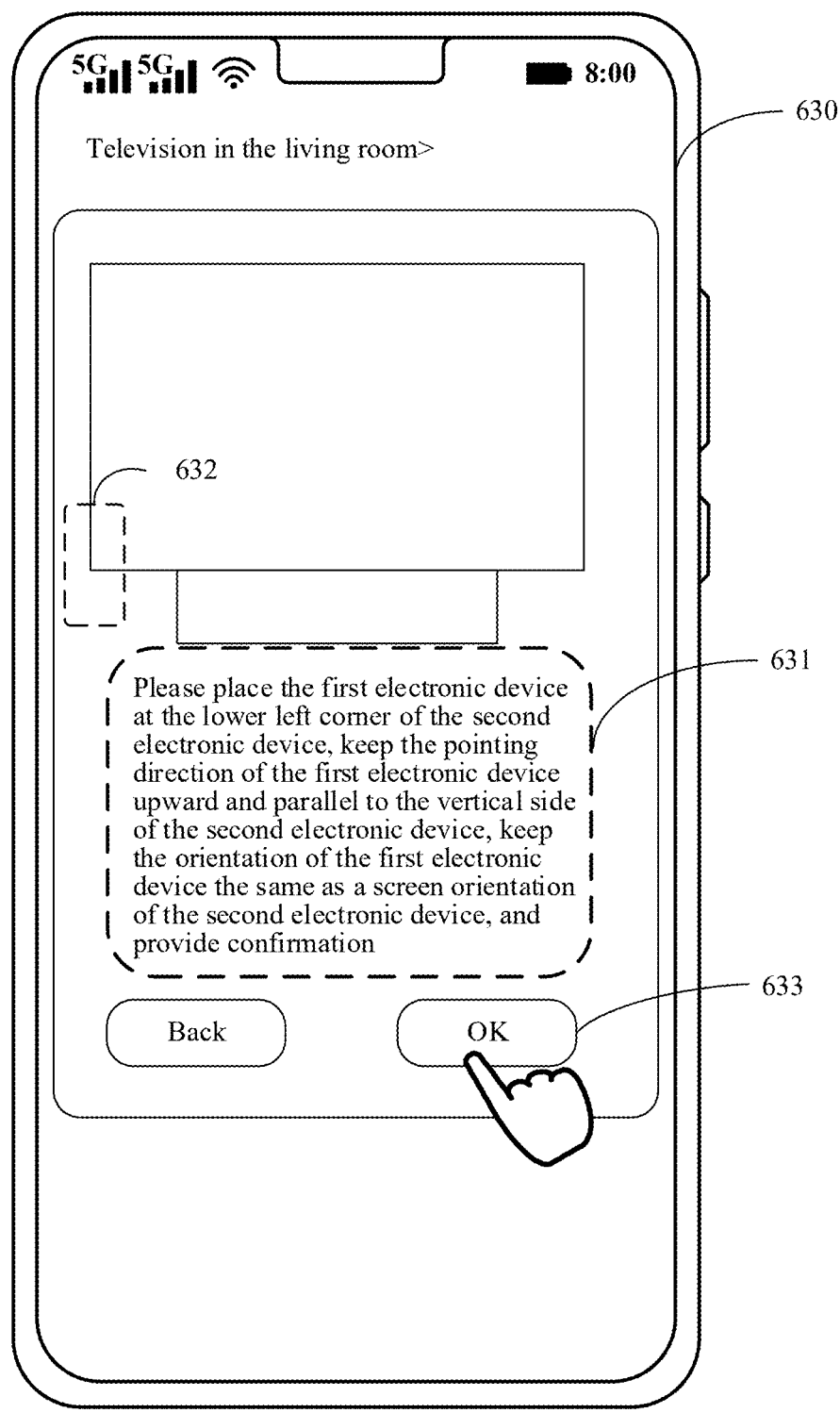
FIG. 26 is a schematic diagram of a user interface of a first electronic device when the first electronic device is located in a front area of a second electronic device and points to the second electronic device according to an embodiment of this application.
Figure 27A:
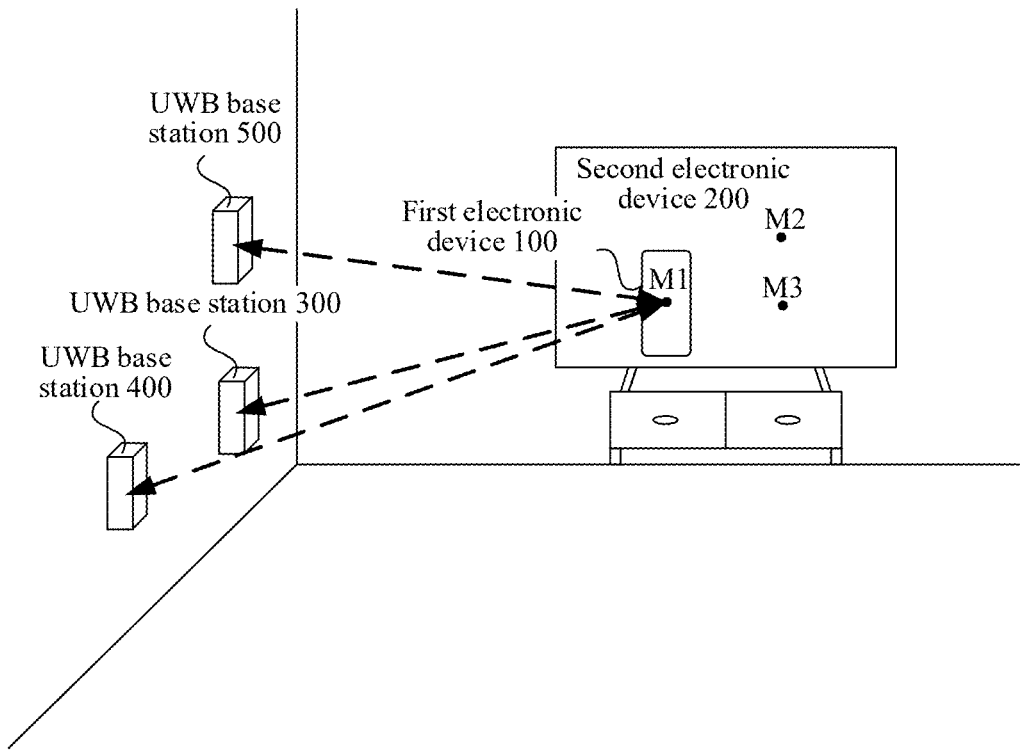
FIG. 27(a) to FIG. 27(d) are a schematic diagram of an operation of marking, by a first electronic device, a second electronic device in a method for displaying a control window of the second electronic device according to an embodiment of this application.
Figure 27B:
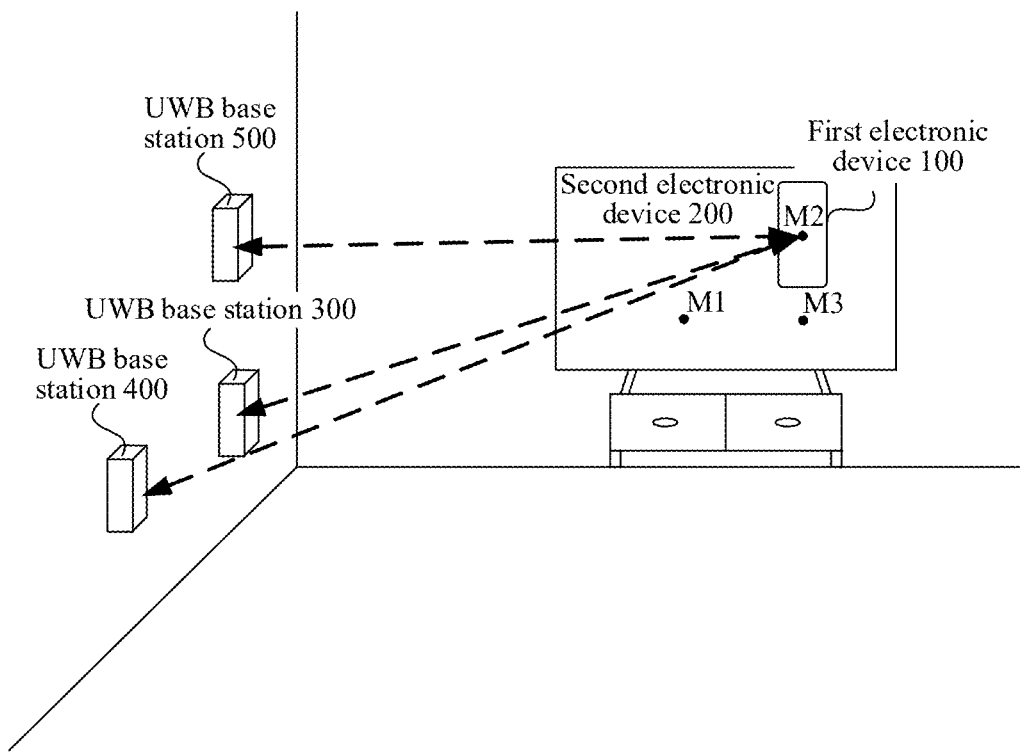
Figure 27C:
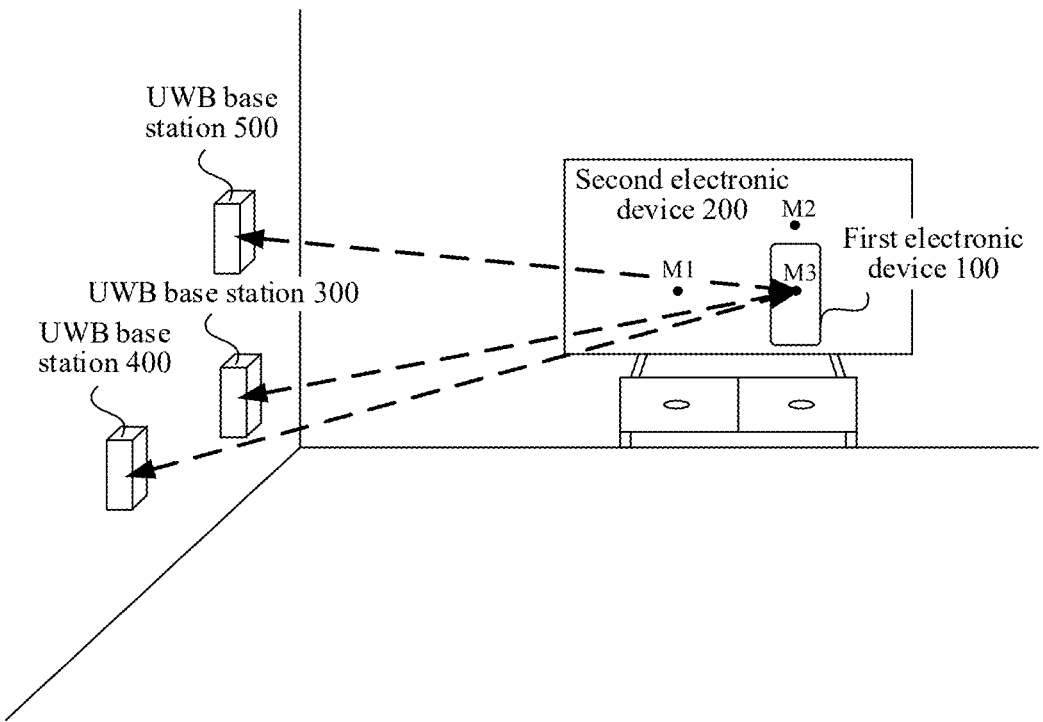
Figure 27D:
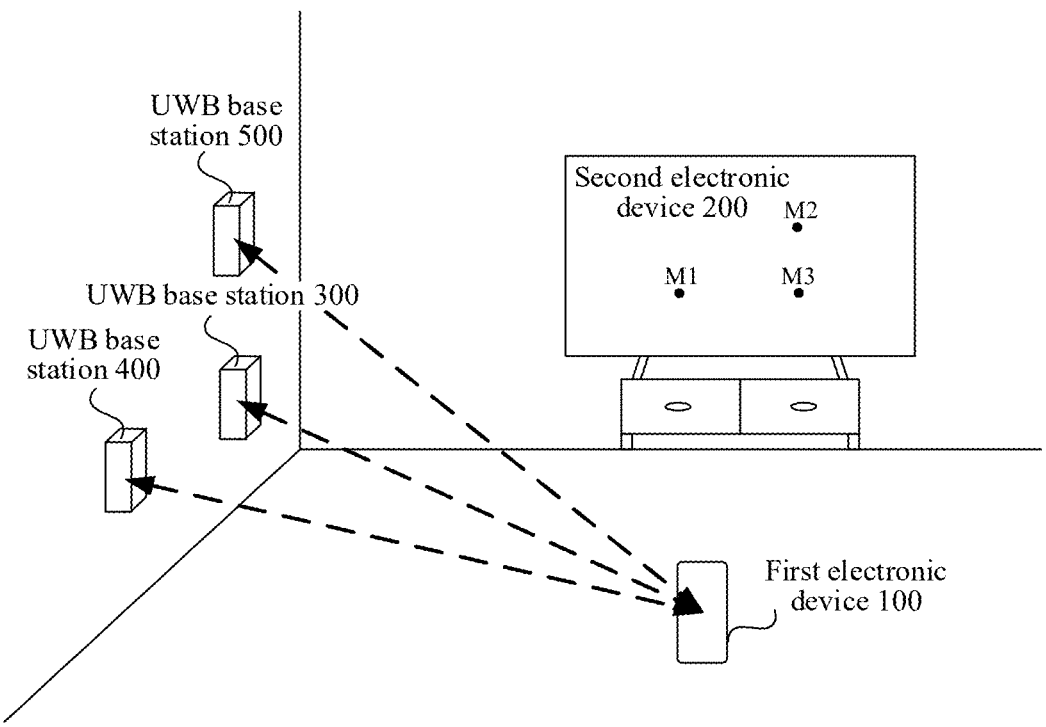

With reference to FIG. 17, FIG. 18, and FIG. 26, the following describes a UI interface that may be displayed by the second electronic device in the method provided in this embodiment of this application.

For example, as shown in FIG. 17, in response to the operation (for example, the tapping operation) performed by the user on the "Mark" control 606, the first electronic device may display a prompt interface 630 shown in FIG. 26. Alternatively, as shown in FIG. 18, in response to the operation (for example, the tapping operation) performed by the user on the "Mark" control 608, the first electronic device may display a prompt interface 630 shown in FIG. 26. The prompt interface 630 includes second prompt information 631, for example, "Please place the first electronic device at the lower left corner of the second electronic device, keep the pointing direction of the first electronic device upward and parallel to the vertical side of the second electronic device, keep the orientation of the first electronic device the same as a screen orientation of the second electronic device, and provide confirmation". Optionally, the first electronic device may further output the second prompt information in a voice playing manner.

Optionally, as shown in FIG. 26, a control 632 may blink, to prompt the user to place the first electronic device at the lower left corner of the second electronic device, keep the pointing direction of the first electronic device upward and parallel to a vertical side of the second electronic device, and keep the orientation of the first electronic device the same as a screen orientation of the second electronic device. As shown in FIG. 26, the user may place the first electronic device based on the second prompt information, that is, place the first electronic device at the lower left corner of the second electronic device, keep the pointing direction of the first electronic device upward and parallel to the vertical side of the second electronic device, and keep the screen/panel orientation of the first electronic device the same as the screen orientation of the second electronic device. After the first electronic device is placed, the user may tap an "OK" key 633. In response to the operation of tapping the "OK" key 633 by the user, the first electronic device may record current information such as the coordinates, the orientation, and the pointing direction of the first electronic device.

The method provided in this embodiment of this application may be applied to the second electronic device with no UWB module. In the method provided in this embodiment of this application, the first electronic device only needs to mark a position on the second electronic device once, where the mark includes a mark of coordinates of the display area of the second electronic device and a mark of information (for example, a tilt angle) such as an orientation. Alternatively, the first electronic device only needs to mark two positions on the second electronic device twice, where the two times of marking include marking of coordinates of the two positions in the display area of the second electronic device, and at least one of the two times of marking includes marking of information (for example, a tilt angle) such as an orientation of the second electronic device. The second electronic device does not need to include a UWB module. In this way, when the first electronic device is located in the front area of the second electronic device and points to the second electronic device, the first electronic device can quickly display the control window of the second electronic device, so that it is convenient for the user to control the second electronic device, time is saved, and user experience is improved.

For example, the first electronic device needs to obtain at least coordinates of the first electronic device at a vertex angle of the display area of the second electronic device and information (for example, a tilt angle) such as an orientation, and uses the coordinates of the first electronic device and the orientation as information such as coordinates of the vertex angle of the second electronic device and the orientation of the second electronic device. Optionally, the first electronic device may further obtain information such as an orientation of the first electronic device when the first electronic device is located at another vertex angle of the display area of the second electronic device, and the first electronic device corrects the information such as the orientation of the second electronic device based on the information such as the orientation s that are obtained twice, so that the obtained information such as the orientation of the second electronic device is more accurate. Optionally, the first electronic device may further obtain coordinates of the first electronic device at the another vertex angle of the display area of the second electronic device, and use the coordinates of the first electronic device as coordinates of the another vertex angle of the display area of the second electronic device, to facilitate subsequent calculation of the length of the vertical contour and the length of the horizontal contour of the display area of the second electronic device.

It should be noted that the vertex angle position of the display area of the second electronic device is merely an example of the first position and the second position in the display area of the second electronic device, and other positions (for example, a central position of the display area of the second electronic device, a position at a center of a vertical side and ⅓ of a horizontal side of the display area of the second electronic device) also fall within the scope of this application. For example, the first position, the second position, and the third position may be M1, M2, and M3 shown in FIG. 27(a) to FIG. 27(d). Optionally, the second electronic device may display M1, M2, and M3 (and may further display corresponding prompt information), which are for representing the first position, the second position, and the third position respectively, so that the user goes to a corresponding position for marking. Optionally, the second electronic device may sequentially display M1, M2, and M3 (and may further display the corresponding prompt information), to sequentially indicate the first position, the second position, and the third position, so that the user goes to a corresponding position for marking. Optionally, any one of M1, M2, and M3 may automatically disappear and not be displayed after preset duration.

The first electronic device may obtain a length and a width of an edge contour of the second electronic device through calculation based on coordinate values of the first position, the second position, and the third position in the first coordinate system. Alternatively, the first electronic device may obtain a length and a width of an edge contour of the display area of the second electronic device through calculation based on coordinate values of the first position, the second position, and the third position in the first coordinate system.

It should be noted that all or some of the foregoing embodiments provided in this application may be freely and randomly combined with each other. The combined technical solutions also fall within the scope of this application.

The method for displaying the control window of the second electronic device provided in this embodiment of this application is applicable to the following first electronic device and second electronic device.

Figure 28:
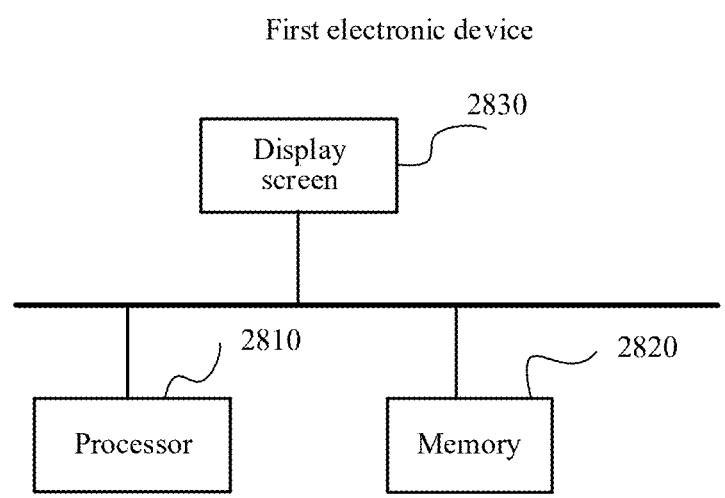
FIG. 28 is a schematic diagram of a structure of a first electronic device according to an embodiment of this application.

FIG. 28 shows a first electronic device 2800 according to this application. For example, the first electronic device 2800 includes at least one processor 2810, a memory 2820, and a display screen 2830. The processor 2810 is coupled to the memory 2820 and the display screen 2830. The coupling in this embodiment of this application may be a communication connection, or may be in an electrical form, or in another form. Specifically, the memory 2820 is configured to store program instructions. The display screen 2830 is configured to display a user interface. The processor 2810 is configured to invoke the program instructions stored in the memory 2820, so that the first electronic device 2800 performs steps performed by the first electronic device in the method for displaying the control window of the second electronic device provided in embodiments of this application.

In some embodiments, when the display screen has a touch function, the display screen is also referred to as a touch display screen. An operation on the touch display screen may be implemented by using a virtual key. When the display screen has no touch function, the display screen is also referred to as a non-touch display screen. An operation on the non-touch display screen may be implemented by using a physical button.

This application provides a computer program product including instructions. When the computer program product runs on a first electronic device, the first electronic device is enabled to perform steps performed by the first electronic device in the method for displaying the control window of the second electronic device provided in embodiments of this application.

This application provides a computer-readable storage medium, including instructions. When the instructions are run on a first electronic device, the first electronic device is enabled to perform steps performed by the first electronic device in the method for displaying the control window of the second electronic device provided in embodiments of this application.

A person skilled in the art may clearly understand that embodiments of this application may be implemented by hardware, or by hardware and software. When embodiments of this application are implemented by hardware and software, the foregoing functions may be stored in a computer-readable medium. Based on such an understanding, the technical solutions of this application essentially, the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a flash memory, a removable hard disk, a read-only memory, a random access memory, a magnetic disk, or an optical disc.

What is claimed is:

1. A first electronic device, comprising:
   an ultra-wideband communication circuit configured to communicate with a first ultra-wideband base station via ultra-wideband wireless communication and receive coordinates of the first electronic device that are based on a relative position between the first electronic device and the first ultra-wideband base station;
   an inertia measurement device;
   a processor; and
   a memory with a computer program stored thereon, wherein, when the computer program is executed by the processor, the first electronic device is enabled to perform:
      recording, in response to a first input received when the first electronic device is located at a first vertex angle position of a second electronic device, first coordinates of the first electronic device that are based on the relative position between the first electronic device and the first ultra-wideband base station as coordinates of the first vertex angle position,
      recording, in response to a second input received when the first electronic device is located at a second vertex angle position of the second electronic device, second coordinates of the first electronic device that are based on the relative position between the first electronic device and the first ultra-wideband base station as coordinates of the second vertex angle position,
      recording, in response to a third input received when the first electronic device is located at a third vertex angle position of the second electronic device, third coordinates of the first electronic device that are based on the relative position between the first electronic device and the first ultra-wideband base station as coordinates of the third vertex angle position,
      recording, in response to a fourth input received when the first electronic device is located at a fourth position that is in a front area of the second electronic device outside of the second electronic device, fourth coordinates of the first electronic device that are based on the relative position between the first electronic device and the first ultra-wideband base station as coordinates of the fourth position, and
      displaying, by the first electronic device, a control window of the second electronic device in response to detecting that the first electronic device is located in the front area of the second electronic device and points to the second electronic device, wherein the control window is configured to receive a control command for the second electronic device, wherein any two of the first vertex angle position, the second vertex angle position, and the third vertex angle position are different, and
      a detection result that the first electronic device is located in the front area of the second electronic device and points to the second electronic device is associated with the first vertex angle position, the second vertex angle position, the third vertex angle position, and the fourth position.

2. The first electronic device according to claim 1, wherein the first electronic device is incapable of obtaining position information from the second electronic device before the processor performs the steps of recording the first coordinates, recording the second coordinates, recording the third coordinates, recording the fourth coordinates and displaying the control window.

3. The first electronic device according to claim 1, wherein the first electronic device is incapable of obtaining orientation information from the second electronic device before the processor performs the steps of recording the first coordinates, recording the second coordinates, recording the third coordinates, recording the fourth coordinates and displaying the control window.

4. The first electronic device according to claim 1, wherein the control window is further configured to display an interface that displays content associated with the second electronic device.

5. The first electronic device according to claim 1, wherein, when the computer program is executed by the processor, the processor is further enabled to perform:
   not displaying, by the first electronic device, the control window of the second electronic device in response to not detecting that the first electronic device is located in the front area of the second electronic device.

6. The first electronic device according to claim 1, wherein, when the computer program is executed by the processor, the processor is further enabled to perform:
   not displaying, by the first electronic device, the control window of the second electronic device in response to not detecting that the first electronic device points to the second electronic device.

7. The first electronic device according to claim 1, wherein
   the first vertex angle position, the second vertex angle position, and the third vertex angle position are three different vertex angle positions on an edge contour of the second electronic device; or
   the first vertex angle position, the second vertex angle position, and the third vertex angle position are three different vertex angle positions of an edge contour of a display area of the second electronic device.

8. The first electronic device according to claim 7, wherein the first ultra-wideband base station comprises three antennas and is configured to communicate with the first electronic device by using the three antennas via the ultra-wideband wireless communication.

9. A method of operating a first electronic device comprising an inertia measurement unit module, and an ultra-wideband communication circuit configured to communicate with a first ultra-wideband base station via ultra-wideband wireless communication to obtain coordinates of the first electronic device based on a relative position between the first electronic device and the first ultra-wideband base station, the method comprising:
    recording, in response to a first input received when the first electronic device is located at a first vertex angle position of a second electronic device, first coordinates of the first electronic device that are based on the relative position between the first electronic device and the first ultra-wideband base station as coordinates of the first vertex angle position;
    recording, in response to a second input received when the first electronic device is located at a second vertex angle position of the second electronic device, second coordinates of the first electronic device that are based on the relative position between the first electronic device and the first ultra-wideband base station as coordinates of the second vertex angle position;
    recording, in response to a third input received when the first electronic device is located at a third vertex angle position of the second electronic device, third coordinates of the first electronic device that are based on the relative position between the first electronic device and the first ultra-wideband base station as coordinates of the third vertex angle position;
    recording, in response to a fourth input received when the first electronic device is located at a fourth position that is in a front area of the second electronic device outside of the second electronic device, fourth coordinates of the first electronic device that are based on the relative position between the first electronic device and the first ultra-wideband base station as coordinates of the fourth position; and
    displaying, by the first electronic device, a control window of the second electronic device in response to detecting that the first electronic device is located in the front area of the second electronic device and points to the second electronic device, wherein the control window is configured to receive a control command for the second electronic device, wherein
        any two of the first vertex angle position, the second vertex angle position, and the third vertex angle position are different,
        and a detection result that the first electronic device is located in the front area of the second electronic device and points to the second electronic device is associated with the first vertex angle position, the second vertex angle position, the third vertex angle position, and the fourth position.

10. The method according to claim 9, wherein the first electronic device is incapable of obtaining position information from the second electronic device before the steps of recording the first coordinates, recording the second coordinates, recording the third coordinates, recording the fourth coordinates and displaying the control window are performed.

11. The method according to claim 10, wherein the first electronic device is incapable of obtaining orientation information from the second electronic device before the steps of recording the first coordinates, recording the second coordinates, recording the third coordinates, recording the fourth coordinates and displaying the control window are performed.

12. The method according to claim 9, wherein the control window is further configured to display an interface that displays content associated with the second electronic device.

13. The method according to claim 9, further comprising:
    not displaying, by the first electronic device, the control window of the second electronic device in response to not detecting that the first electronic device is located in the front area of the second electronic device.

14. The method according to claim 9, further comprising:
    not displaying, by the first electronic device, the control window of the second electronic device in response to not detecting that the first electronic device points to the second electronic device.

15. The method according to claim 9, wherein
    the first vertex angle position, the second vertex angle position, and the third vertex angle position are three different vertex angle positions on an edge contour of the second electronic device; or
    the first vertex angle position, the second vertex angle position, and the third vertex angle position are three different vertex angle positions of an edge contour of a display area of the second electronic device.

16. The method according to claim 15, wherein
    the first ultra-wideband base station comprises three antennas, and communicates with the first electronic device by using the three antennas via the ultra-wideband wireless communication.

17. A non-transitory computer-readable storage medium, comprising a computer program, wherein when the computer program is run on a first electronic device, the first electronic device is enabled to perform:
    recording, in response to a first input received when the first electronic device is located at a first vertex angle position of a second electronic device, first coordinates of the first electronic device that are based on a relative position between the first electronic device and a first ultra-wideband base station as coordinates of the first vertex angle position;
    recording, in response to a second input received when the first electronic device is located at a second vertex angle position of the second electronic device, second coordinates of the first electronic device that are based on the relative position between the first electronic device and the first ultra-wideband base station as coordinates of the second vertex angle position;
    recording, in response to a third input received when the first electronic device is located at a third vertex angle position of the second electronic device, third coordinates of the first electronic device that are based on the relative position between the first electronic device and the first ultra-wideband base station as coordinates of the third vertex angle position;
    recording, in response to a fourth input received when the first electronic device is located at a fourth position that is in a front area of the second electronic device that is outside of the second electronic device, fourth coordinates of the first electronic device that are based on the relative position between the first electronic device and the first ultra-wideband base station as coordinates of the fourth position; and
    displaying, by the first electronic device, a control window of the second electronic device in response to detecting that the first electronic device is located in the front area of the second electronic device and points to the second electronic device, wherein the control window is configured to receive a control command for the second electronic device, wherein any two of the first vertex angle position, the second vertex angle position, and the third vertex angle position are different, and a detection result that the first electronic device is located in the front area of the second electronic device and points to the second electronic device is associated with the first vertex angle position, the second vertex angle position, the third vertex angle position, and the fourth position.

18. The non-transitory computer-readable storage medium according to claim 17, wherein the first electronic device is incapable of obtaining position information from the second electronic device before the steps of recording the first coordinates, recording the second coordinates, recording the third coordinates, recording the fourth coordinates and displaying the control window are performed.

19. The non-transitory computer-readable storage medium according to claim 18, wherein the first electronic device is incapable of obtaining orientation information from the second electronic device before the steps of recording the first coordinates, recording the second coordinates, recording the third coordinates, recording the fourth coordinates and displaying the control window are performed.

20. The non-transitory computer-readable storage medium according to claim 17, wherein the control window is an interface configured to display content associated with the second electronic device.

\* \* \* \* \*